United States Patent
Mogi

(10) Patent No.: US 9,900,514 B2
(45) Date of Patent: Feb. 20, 2018

(54) LENS APPARATUS AND IMAGE CAPTURING APPARATUS FOR PERFORMING IMAGE STABILIZATION

(71) Applicant: CANON KABUSHIKI KAISHA, Tokyo (JP)

(72) Inventor: Shuichi Mogi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/637,184

(22) Filed: Jun. 29, 2017

(65) Prior Publication Data

US 2018/0007274 A1    Jan. 4, 2018

(30) Foreign Application Priority Data

Jun. 30, 2016    (JP) .................................. 2016-130289

(51) Int. Cl.
*H04N 5/232* (2006.01)
*G02B 27/64* (2006.01)

(52) U.S. Cl.
CPC ....... *H04N 5/23287* (2013.01); *G02B 27/646* (2013.01); *H04N 5/23274* (2013.01)

(58) Field of Classification Search
CPC .......................... H04N 5/23287; G02B 27/646
USPC .......................................................... 396/55
See application file for complete search history.

(56) References Cited

U.S. PATENT DOCUMENTS

| 5,751,485 A * | 5/1998 | Suzuki | ................. G02B 15/163 |
| | | | 359/554 |
| 9,110,275 B2 | 8/2015 | Mogi | |
| 2012/0033300 A1* | 2/2012 | Nakahara | ............... G02B 13/18 |
| | | | 359/557 |
| 2015/0185493 A1* | 7/2015 | Aoki | ..................... G02B 27/646 |
| | | | 359/557 |
| 2017/0115482 A1* | 4/2017 | Aoki | .................. G02B 27/0025 |

FOREIGN PATENT DOCUMENTS

JP       2014-174270 A    9/2014

\* cited by examiner

*Primary Examiner* — Clayton E Laballe
*Assistant Examiner* — Linda B Smith
(74) *Attorney, Agent, or Firm* — Carter, DeLuca, Farrell & Schmidt, LLP

(57) ABSTRACT

A lens apparatus (101) includes an image capturing optical system including a correction unit (103) configured to move in image stabilization, and a driver (113) configured to rotationally drive the correction unit based on a rotational center position that varies depending on an object distance, and a predetermined conditional expression is satisfied.

11 Claims, 31 Drawing Sheets

FOCUS POSITION AT INFINITY

FOCUS POSITION IN CLOSE-UP PHOTOGRAPHING

LENS APPARATUS AND IMAGE CAPTURING APPARATUS FOR PERFORMING IMAGE STABILIZATION

BACKGROUND OF THE INVENTION

Field of the Invention

The present invention relates to a lens apparatus which performs image stabilization.

Description of the Related Art

Conventionally, in order to reduce an aberration occurring at the time of an image blur correction (image stabilization control), a zoom lens in which a correction lens unit constituting a part of an optical system is shifted in a direction perpendicular to an optical axis and is rotated by a minute angle around one point on the optical axis as a rotation center is known. However, a plurality of lens units constituting the optical system move by zooming or focusing. Therefore, when a rotational center position (radius of curvature) of the correction lens unit is constant, there is a possibility that the optical performance is deteriorated when the correction lens unit is rotationally moved.

Japanese Patent Laid-open No. 2014-174270 discloses an image stabilization apparatus that variably sets the radius of curvature of a plane where an optical element (correction lens unit) for image stabilization moves to improve the optical performance when rotationally moving the correction lens unit rotationally.

However, Japanese Patent Laid-open No. 2014-174270 does not describe specific conditions for improving the optical performance during the image stabilization. Accordingly, it is difficult for the image stabilization apparatus disclosed in Japanese Patent Laid-open No. 2014-174270 to perform the image stabilization while maintaining a satisfactory optical performance.

SUMMARY OF THE INVENTION

The present invention provides a lens apparatus and an image capturing apparatus capable of performing image stabilization while maintaining satisfactory optical performance.

A lens apparatus as one aspect of the present invention includes an image capturing optical system including a correction unit configured to move in image stabilization, and a driver configured to rotationally drive the correction unit based on a rotational center position that varies depending on an object distance, and a predetermined conditional expression is satisfied.

An image capturing apparatus as another aspect of the present invention includes the lens apparatus and an image sensor configured to photoelectrically convert an optical image formed via the lens apparatus.

Further features of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Figure 1:
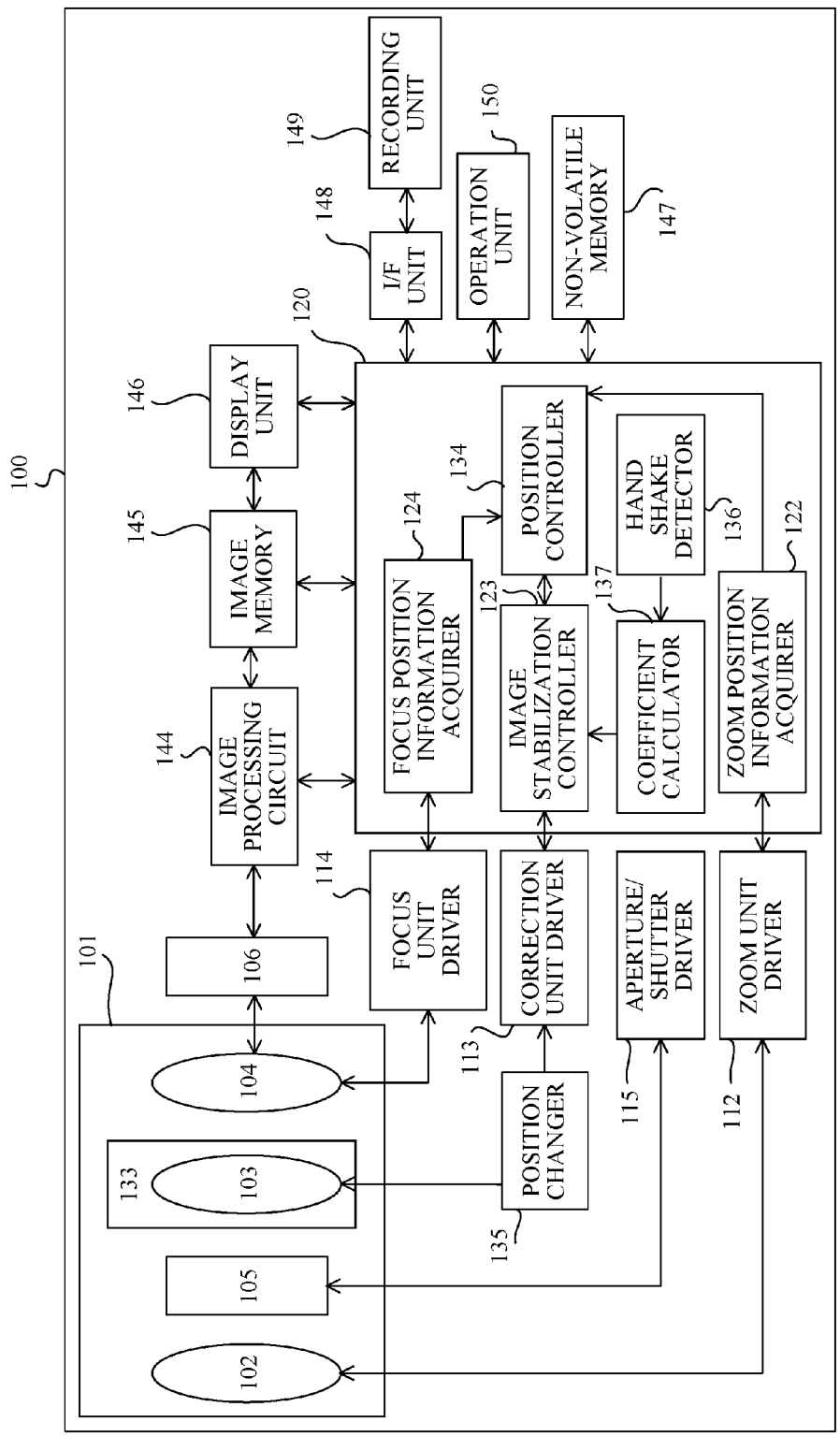
FIG. 1 is a block diagram of an image capturing apparatus in each embodiment.

First, referring to FIG. 1, an image capturing apparatus in this embodiment will be described. FIG. 1 is a block diagram of an image capturing apparatus 100 in this embodiment. A lens barrel 101 (lens apparatus) holds a lens unit (image capturing optical system including a zoom unit 102, image stabilization unit (image blur correction unit) 103, a focus unit 104, and an aperture stop/shutter 105) inside the lens barrel 101.

The zoom unit 102 adjusts a focal length by moving in the optical axis direction, and it optically changes an angle of view (zoom position), i.e., it performs zooming. In this embodiment, the zoom unit 102 includes a plurality of lens units (a zoom lens unit) including a first lens unit B1 disposed closest to an object side and a second lens unit B2 disposed adjacent to the first lens unit B1), and it changes a space between adjacent lens units during zooming. The image stabilization unit 103 is a correction unit (correction lens unit) that corrects an image blur caused by a hand shake. Specifically, the image stabilization unit 103 moves in a direction different from the optical axis direction when performing the image stabilization (rotationally moves at the radius of curvature around the rotational center position). The focus unit 104 moves in the optical axis direction during focusing. The aperture stop/shutter 105 is used for exposure control (light amount adjustment). In this embodiment, the lens barrel 101 is detachably attached to an image capturing apparatus body including an image sensor 106. However, this embodiment is not limited thereto, and can also be applied to an image capturing apparatus where the lens barrel 101 and the image capturing apparatus body are integrally formed.

Light passing through the lens barrel 101 is received by the image sensor 106 using a CCD (Charge Coupled Device) sensor, a CMOS (Complementary Metal Oxide Semiconductor) sensor, or the like to be photoelectrically converted to generate an imaging signal (image signal). In other words, the image sensor 106 photoelectrically converts an optical image (object image) formed via the lens barrel 101 (image capturing optical system) to output the imaging signal. The imaging signal is input to an image processing circuit 144 where pixel interpolation processing, color conversion processing, and the like are performed on the imaging signal, and then it sent to an image memory 145 as image data. The image memory 145 is a storage unit such as a DRAM (Dynamic Random Access Memory) and an SRAM (Static Random Access Memory).

A display unit 146 is constituted by a TFT type LCD (thin film transistor driving type liquid crystal display) or the like, and it displays specific information such as photographing information together with the photographed image data. An electronic view finder (EVF) function for a user to adjust the angle of view can be achieved by information display such as live view. The aperture stop/shutter driver 115 calculates an exposure control value (aperture value and shutter speed) based on luminance information obtained by image processing of the image processing circuit 144. Then, the aperture stop/shutter driver 115 performs AE (automatic exposure) control by driving the aperture stop/shutter 105 based on the calculation result (exposure control value).

A system controller 120 is a control unit such as a CPU (Central Processing Unit), and it controls the entire image capturing apparatus 100 by sending control commands to each unit according to the operation of the user. The system controller 120 executes various control programs stored in a nonvolatile memory 147 built in the image capturing apparatus 100 (such as control of the image sensor 106, AE/AF control, zoom control (program for executing auto FA zoom processing or the like)).

A hand shake detector 136 is a vibration detection unit such as a gyro sensor and an angular velocity sensor, and it outputs vibration information (detection signal). A coefficient calculator 137 converts a vibration amount applied to the image capturing apparatus 100 into an image stabilization coefficient, i.e., image blur correction coefficient (calculates the image stabilization coefficient) based on the vibration information from the hand shake detector 136. A position calculator 134 calculates the rotational center position of the image stabilization unit 103 based on information from a zoom position information acquirer 122 and a focus position information acquirer 124. The rotational center position is determined depending on an object distance and a zoom position. A correction unit driver 113 (drive unit) rotationally drives the image stabilization unit 103 with reference to the rotational center position variable depending on the object distance. A position changer 135 (changing unit) changes the rotational center position of the image stabilization unit 103 based on the calculation result (information on the rotational center position) by the position calculator 134 via the correction unit driver 113. A rotation mechanism unit 133 has a mechanism that can rotationally move during the image stabilization around one point on the optical axis or the vicinity of the optical axis so as to cancel the hand shake. An image stabilization controller 123 controls and drives the image stabilization unit 103 by using the correction unit driver 113, the position changer 135, and the rotation mechanism unit 133.

A focus unit driver 114 drives the focus unit 104. For example, in autofocus control by a contrast detection method, the focus unit driver 114 drives the focus unit 104 to focus on an object based on focus adjustment information (contrast evaluation value) of the image capturing optical system obtained from the image processing circuit 144. In this embodiment, the method of the focus adjustment control is not limited, and focus control such as a phase difference detection method or a combination of the contrast detection method and another method may be used. A zoom unit driver 112 drives the zoom unit 102 according to a zoom operation instruction.

An operation unit 150 includes a zoom lever, a zoom button, or the like as a zoom operation member for the user to instruct the image capturing apparatus 100 to perform zooming. The system controller 120 calculates a zoom drive speed and drive direction based on an operation amount and an operation direction of the zoom operation member that is used for the zoom instruction operation. Then, the zoom unit 102 moves along the optical axis according to the calculation result of the system controller 120.

The image data generated by the image capturing operation are sent to a recording unit 149 via an I/F unit 148 (interface unit) to be recorded. The image data are recorded in an external recording medium such as a memory card that is used while being attached to the image capturing apparatus 100, the nonvolatile memory 147 built in the image capturing apparatus 100, or both of them.

In addition to the zoom operation member described above, the operation unit 150 includes a release switch for instructing start of photographing, an auto FA zoom operation switch for instructing the start and end of the auto FA zoom function, and the like. An operation signal from the operation unit 150 is sent to the system controller 120. In addition to the program data and the image data, the nonvolatile memory 147 built in the image capturing apparatus 100 stores setting information of the image capturing apparatus 100 and reference information (such as position information and size information) of the object in the auto FA zoom function. The reference information of the object is a parameter that is used for control to maintain the size of the object.

Each of the units in the system controller 120, the correction unit driver 113, and the position changer 135 may be provided in either the lens apparatus or the image capturing apparatus body. In other words, at least a part of each unit in the system controller 120, the correction unit driver 113, and the position changer 135 can be provided in at least one of the lens apparatus and the image capturing apparatus body.

Figure 2:
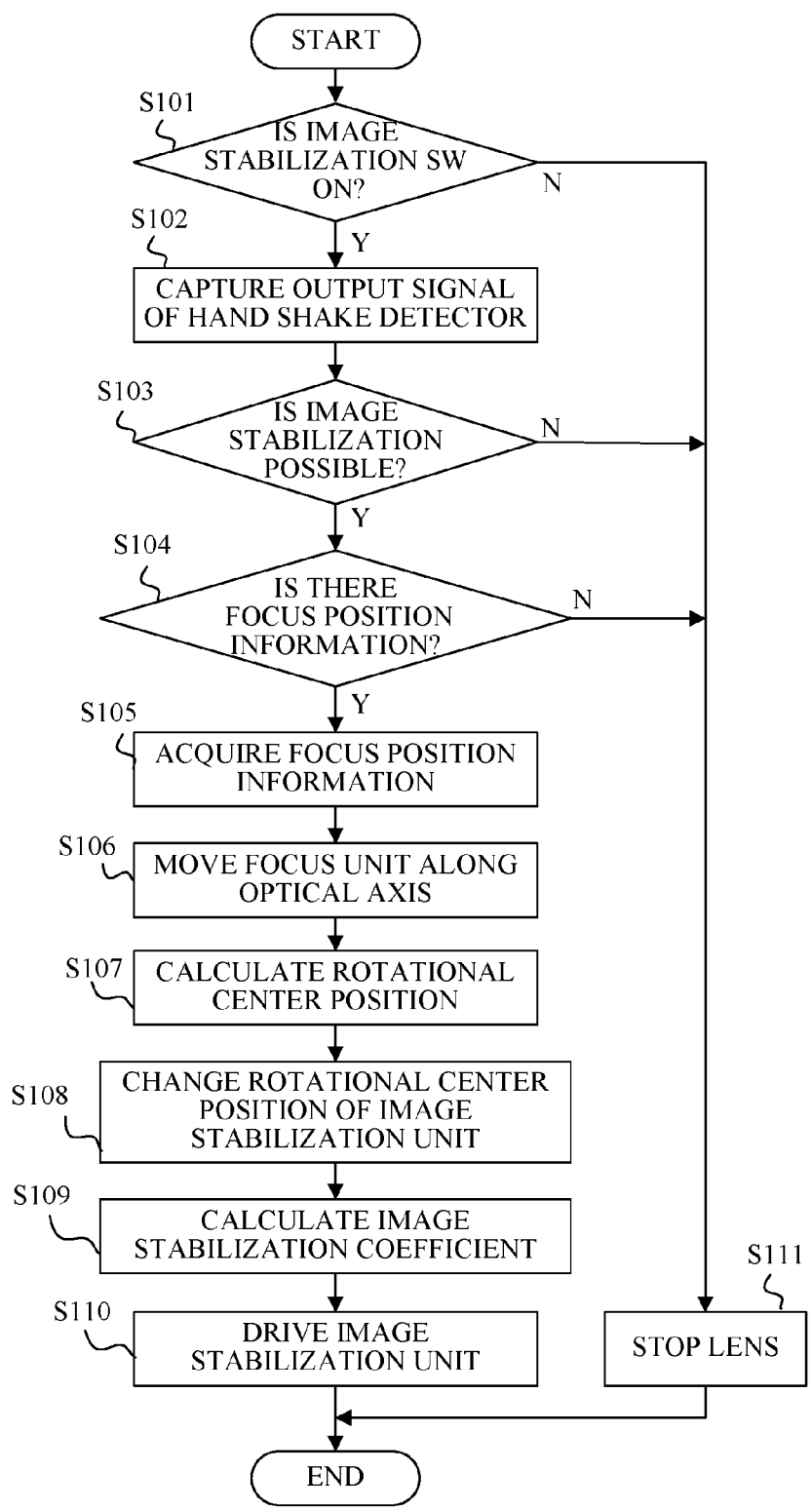
FIG. 2 is a flowchart of illustrating the overall operation of image stabilizing control in each embodiment.

Next, referring to FIG. 2, the overall operation of the image stabilization control in this embodiment will be described. FIG. 2 is a flowchart of illustrating the overall operation of the image stabilization control in this embodiment, and it illustrates a method of changing the rotational center position of the image stabilization unit 103 depending on the focus position. Each step of FIG. 2 starts when a main power supply of the image capturing apparatus 100 is turned on, and it is performed at a constant sampling cycle. Each step of FIG. 2 is performed by each unit based on a command from the system controller 120.

First, at step S101, the system controller 120 determines whether an image stabilization SW (image stabilization switch) of the operation unit 150 is ON. When the image stabilization SW is ON, the flow proceeds to step S102. On the other hand, when the image stabilization SW is OFF, the flow proceeds to step S111, the system controller 120 stops the drive of the image stabilization unit 103, it ends this flow (vibration correction routine), and it waits until the next process.

At step S102, the system controller 120 (coefficient calculator 137) captures output signals from the hand shake detector 136 such as an accelerometer and an angular velocity meter. Subsequently, at step S103, the system controller 120 determines whether it is possible to perform the image stabilization (vibration correction). When it is possible to perform the image stabilization, the flow proceeds to step S104. On the other hand, when it is not possible to perform the image stabilization, the flow proceeds to step S111. At step S103, the system controller 120 determines whether the output signal from the hand shake detector 136 such as an accelerometer or an angular velocity meter from the start of the power supply is in a stable state. Until the output signal is stabilized, the system controller 120 determines that the image stabilization is not possible, and after the output signal is stabilized, the system controller 120 determines that the image stabilization is possible. This makes it possible to avoid degradation of the image stabilization performance in a state where the output value immediately after the start of the power supply is unstable.

Subsequently, at step S104, the system controller 120 determines whether there is focus position information. When there is the focus position information, the flow proceeds to step S105. On the other hand, when there is no focus position information, the flow proceeds to step S111. At step S105, the system controller 120 (focus position information acquirer 124) acquires focus position information. Subsequently, at step S106, the focus unit 104 moves along the optical axis. Subsequently, at step S107, the system controller 120 (position calculator 134) calculates the rotational center position (turning center position) of the image stabilization unit 103 based on the focus position information acquired at step S105. Subsequently, at step S108, the position changer 135 changes the rotational center position of the image stabilization unit 103 based on the information on the rotational center position calculated by the system controller 120.

Subsequently, at step S109, the system controller 120 (coefficient calculator 137) calculates an image stabilization coefficient (image blur correction coefficient) such as an angular vibration correction coefficient and a parallel vibration correction coefficient according to the calculated in-focus range. Subsequently, at step S110, the correction unit driver 113 rotates (turns) the image stabilization unit 103 around the rotational center position determined at step S108, based on the image stabilization coefficient calculated at step S109.

As described above, the image capturing apparatus 100 of this embodiment changes the rotational center position of the image stabilization unit 103 depending on the focus position. Then, it can satisfactorily correct the optical performance during the image stabilization by calculating and correcting the rotational center position optimum for the image stabilization coefficient calculated according to the in-focus range of the main object at the time of capturing a moving image or still image.

Figure 3:
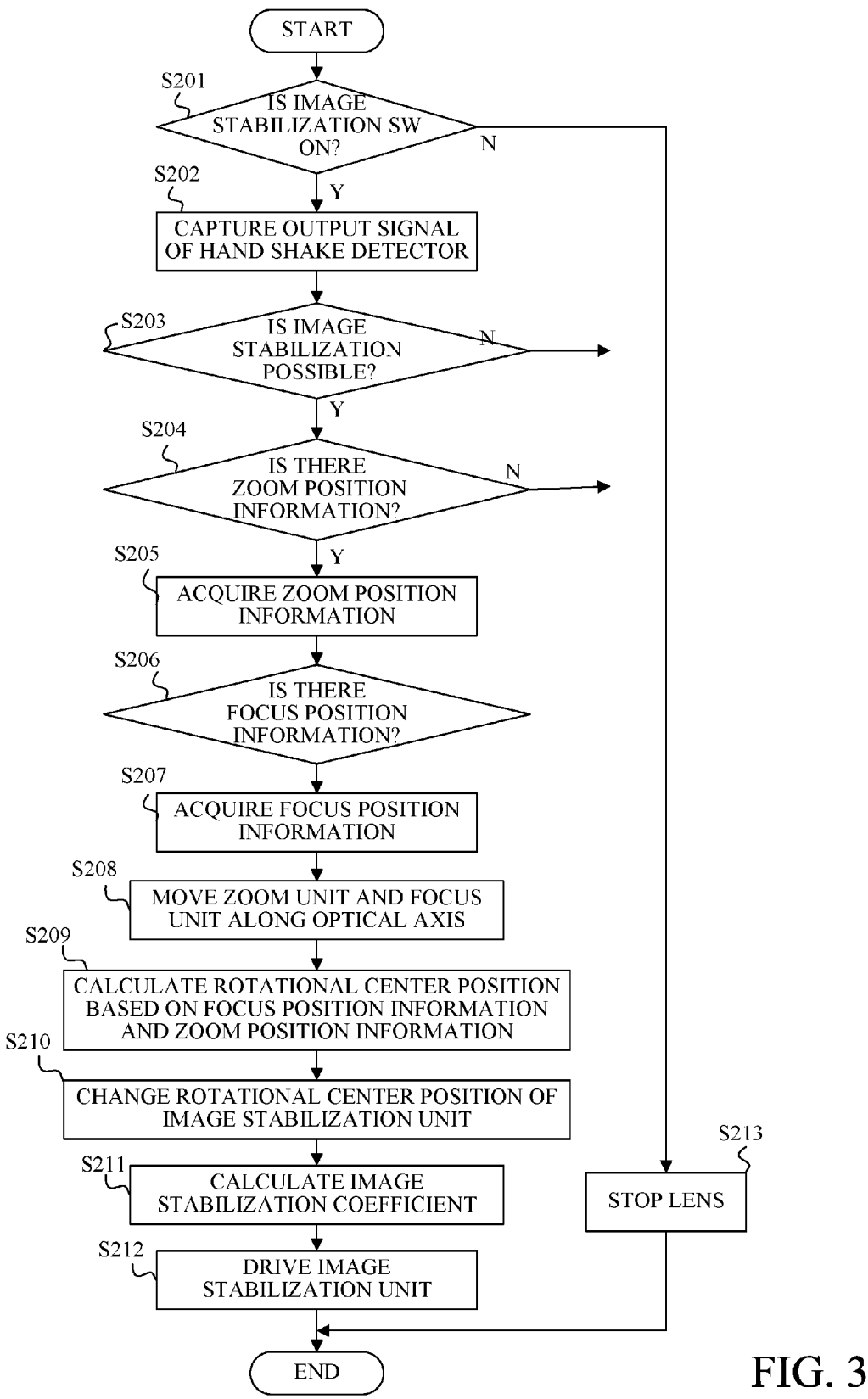
FIG. 3 is a flowchart of illustrating the overall operation of another image stabilizing control in each embodiment.

Next, referring to FIG. 3, the overall operation of another image stabilization control in this embodiment will be described. FIG. 3 is a flowchart of illustrating the overall operation of the image stabilization control, and it illustrates a method of changing the rotational center position of the image stabilization unit 103 depending on the focus position and the zoom position. Each step of FIG. 3 starts when the main power supply of the image capturing apparatus 100 is turned on, and it is executed at a constant sampling cycle. Each step of FIG. 3 is executed by each unit based on a command from the system controller 120. Steps S201 to S203, S206, S207, and S210 to S213 in FIG. 3 are the same as steps S101 to S105 and S108 to S111 in FIG. 2, respectively, and accordingly descriptions thereof will be omitted.

At step S204, the system controller 120 determines whether there is zoom position information. When there is the zoom position information, the flow proceeds to step S205. On the other hand, when there is no zoom position information, the flow proceeds to step S213. At step S205, the system controller 120 (zoom position information acquirer 122) acquires the zoom position information.

At step S208, the zoom unit 102 and the focus unit 104 move along the optical axis. Subsequently, at step S209, the system controller 120 (position calculator 134) calculates the rotational center position (turning center position) of the image stabilization unit 103 based on the zoom position information and the focus position information acquired at steps S205 and S207, respectively.

Next, the optical features of the imaging lens of this embodiment will be described. Generally, when attempting to correct the image blur by parallel eccentricity of a lens unit constituting a part of the optical system, the imaging performance is deteriorated due to the eccentric aberration. Hereinafter, the occurrence of the eccentric aberration when the image blur is corrected by moving a movable lens unit in a direction orthogonal to the optical axis in an arbitrary refractive power arrangement will be described in view of the aberration theory, based on a method described in Matsui, the 23rd, Meeting of the Japan Society of Applied Physics (1962).

An aberration amount $\Delta Y1$ of the entire system when a lens unit P of a part of a magnification varying optical system is decentered (eccentric) in parallel by E is given by a sum of an aberration amount $\Delta Y$ before decentering (i.e., before eccentricity is given) and an eccentric aberration amount $\Delta Y(E)$ as represented by expression (a) below. The aberration amount $\Delta Y$ is represented by a spherical aberration (I), coma aberration (II), astigmatism (III), Petzval sum (P), and distortion (Y) as indicated by expression (b) below. The eccentric aberration $\Delta Y(E)$ is represented by a first order eccentric coma aberration (IIE), first order eccentric astigmatism (IIIE), first order eccentric field curvature (PE), first order eccentric distortion (VE1), first order eccentric distortion added aberration (VE2), and first order origin movement ($\Delta E$) as indicated by expression (c) below. The first order origin movement ($\Delta E$), the first order eccentric coma aberration (IIE), the first order eccentric astigmatism (IIIE), the first order eccentric field curvature (PE), the first order eccentric distortion (VE1), and the first order eccentric distortion added aberration (VE2) are represented by expressions (d) to (i) below, respectively. According to expression (d), the aberrations of ($\Delta E$) to (VE2) in expression (i) are represented by using aberration coefficients IP, IIP, IIIP, PP, and VP of the lens unit P, where $\alpha P$ and $\alpha aP$ are incidence angles of light beams entering the lens unit P in the magnification varying optical system where the lens unit P is decentered (eccentric) in parallel. Similarly, the aberration coefficients when the lens unit disposed closer to the image plane side than the lens unit P is taken as a whole of a q-th lens unit are represented by using Iq, IIq, IIIq, Pq, and Vq.

$$\Delta Y1 = \Delta Y + \Delta Y(E) \quad (a)$$

$$\Delta Y = -\frac{1}{2\alpha'_K}[(N_1 \tan\omega)^3 \cos\varphi\omega \cdot V + \quad (b)$$
$$(N_1 \tan\omega)^2 R\{2\cos\varphi\omega\cos(\varphi_R - \varphi\omega) \cdot III + \cos\varphi_R(III + P)\} +$$
$$(N_1 \tan\omega)R^2\{2\cos\varphi_R\cos(\varphi_R - \varphi\omega) + \cos\varphi\omega\} \cdot II + R^3\cos\varphi \cdot I]$$

$$\Delta Y(E) = -\frac{1}{2\alpha'_K}[(N_1 \tan\omega)^2\{(2 + \cos2\varphi\omega)(VE1) - (VE2)\} + \quad (c)$$
$$2(N_1 \tan\omega)R\{2\cos(\varphi_R - \varphi\omega) + \cos(\varphi_R + \varphi\omega)\}(IIIE) +$$
$$\cos\varphi_R\cos\varphi\omega \cdot (PE)] + R^2(2 + \cos2\varphi_R)(IIE)] - \frac{B}{2\alpha'_K}(\Delta E)$$

$$(\Delta E) = -2(\alpha'_p - \alpha_p) = -2h_p \cdot \varphi_p \quad (d)$$

$$(IIE) = \alpha a_p II_q - \alpha_p(II_p + II_q) - \alpha a'_p I_q + \alpha a_p(I_p + I_q) = \quad (e)$$
$$h_p\varphi_p II_q - \alpha_p II_p - (ha_p\varphi_p I_q - \alpha a_p I_p)$$

$$(IIIE) = \alpha'_p III_q - \alpha_p(III_p + III_q) - \alpha a'_p II_q + \alpha a_p(II_p + II_q) = \quad (f)$$
$$h_p\varphi_p III_q - \alpha_p III_p - (ha_p\varphi_p II_q - \alpha a_p II_p)$$

$$(PE) = \alpha'_p P_q - \alpha_p(P_p + P_q) = h_p\varphi_p P_q - \alpha_p P_p \quad (g)$$

$$(VE1) = \alpha'_p V_q - \alpha_p(V_p + V_q) - \alpha a'_p III_q + \alpha a_p(III_p + III_q) = \quad (h)$$
$$h_p\varphi_p V_q - \alpha_p V_p - (ha_p\varphi_p III_q - \alpha a_p III_p)$$

$$(VE2) = \alpha a_p P_q - \alpha a_p(P_p + P_q) = ha_p\varphi_p P_q - \alpha a_p P_p \quad (i)$$

As can be seen from the above expressions, in order to reduce the occurrence of the eccentric aberration, it is necessary to set the various aberration coefficients IP, IIP, IIIP, PP, and VP of the lens unit P to small values or to set the values of the aberration coefficients in a well-balanced manner to cancel each other as indicated in expressions (a) to (i).

Next, with respect to the optical action of the magnification varying optical system that has the image stabilization function in this embodiment, a mode assuming an image stabilization system that eccentrically drives a part of lens units in the image capturing optical system in a direction orthogonal to the optical axis to correct a displacement of a captured image will be described.

First, in order to achieve sufficiently large displacement correction with a sufficiently small eccentric drive amount, it is necessary to sufficiently increase the first order origin movement (ΔE) described above. Based on this fact, a condition for correcting the first order eccentric field curvature (PE) will be considered. The image capturing optical system is composed of three lens units of a unit o, a unit p, and a unit q in order from the object side, and the unit p is translated in the direction orthogonal to the optical axis to correct the image blur. Refractive powers of the unit o, the unit p, and the unit q are φo, φp, φq, respectively, incidence angles of the paraxial on-axis ray and the off-axial ray to each lens unit are α and αa, incident heights of the on-axis ray and the off-axis ray are denoted by h and ha, and the aberration coefficient is described by applying suffix similarly. In addition, it is assumed that each lens unit is composed of a small number of lenses, and each aberration coefficient indicates a tendency of insufficient correction.

When focusing on the Petzval sum of each lens unit based on the above assumption, the Petzval sums Po, Pp, Pq of each lens unit are proportional to the refractive powers φo, φp, φq of the respective lens units, and Po=Cφo, Pp=Cφp, and Pq=Cφq (C: constant) are substantially satisfied. Accordingly, the first order eccentric field curvature (PE) generated when the unit p is decentered (eccentric) in parallel can be rearranged as follows, substituting the above expressions.

Po: Petzval sum of the unit o
Pp: Petzval sum of the unit p
Pq: Petzval sum of the unit q
hp: Incidence height of the paraxial on-axis ray
αp: Incidence angle of the paraxial on-axis ray onto the unit p
φo: Refractive power of the unit o
φp: Refractive power of the unit p
φq: Refractive power of the unit q
αpinf: paraxial on-axis ray to the unit p when the object distance is at infinity
αpn: a paraxial on-axis ray to the unit p when the object distance is close-up photographing (first focus state)

$$PE = C\varphi p(hp \cdot \varphi q - \alpha p)$$

Accordingly, in order to correct the eccentric field curvature (PE), it is necessary that φp=0 or φq=αp/hp is satisfied. However, when φp=0 is satisfied, the first order origin movement (ΔE) becomes 0 and the displacement correction cannot be performed. Therefore, a solution satisfying φq=αp/hp must be obtained. That is, since hp>0, it is necessary to make at least α p and φ q the same sign. In other words, since hp>0 is satisfied, at least αp and φq need to have the same sign.

Next, a case where the incidence angle of the paraxial on-axis ray to the unit p will be described for each of the case of αp<0 or αp>0.

(1) When αp<0 is Satisfied

The relation of φq<0 is (necessarily φ0<0, more necessarily φp>0) is satisfied due to correction of the eccentric field curvature (PE). As described above, it is preferred that the refractive power arrangement of the optical system that can correct the first order eccentric field curvature (PE) while sufficiently increasing the first order origin movement (ΔE) satisfies Table 1 below.

First, the incidence angle of the ray on each unit varies depending on the object distance. Therefore, relational expressions (a-1) and (a-2) below are conceivable.

$$|\alpha pinf| > |\alpha pn| \tag{a-1}$$

$$|\alpha pinf| < |\alpha pn| \tag{a-2}$$

Next, with respect to the paraxial on-axis ray, since φo is a negative unit, the incident light beam to the unit P always becomes a divergent light beam. Further, when the object distance is infinite, the absolute value increases in the case of close-up photographing (in the first focus state) with respect to substantially parallel light, and always satisfies relational expression (a-3) below.

$$|\alpha pinf| > |\alpha pnear| \tag{a-3}$$

In other words, it is shown that relational expression (a-1) above does not exist. Therefore, the conditional expression related to PE is represented as Expression (g). When a parameter that does not change depending on the object distance is defined as a constant, Φp, Pq, and Pp are constants. The amount hp changes, but its change amount is very small. Therefore, a variable when the object distance changes is only αp.

Accordingly, the relationship between the absolute values of PEs when the object distance is at infinity and when the object distance is close-up photographing (first focus state) is as represented by relational expression (a-4) below.

$$|PEinf| < |PEn| \tag{a-4}$$

It is understood from the optical trace result of Numerical example 1 that relational expression (a-4) above holds.
αpinf: −0.0803
αpn: −0.1065
hpinf: 2.8874
hpnear: 2.8509
Φp: 0.0810
Φq: 0.0342
Pp: 0.2067
Pq: 0.1245
|PEinf|: 0.0457
|PEn|: 0.0508

$$\therefore |pEinf| < |PEn| \tag{a-4}$$

(2) When αp>0 is Satisfied

In order to correct the eccentric field curvature, φq>0 (necessarily φ0>0) is satisfied. Further, at this time, when φp>0 is satisfied, 0<αp<α'p<1 is satisfied.

In addition, the first order origin movement (ΔE) is as represented by expression (a-5) below.

$$(\Delta E) = -2(\alpha p' - \alpha p) > -2 \tag{a-5}$$

In other words, the eccentricity sensitivity (the ratio of a displacement of the blurring of the captured image with respect to a unit displacement of the eccentric lens unit) becomes smaller than 1. Further, as described above, the eccentricity sensitivity is 0 when φp=0 is satisfied. Accordingly, in such a case, φp<0 must be satisfied. The relationships of Φo, φp, and φq are as indicated in Table 2 below.

TABLE 1

| φo | φp | φq |
|---|---|---|
| NEGATIVE | POSITIVE | NEGATIVE |

TABLE 2

| φo | φp | φq |
|---|---|---|
| POSITIVE | NEGATIVE | POSITIVE |

The incidence angle of the ray onto each unit varies depending on the object distance. Then, relational expressions (a-6), (a-7), and (a-8) below are conceivable.

$$|\alpha pinf|>|\alpha pn| \quad (a\text{-}6)$$

$$\alpha pinf<\alpha pnear \quad (a\text{-}7)$$

$$|\alpha pinf|<|\alpha pn| \quad (a\text{-}8)$$

Next, with respect to the paraxial on-axis ray, since φo is a negative unit, the incident light beam to the unit P always becomes a divergent light beam. When the object distance is infinite, the absolute value increases when the object distance is close-up photographing (first focus state) with respect to substantially parallel light, and it always satisfies relational expression (a-6).

In other words, it means that relational expression (a-8) does not exist. Therefore, the conditional expression for PE is represented as expression (g). When a parameter that does not change with the object distance is defined as a constant, φp, Pq, and Pp are constants, and hp changes, but its change amount is very small. Therefore, a variable when the object distance changes is only αp. Accordingly, the magnitude relation of the absolute values of the PEs when the object distance is at infinity and when the object distance is close-up photographing (first focus state) is as follows.

$$PEinf|<|PEnear| \quad (a\text{-}9)$$

From the optical trace result of Numerical example 2, it can be seen that the magnitude relation is satisfied.
αpinf: 0.0242
αpnear: −0.0352
hpinf: 0.9104
hpnear: 0.6451
Φp: −0.1769
φq: 0.0746
Pp: −0.4485
Pq: 0.3700
|PEinf|: 0.0487
|PEn|: 0.0580

$$\therefore |PEinf|<|PEnear| \quad (a\text{-}10)$$

As described above, the refractive power arrangement of the optical system, which makes it possible to correct the first order eccentric field curvature (PE) while sufficiently increasing the first order origin movement (ΔE), is appropriately set as indicated in Table 3 below.

TABLE 3

|   | φo | φp | φq |
|---|---|---|---|
| A | NEGATIVE | POSITIVE | NEGATIVE |
| B | POSITIVE | NEGATIVE | POSITIVE |

Next, these refractive power arrangements are applied to the imaging lens. The reason for the application to the imaging lens is to assume a situation where the vibration of an image targets a focal length region where the image quality is likely to be degraded and the image stabilization function becomes more effective. In addition, as an imaging lens, there is a four-unit zoom lens having a configuration where the refractive power arrangement of the lens unit related to zooming is positive, negative, positive, and positive in order from the object side. In the four-unit zoom lens, a configuration where a first unit, a second unit, or both the first unit and the second unit are moved on the optical axis to mainly contribute to zooming during zooming from the wide-angle end to the telephoto end, and a third lens unit is moved on the optical axis to mainly keep an image plane position constant is widely known.

Although the total lens length is slightly long in the imaging lens having such a configuration, it is relatively easy to satisfactorily correct various aberrations in the entire zoom range, and a fourth unit is fixed during zooming. Therefore, it is sufficient to simply arrange the zooming mechanism around the first, second, and third units, and mechanical components required for vibration compensation, such as a vibration detection sensor and a power supply, are mainly arranged around the fourth unit, and as a result it is possible to prevent the outer diameter of the lens from increasing.

Next, a method of performing the vibration compensation by moving a part of the lens units of the imaging lens in a direction perpendicular to the optical axis will be described. In order to prevent the deterioration of the image quality when vibration compensation is performed while preventing the increase of the imaging lens, a lens unit suitable for the vibration compensation need to be designed to have sufficiently large eccentricity sensitivity described above in the lens unit having a small outer diameter with a small amount of occurrence of the eccentric aberration. Focusing on these points, consideration is given to using each lens unit of the imaging lens or a part thereof for the vibration compensation.

(1-1) When Using the Second Unit or a Part Thereof

The first unit has a relatively strong positive refractive power, the second unit has a strong negative refractive power, and the combined power of the third and fourth units is positive. Therefore, in this case, the correction condition for the eccentric field curvature (PE) is satisfied. The second unit has a lens with a relatively small outer diameter, which is suitable for reduction in size of the apparatus. The eccentricity sensitivity is easily increased because it is a lens unit with a strong refractive power, which is an advantage. As described above, the second unit is suitable as a lens unit for vibration compensation. Thus, in this embodiment, the second unit is moved as a lens unit for the vibration compensation in a direction perpendicular to the optical axis.

(1-2) When Using the Third Unit or a Part Thereof

The refractive power of the first unit or the combined refractive power of the first unit and the second unit tends to be strong negative at the wide-angle end, and it also tends to be weak negative at the telephoto end. Since the third unit has a positive refractive power and the fourth lens unit has a relatively weak positive refractive power, the correction condition for the eccentric field curvature (PE) is not satisfied as it is. Therefore, paying attention to the fact that the fourth unit is a lens unit having a relatively weak positive refractive power, it is conceivable to solve this problem by setting the Petzval sum of this lens unit to a negative value. However, it is not possible to strengthen the refractive power of the third unit to correct variations in various aberrations caused by zooming. Therefore, as compared with the case where the second unit is used as the lens unit for the vibration compensation, the eccentricity sensitivity cannot be increased. It is also conceivable to divide the third unit into two lens units of a positive lens unit and a negative lens unit in order from the object side, and use one of the lens units for the vibration compensation to increase the eccentricity sensitivity. As described above, the third unit is suitable as a lens unit for the vibration compensation. Thus, in this embodiment, the third unit is moved as a lens unit for the vibration compensation in a direction perpendicular to the optical axis.

(2) When Using a Method of Performing the Vibration Compensation by Rotating a Part of the Lens Units of the Imaging Lens Around a Point on the Optical Axis In the image stabilizing optical system which performs the vibration compensation by rotating a part of the lens units of the imaging lens around one point on the optical axis, the degree of freedom of the center of an inclination is increased by one. Therefore, it is possible to control various aberrations by properly giving the center of the inclination. Accordingly, by setting the center position of the inclination in a direction of canceling the various aberrations generated by moving the part of the lens unit of the imaging lens in the direction perpendicular to the optical axis to perform the vibration compensation, it is possible to satisfactorily correct the optical performance during the image stabilization.

(3) When Using a Method of Performing the Vibration Compensation by Rotating a Part of the Lens Units of the Imaging Lens Around a Point on the Optical Axis as a Variable Rotation Center In the image stabilizing optical system which performs the vibration compensation by rotating a part of the lens unit of the imaging lens around the point on the optical axis as the rotation center in (2) described above, the center position of the inclination is set in the direction of canceling the various aberrations generated by moving in the direction perpendicular to the optical axis to perform the vibration compensation. Accordingly, it is possible to satisfactorily correct the optical performance during the image stabilization.

The relationship between the absolute values of the PEs when the object distance is at infinity and when the object distance is in the close-up photographing (first focus state) satisfies relational expression (a-9). This shows that amounts of various aberrations generated by performing the vibration compensation by moving a part of the lens units of the imaging lens in the direction perpendicular to the optical axis increase when the object distance is in the close-up photographing compared to the case of the infinity. Accordingly, in order to set the center position of the inclination in the direction of canceling the various aberrations caused by performing the vibration compensation by moving a part of the lens units of the imaging lens in the direction perpendicular to the optical axis, it is necessary to set the rotational center position during the close-up photographing to be short compared to the case of infinity. Thus, it is possible to satisfactorily correct the optical performance during the image stabilization.

Next, with respect to the lens apparatus (or image capturing apparatus 100) of this embodiment, conditional expressions (1) to (7) that are preferably satisfied for the image stabilization while maintaining the optical performance will be described.

The lens apparatus of this embodiment satisfies conditional expression (1) below.

$$|Rinf|/D - |Rn|/D > 0.001 \quad (1)$$

In conditional expression (1), symbol Rinf is a distance in the optical axis direction from an intersection of a lens surface closest to the object side of the image stabilization unit 103 and the optical axis to the rotational center position when focusing at infinity. Symbol Rn is a distance in the optical axis direction from the intersection of the lens surface closest to the object side of the image stabilization unit and the optical axis to the rotational center position when focusing in a close range (in a close-up photographing, or in a first focus state). Symbol D is a thickness on the optical axis of the image stabilization unit. Conditional expression (1) defines a difference in distance in the optical axis direction from the intersection with the lens surface closest to the object side of the lens unit from the rotational center position when focusing at the infinity and in the close range. When the lower limit of conditional expression (1) is exceeded, the rotational center position at the time of close-up photographing becomes too large, and the eccentric field curvature during the close-up photographing becomes too large, which is not preferable.

Preferably, the numerical range of conditional expression (1) is set as conditional expression (1a) below.

$$3.76 < |Rinf|/D - |Rn|/D < 125.83 \quad (1a)$$

More preferably, the numerical range of conditional expression (1) is set as conditional expression (1b) below.

$$7.52 < |Rinf|/D - |Rn|/D < 62.92 \quad (1b)$$

Preferably, the lens apparatus satisfies conditional expression (2).

$$0.01 < |f1|/fw < 40.00 \quad (2)$$

In conditional expression (2), symbol f1 is a focal length of the first lens unit of the zoom unit 102, and symbol fw is a focal length of the lens apparatus (the entire lens system, i.e., image capturing optical system) at the wide-angle end. Conditional expression (2) is a conditional expression for appropriately setting the ratio of the focal length of the first lens unit to the focal length of the lens apparatus (image capturing optical system) at the wide-angle end. When the upper limit of conditional expression (2) is exceeded, the focal length of the first lens unit becomes too short, and it is difficult to suppress the field curvature in the entire zoom range. On the other hand, when the lower limit of conditional expression (2) is exceeded, the focal length of the first lens unit becomes too long, and in order to obtain a desired zoom ratio, an amount of change in a space between the first lens unit and the second lens unit increases, so that it is difficult to suppress the total lens length at the wide-angle end.

Preferably, the lens apparatus satisfies conditional expression (3).

$$0.01 < \beta 2t/\beta 2w < 100.00 \quad (3)$$

In conditional expression (3), symbols $\beta 2t$ and $\beta 2w$ are lateral magnifications at the telephoto end and at the wide-angle end of the second lens unit in the zoom unit 102, respectively. Conditional expression (3) relates to sharing of the variable magnification of the second lens unit, and it is a conditional expression concerning the total optical length and the fluctuation of the aberration during zooming. When the lower limit of conditional expression (3) is exceeded, the sharing of the variable magnification of the second lens unit becomes small, which is disadvantageous for high magnification. In addition, it is undesirable because a moving amount of a rear unit increases for achieving a high zooming ratio and the total optical length increases. On the other hand, when the upper limit of conditional expression (3) is exceeded, it is advantageous to increase the magnification because the sharing of the variable magnification of the second lens unit increases, but it is difficult to correct fluctuations of various aberrations such as field curvature and coma aberration during zooming.

Preferably, the lens apparatus satisfies conditional expression (4).

$$0.01 < ff/fw < 10.00 \quad (4)$$

In conditional expression (4), symbol ff is a focal length of the focus unit 104. Conditional expression (4) is a conditional expression that appropriately sets the ratio of the focal length of the focus unit 104 to the focal length of the lens apparatus (the entire lens system, or the image capturing optical system) at the wide-angle end. When the upper limit of conditional expression (4) is exceeded and the refractive power of the focus unit is too weak, the effect of correcting the focus fluctuation during zooming is diminished, and a moving amount for focusing becomes too long. As a result, it is difficult to perform rapid focusing. On the other hand, when the lower limit of conditional expression (4) is exceeded, the refractive power of the focus unit 104 becomes too strong, the Petzval sum increases, and the field curvature increases in the entire zoom range. In addition, when it is attempted to increase the number of constituent lenses to suppress the occurrence of the filed curvature, the weight of the focus unit 104 increases and the torque for moving the focus unit 104 increases, which is not preferable.

Preferably, the lens apparatus satisfies conditional expression (5).

$$0.10 < |ff s|/fw < 20.00 \tag{5}$$

In conditional expression (5), symbol fis is a focal length of the image stabilization unit 103. Conditional expression (5) is a conditional expression appropriately setting the ratio of the focal length of the image stabilization unit 103 to the focal length of the lens apparatus at the wide-angle end. When the upper limit of conditional expression (5) is exceeded, the focal length of the image stabilization unit 103 becomes too large and a moving amount during the image stabilization increases, and it is difficult to suppress the entire lens length. On the other hand, when the lower limit of conditional expression (5) is exceeded, the focal length of the image stabilization unit 103 becomes too small, and it is difficult to suppress eccentric aberration during the image stabilization.

Preferably, the lens apparatus satisfies conditional expression (6).

$$0.01 < |M2|/fw < 100.00 \tag{6}$$

In conditional expression (6), symbol M2 is a moving amount (relative moving amount) with respect to the image plane of the second lens unit from the wide-angle end to the telephoto end. Conditional expression (6) is a conditional expression appropriately setting the ratio of the moving amount of the second lens unit at the wide-angle end to the telephoto end and the focal length of the lens apparatus (image capturing optical system) at the wide-angle end. When the upper limit of conditional expression (6) is exceeded, an amount of change in a space between the third lens unit and the second lens unit excessively decreases during zooming from the wide-angle end to the telephoto end. Therefore, in order to achieve high magnification, it is necessary to strengthen the refractive power of the second lens unit, and thus it is difficult to correct astigmatism at the wide-angle end. On the other hand, when the lower limit of conditional expression (6) is exceeded, the amount of change in the space between the third lens unit and the second lens unit excessively increases, and the space between the second lens unit and the third lens unit increases at the wide-angle end, and thus it is difficult to increase the magnification while suppressing a diameter of a front lens.

Preferably, the lens apparatus satisfies conditional expression (7).

$$0.01 < |M1|/|M2| < 200.00 \tag{7}$$

In conditional expression (7), symbol M1 is a moving amount (relative moving amount) with respect to the image plane of the first lens unit from the wide-angle end to the telephoto end. Conditional expression (7) is a conditional expression appropriately setting the ratio of the moving amounts of the first lens unit and the second lens unit from the wide-angle end to the telephoto end. When the upper limit of conditional expression (7) is exceeded, the refractive power of the first lens unit becomes too small, and thus it is difficult to increase the magnification while suppressing the total length at the telephoto end. Or in this case, since the refractive power of the second lens unit becomes too large, it is difficult to suppress the chromatic aberration of magnification, the field curvature, and the coma aberration over the entire zoom range. On the other hand, when the lower limit of conditional expression (7) is exceeded, the refractive power of the first lens unit becomes too large, and thus it is difficult to correct an axial chromatic aberration, a spherical aberration, and the chromatic aberration of magnification at the telephoto end. Or in this case, since the refractive power of the second lens unit becomes too small, it is difficult to increase the zoom ratio while suppressing the diameter of the front lens.

More preferably, the numerical ranges of conditional expressions (2) to (7) are respectively set as conditional expressions (2a) to (7a) below.

$$1.02 < |f1|/fw < 31.33 \tag{2a}$$

$$0.85 < \beta 2t/\beta 2w < 28.32 \tag{3a}$$

$$0.14 < ff/fw < 2.00 \tag{4a}$$

$$0.58 < |fis|/fw < 7.85 \tag{5a}$$

$$0.34 < |M2|/fw < 9.16 \tag{6a}$$

$$0.09 < |M1|/|M2| < 7.98 \tag{7a}$$

Still more preferably, the numerical ranges of conditional expressions (2) to (7) are respectively set as conditional expressions (2b) to (7b) below.

$$2.04 < |f1|/fw < 15.67 \tag{2b}$$

$$1.70 < \beta 2t/\beta 2w < 14.16 \tag{3b}$$

$$0.28 < ff/fw < 1.01 \tag{4b}$$

$$1.16 < |fis|/fw < 3.93 \tag{5b}$$

$$0.68 < |M2|/fw < 4.58 \tag{6b}$$

$$0.18 < |M1|/|M2| < 3.97 \tag{7b}$$

In this embodiment, the distortion and the chromatic aberration of magnification in various aberrations may be corrected by electrical image processing. Further, the rotational center position may be obtained based on a diameter of the aperture stop or distance map information.

Next, referring to FIGS. 4 to 9, a lens apparatus (zoom lens) in Embodiments 1 to 6 of the present invention will be described. Specific numerical values relating to the zoom lenses of Embodiments 1 to 6 are respectively indicated in Numerical examples 1 to 6 described below. FIGS. 4 to 9 are cross-sectional views of the zoom lenses of Embodiments 1 to 6, respectively, in a focus state at infinity and in the close range.

Figure 4:
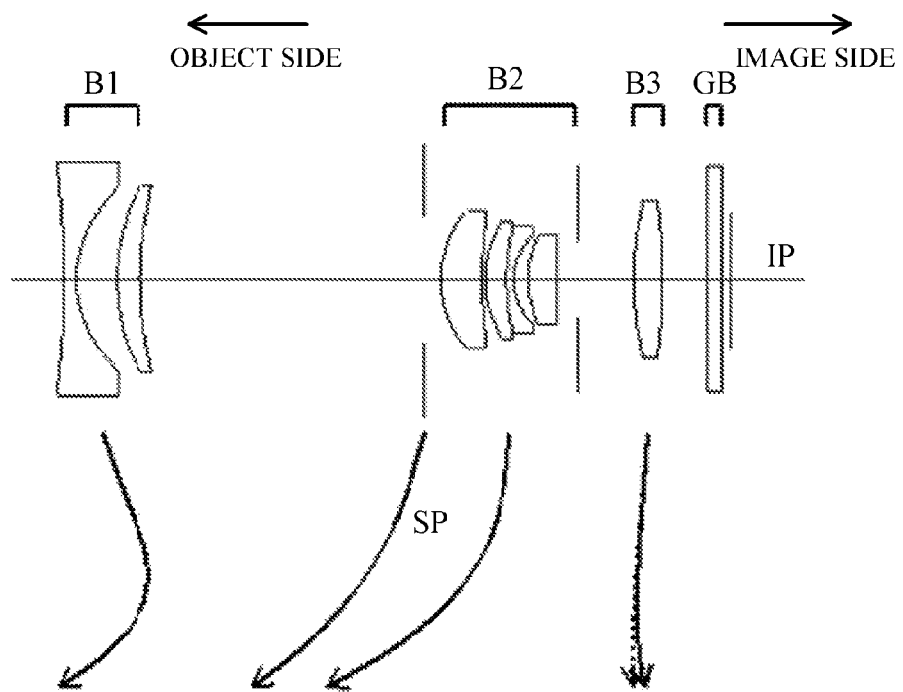
FIG. 4 is a cross-sectional view of lenses in focus states at infinity and in the close range in a zoom lens of Embodiment 1.
Figure 5:
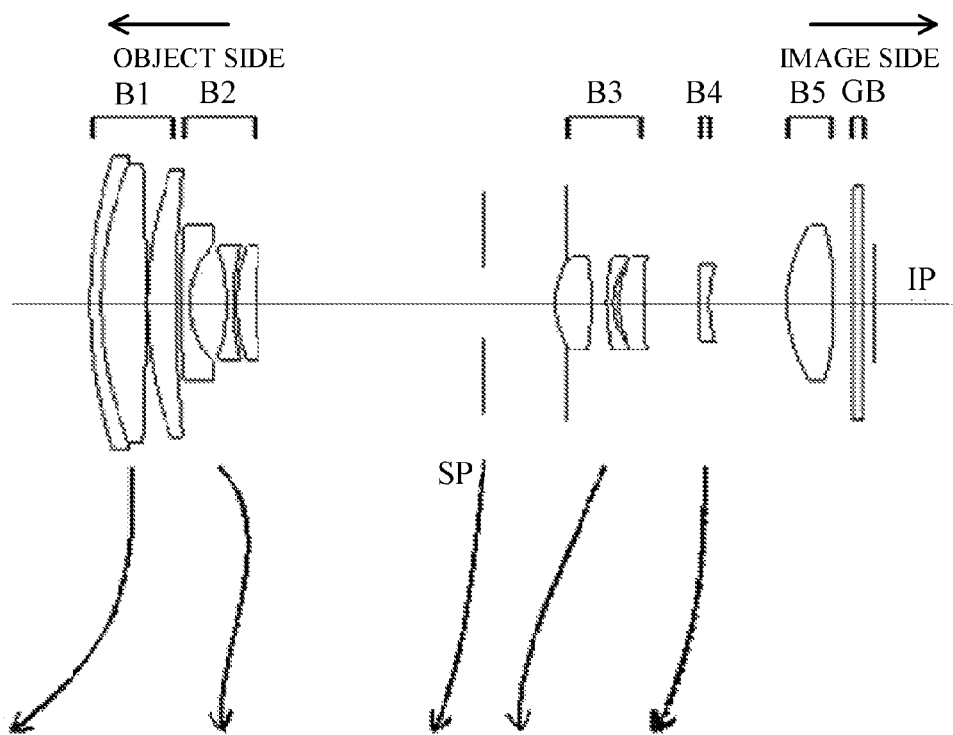
FIG. 5 is a cross-sectional view of lenses in focus states at infinity and in the close range in a zoom lens of Embodiment 2.
Figure 6:
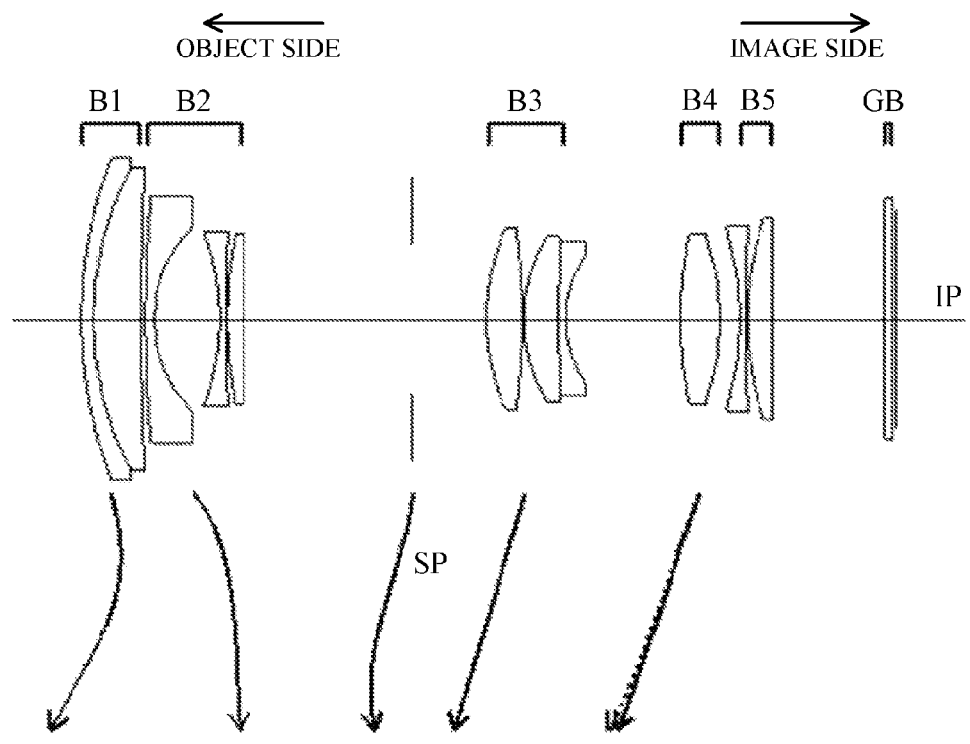
FIG. 6 is a cross-sectional view of lenses in focus states at infinity and in the close range in a zoom lens of Embodiment 3.
Figure 7:
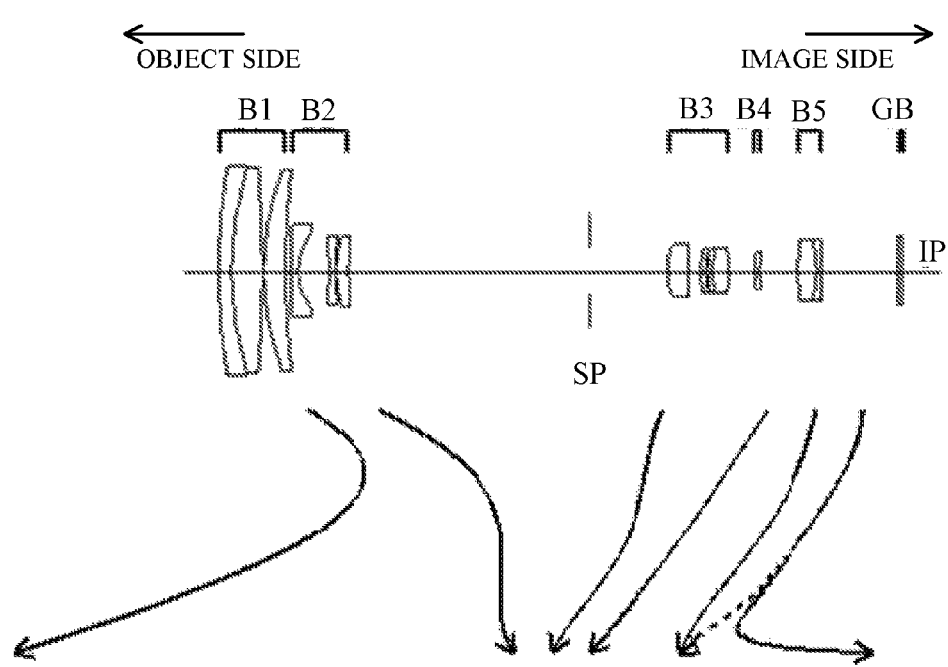
FIG. 7 is a cross-sectional view of lenses in focus states at infinity and in the close range in a zoom lens of Embodiment 4.
Figure 8:
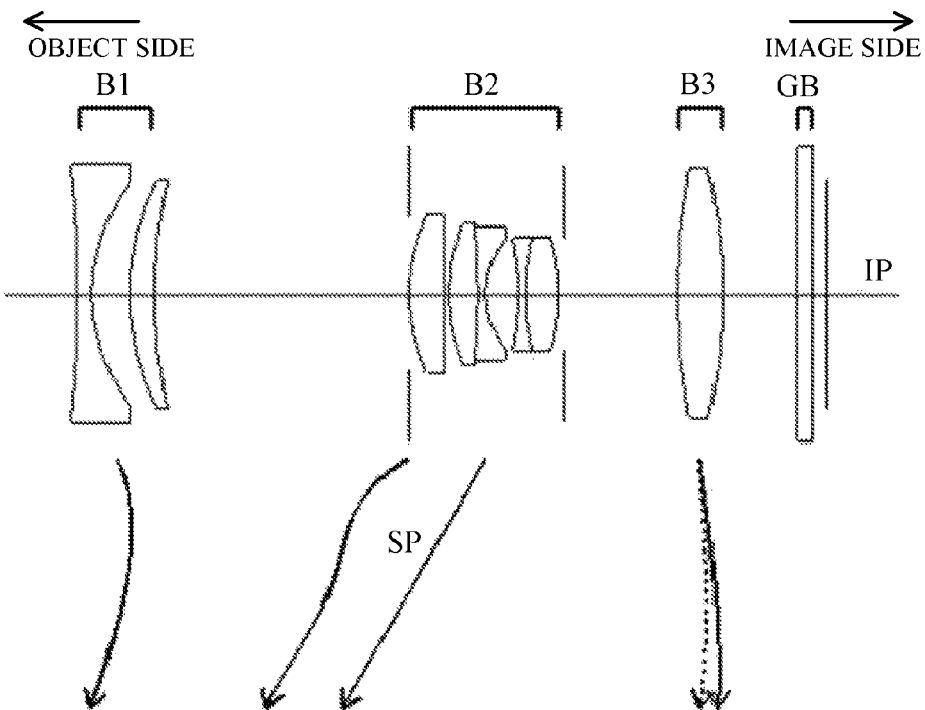
FIG. 8 is a cross-sectional view of lenses in focus states at infinity and in the close range in a zoom lens of Embodiment 5.
Figure 9:
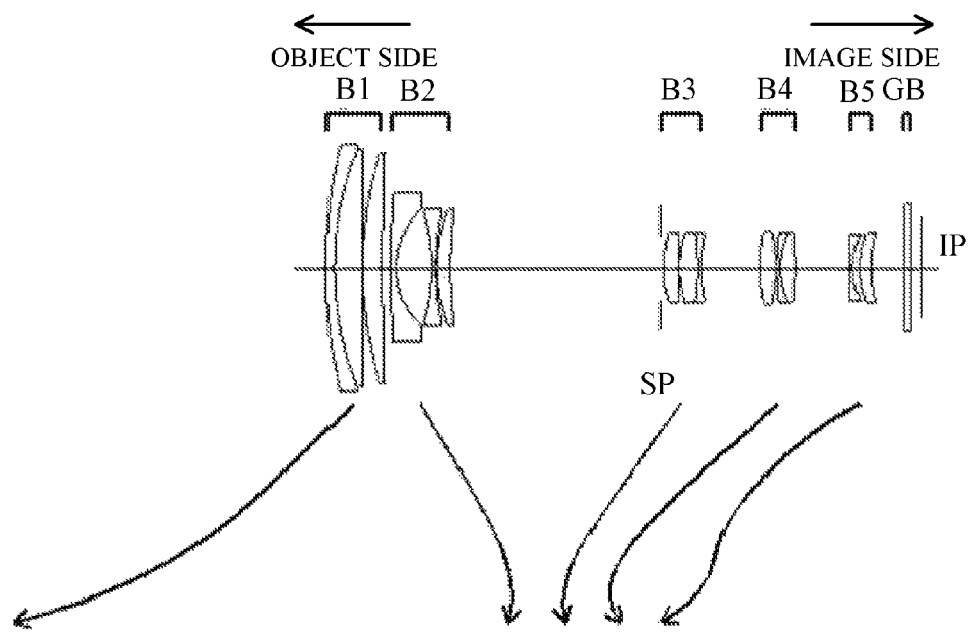
FIG. 9 is a cross-sectional view of lenses in focus states at infinity and in the close range in a zoom lens of Embodiment 6.

In FIG. 4 (Embodiment 1) and FIG. 8 (Embodiment 5), symbol B1 is a first lens unit having a negative refractive power, symbol B2 is a second lens unit having a positive refractive power, and symbol B3 is a positive refractive power. Symbol SP is an aperture stop, symbol GB is a glass block, and symbol IP is an image plane. In FIG. 5 (Embodiment 2) and FIG. (Embodiment 4), symbol B1 is a first lens unit having a positive refractive power, symbol B2 is a second lens unit having a negative refractive power, and symbol B3 is a positive refractive power. Symbol B4 is a fourth lens unit having a negative refractive power, and symbol B5 is a fifth lens unit having a positive refractive power. In FIG. 6 (Embodiment 3) and FIG. 9 (Embodiment 6), symbol B1 is a first lens unit having a positive refractive power, symbol B2 is a second lens unit having a negative refractive power, and symbol B3 is a positive refractive power. Symbol B4 is a fourth lens unit having a positive refractive power, and symbol B5 is a fifth lens unit having a negative refractive power.

In zooming from the wide-angle end to the telephoto end in Embodiments 1 and 5, as indicated by arrows in FIGS. 4 and 8, the first lens unit B1 moves toward the object side and the second lens unit B2 moves to perform the zooming. Further, the third lens unit B3 moves toward the object side to correct the fluctuation of the image plane due to the magnification variation. In Embodiment 2, in zooming from the wide-angle end to the telephoto end, as indicated by arrows in FIG. 5, the first lens unit B1 to the fourth lens unit B4 move to perform the zooming. Further, the fourth lens unit B4 moves toward the image side to correct the fluctuation of the image plane due to the magnification variation. In Embodiment 4, in zooming from the wide-angle end to the telephoto end, as indicated by arrows in FIG. 7, the first lens unit B1 to the fifth lens unit B5 move to perform the zooming. Further, the fifth lens unit B5 moves toward the object side to correct the fluctuation of the image plane due to the magnification variation. In Embodiment 6, in zooming from the wide-angle end to the telephoto end, as indicated by arrows in FIG. 9, the first lens unit B1 to the fifth lens unit B5 move to perform the zooming. Further, the fifth lens unit B5 moves toward the image side to correct the fluctuation of the image plane due to the magnification variation. The image plane IP corresponds to an imaging plane of a solid-state image sensor (photoelectric conversion element) such as a CCD sensor and a CMOS sensor when used as an image capturing optical system of a video camera, a digital camera, or the like, and it corresponds to a film surface when used as an image capturing optical system of a silver salt film camera.

Figure 10A:
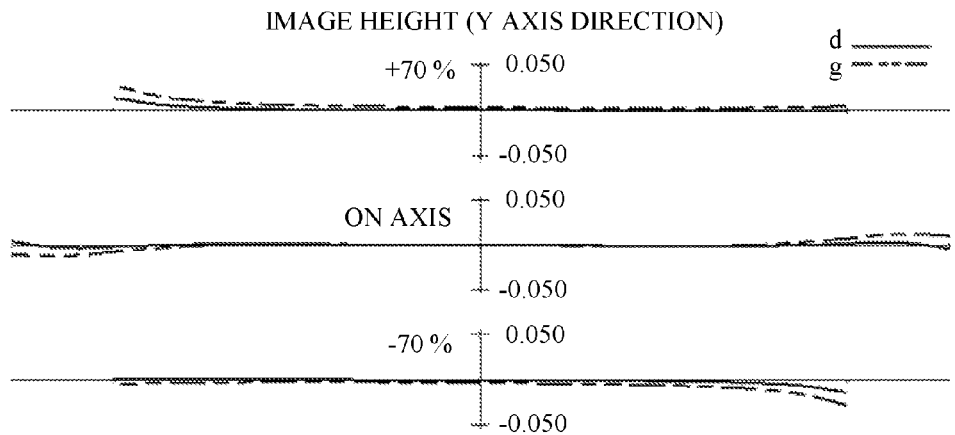
FIGS. 10A to 10C are lateral aberration diagrams of the zoom lens in the focus states at infinity at the wide-angle end, the middle zoom position, and the telephoto end in Embodiment 1.
Figure 10B:
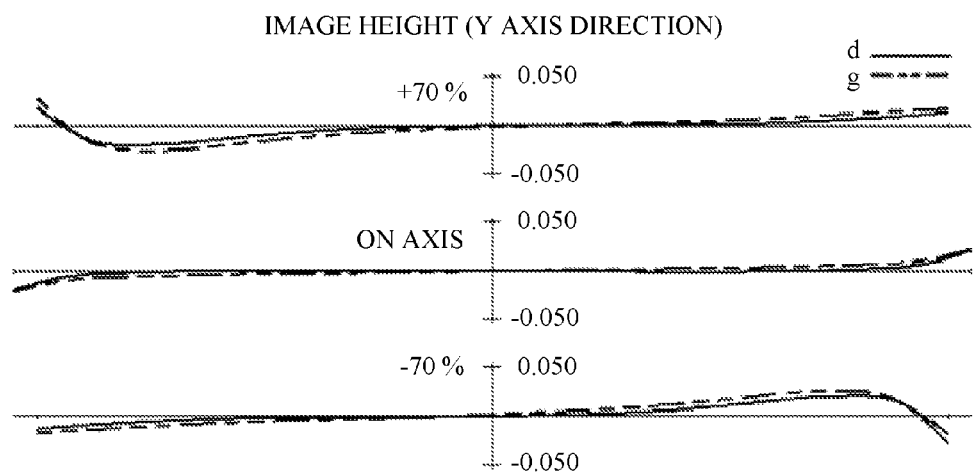
Figure 10C:
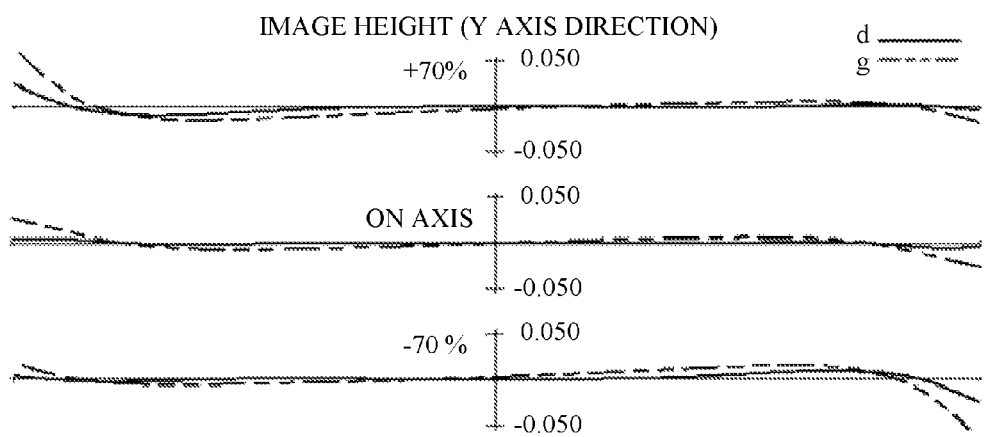

FIGS. 10A to 10C relate to the zoom lens of Embodiment 1, and FIG. 10A is a lateral aberration diagram of a focus state at infinity at the wide-angle end. FIG. 10B is a lateral aberration diagram of the focus state at infinity at the middle zoom position. FIG. 10C is a lateral aberration diagram of the focus state at infinity at the telephoto end.

Figure 11A:
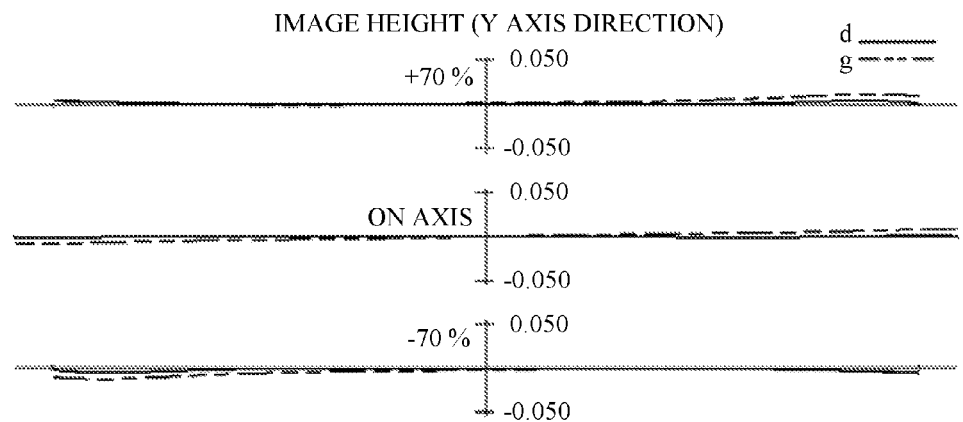
FIGS. 11A to 11C are lateral aberration diagrams of the zoom lens in the focus states at infinity at the wide-angle end, the middle zoom position, and the telephoto end in Embodiment 2.
Figure 11B:
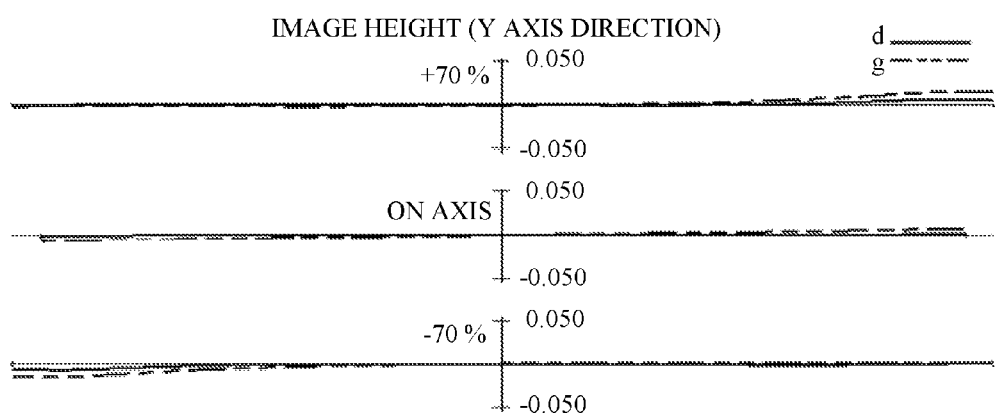
Figure 11C:
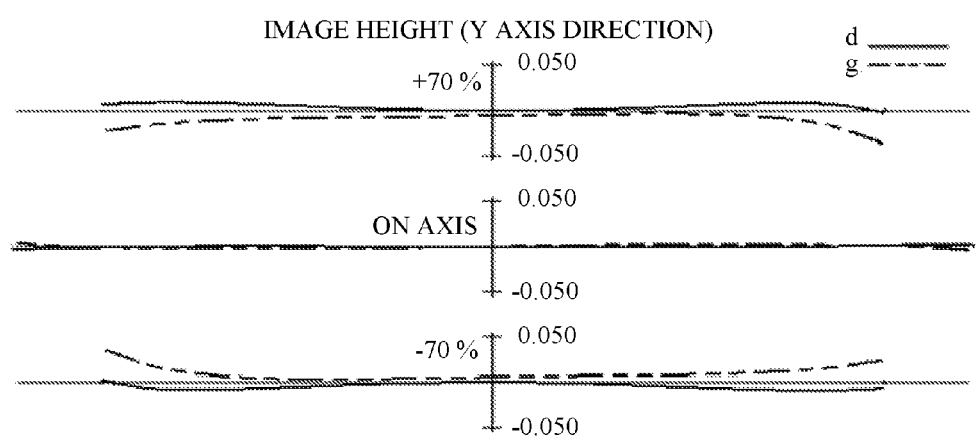

FIGS. 11A to 11C relate to the zoom lens of Embodiment 2, and FIG. 11A is a lateral aberration diagram of the focus state at infinity at the wide-angle end. FIG. 11B is a lateral aberration diagram of the focus state at infinity at the middle zoom position. FIG. 11C is a lateral aberration diagram of the focus state at infinity at the telephoto end.

Figure 12A:
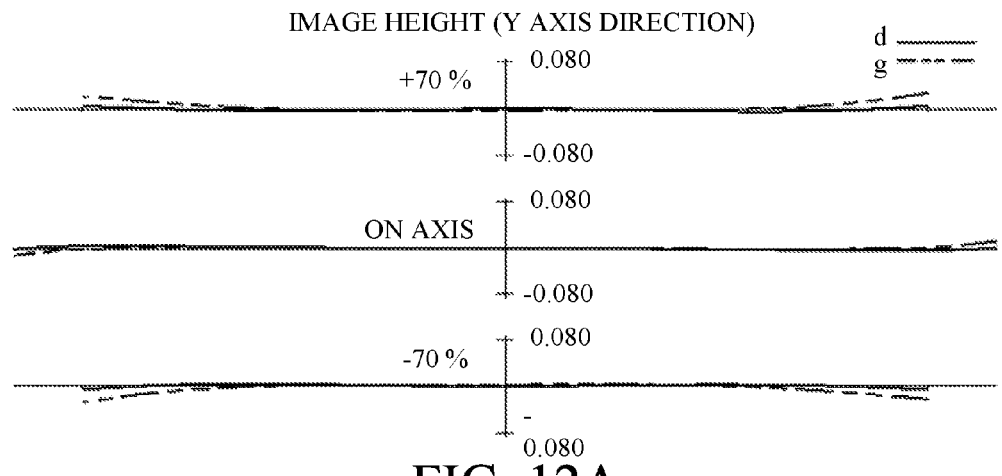
FIGS. 12A to 12C are lateral aberration diagrams of the zoom lens in the focus states at infinity at the wide-angle end, the middle zoom position, and the telephoto end in Embodiment 3.
Figure 12B:
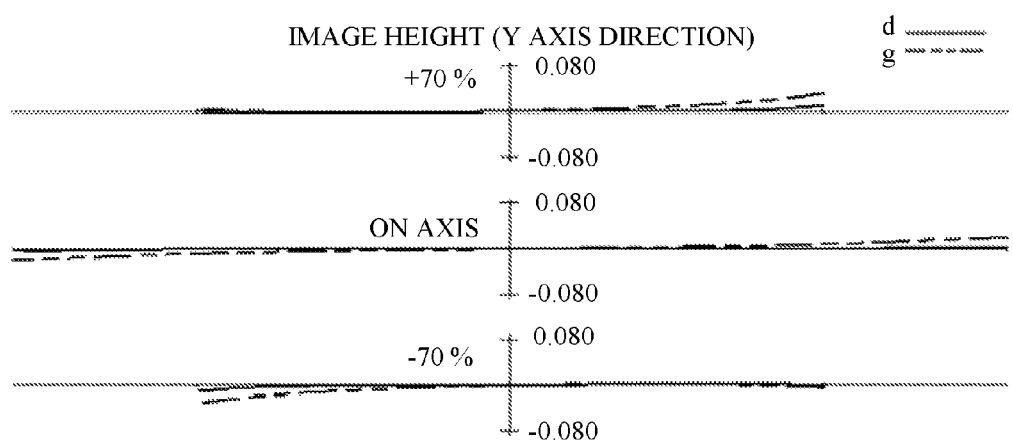
Figure 12C:
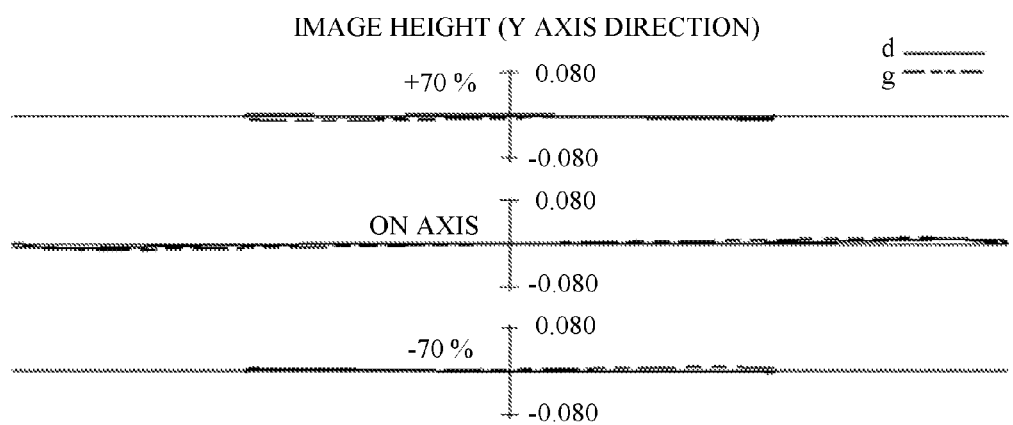

FIGS. 12A to 12C relate to the zoom lens of Embodiment 3, and FIG. 12A is a lateral aberration diagram of the focus state at infinity at the wide-angle end. FIG. 12B is a lateral aberration diagram of the focus state at infinity at the middle zoom position. FIG. 12C is a lateral aberration diagram of the focus state at infinity at the telephoto end.

Figure 13A:
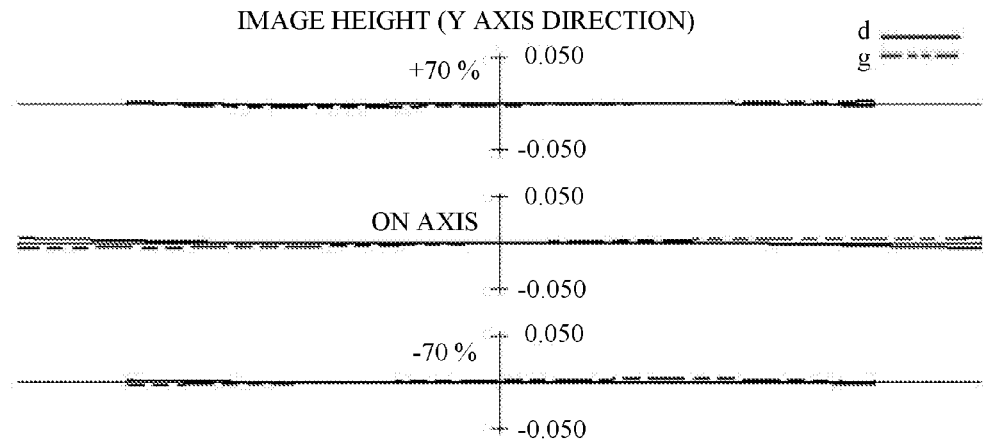
FIGS. 13A to 13C are lateral aberration diagrams of the zoom lens in the focus states at infinity at the wide-angle end, the middle zoom position, and the telephoto end in Embodiment 4.
Figure 13B:
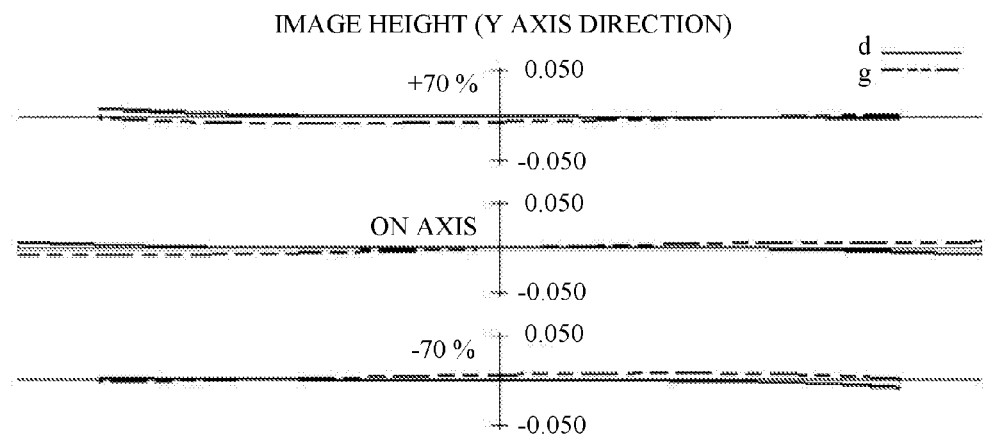
Figure 13C:
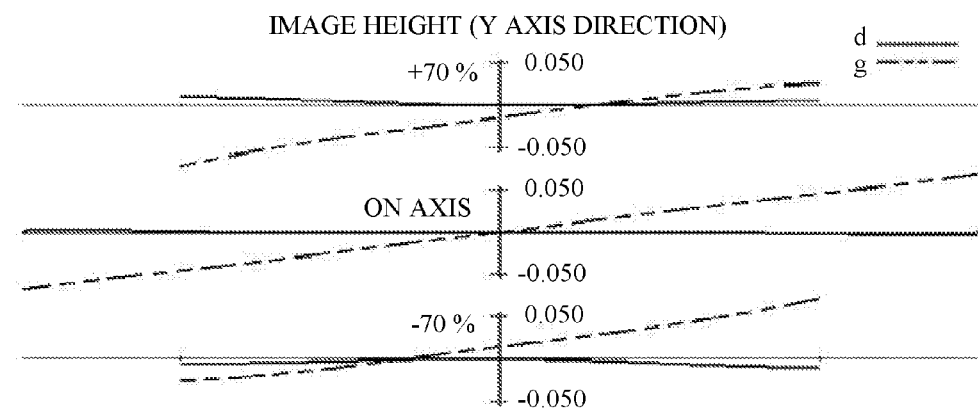

FIGS. 13A to 13C relate to the zoom lens of Embodiment 4, and FIG. 13A is a lateral aberration diagram of the focus state at infinity at the wide-angle end. FIG. 13B is a lateral aberration diagram of the focus state at infinity at the middle zoom position. FIG. 13C is a lateral aberration diagram of the focus state at infinity at the telephoto end.

Figure 14A:
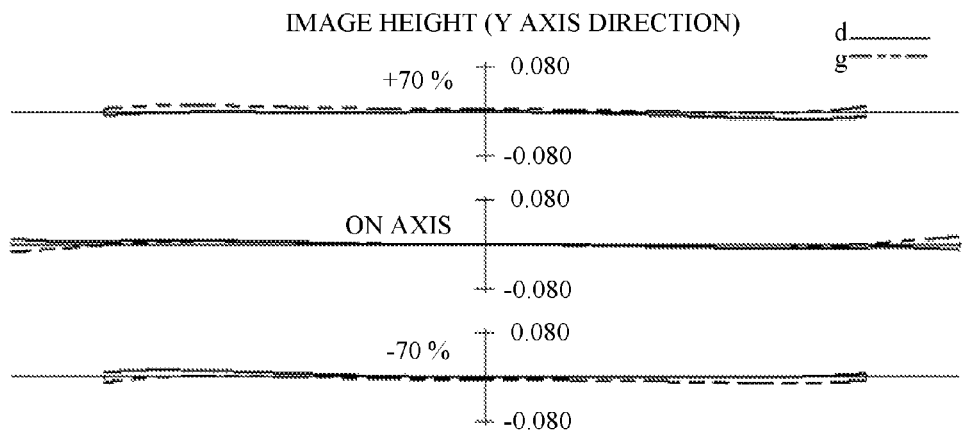
FIGS. 14A to 14C are lateral aberration diagrams of the zoom lens in the focus states at infinity at the wide-angle end, the middle zoom position, and the telephoto end in Embodiment 5.
Figure 14B:
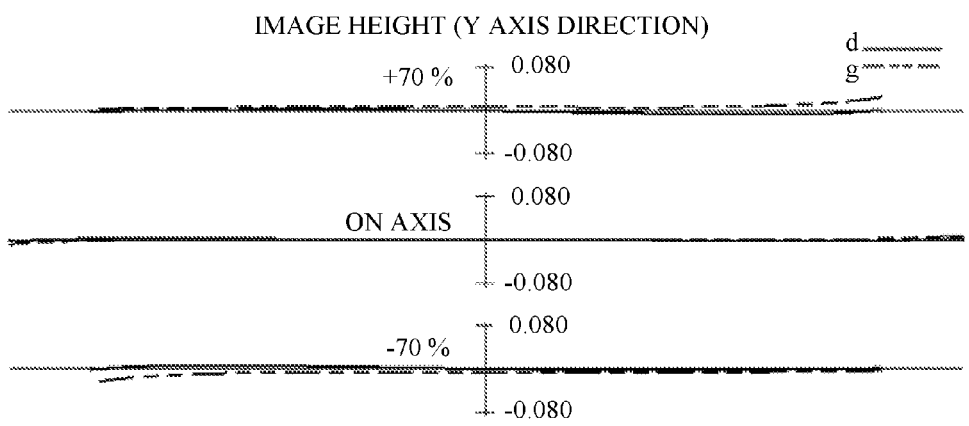
Figure 14C:
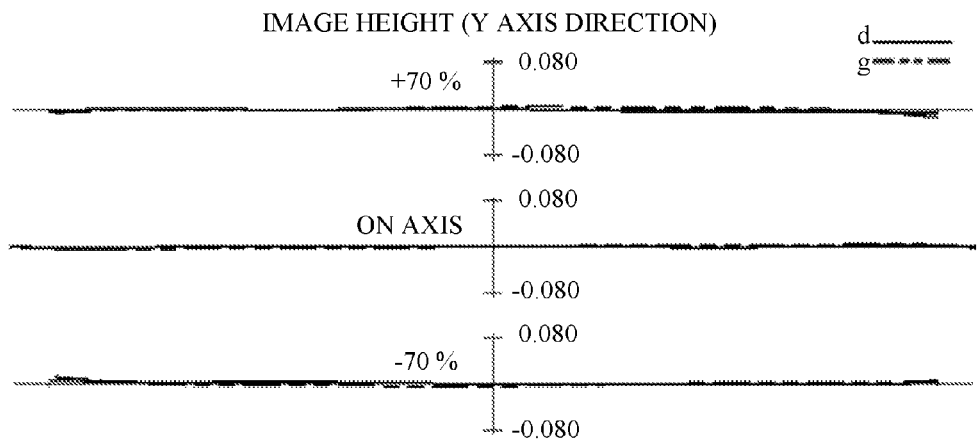

FIGS. 14A to 14C relate to the zoom lens of Embodiment 5, and FIG. 14A is a lateral aberration diagram of the focus state at infinity at the wide-angle end. FIG. 14B is a lateral aberration diagram of the focus state at infinity at the middle zoom position. FIG. 14C is a lateral aberration diagram of the focus state at infinity at the telephoto end.

Figure 15A:
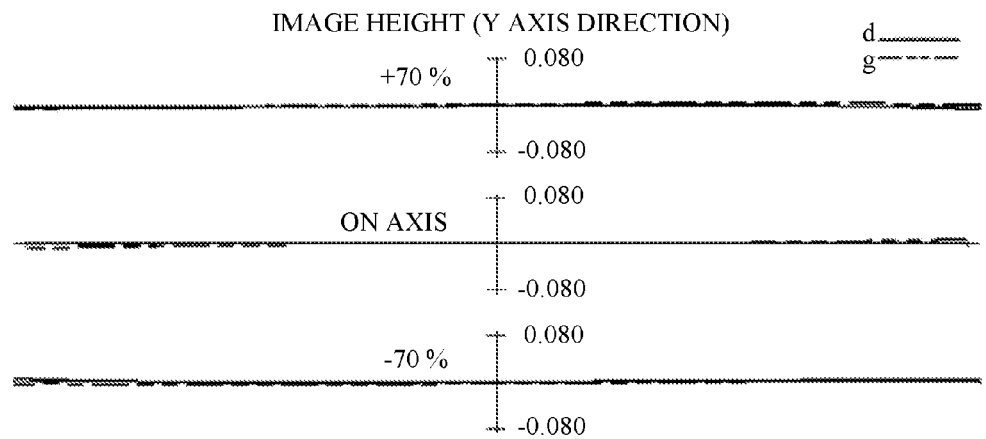
FIGS. 15A to 15C are lateral aberration diagrams of the zoom lens in the focus states at infinity at the wide-angle end, the middle zoom position, and the telephoto end in Embodiment 6.
Figure 15B:
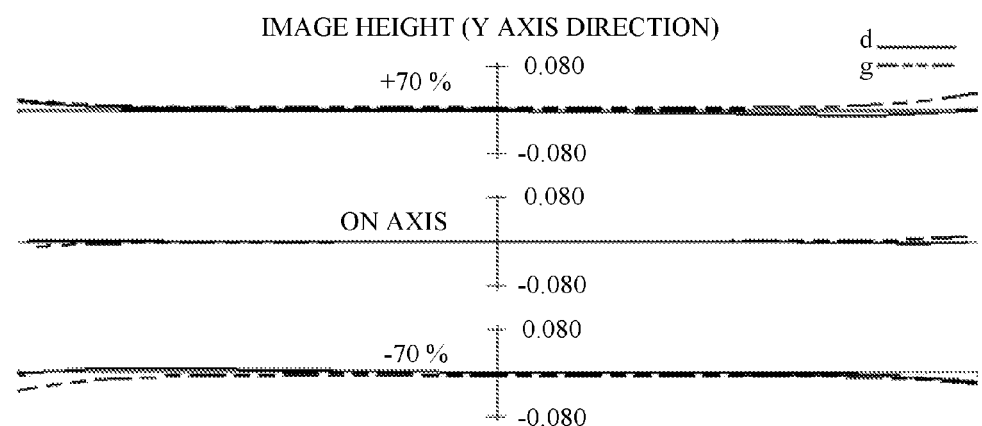
Figure 15C:
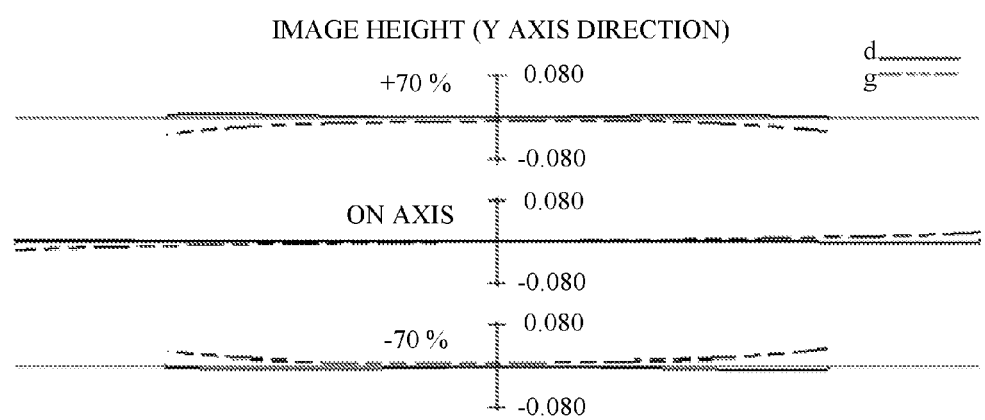

FIGS. 15A to 15C relate to the zoom lens of Embodiment 6, and FIG. 15A is a lateral aberration diagram of a focus state at infinity at the wide-angle end. FIG. 15B is a lateral aberration diagram of the focus state at infinity at the middle zoom position. FIG. 15C is a lateral aberration diagram of the focus state at infinity at the telephoto end.

Figure 16A:
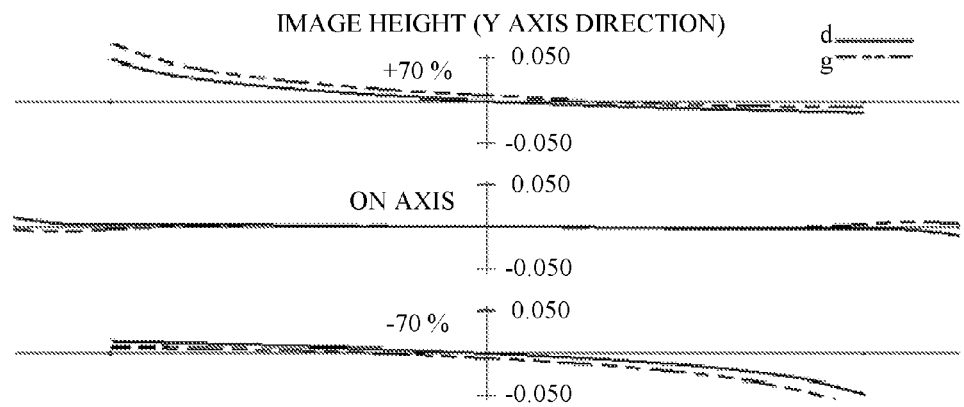
FIGS. 16A to 16C are lateral aberration diagrams of the zoom lens in the focus states of the close range at the wide-angle end, the middle zoom position, and the telephoto end in Embodiment 1.
Figure 16B:
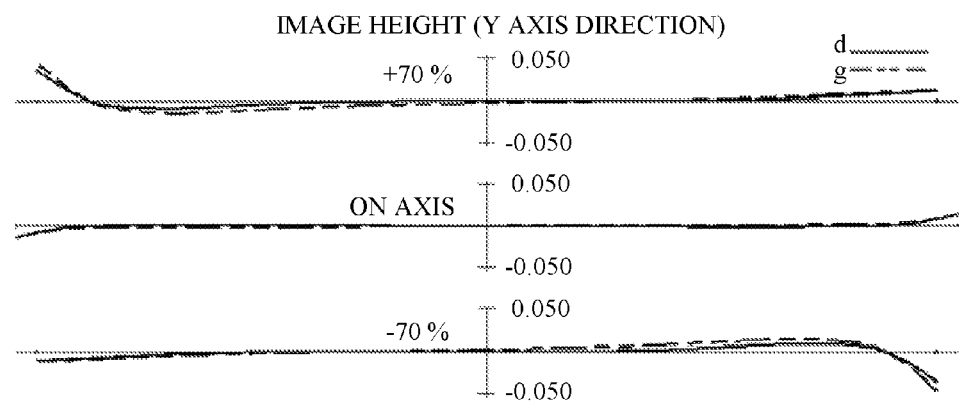
Figure 16C:
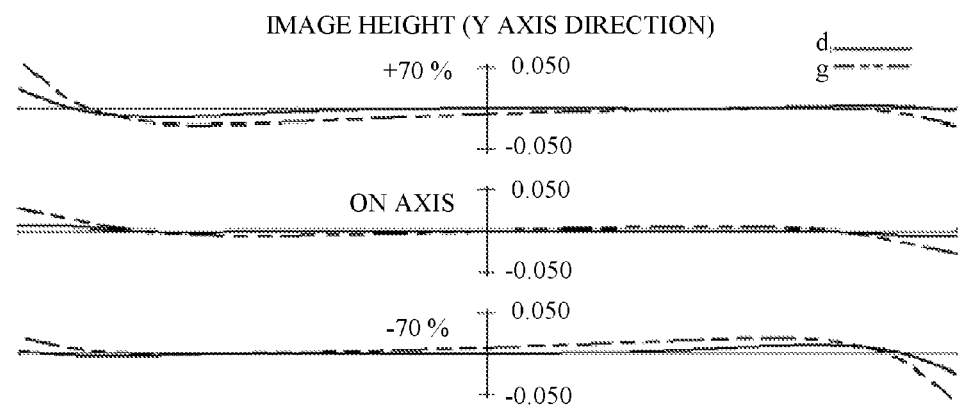

FIGS. 16A to 16C relate to the zoom lens of Embodiment 1, and FIG. 16A is a lateral aberration diagram of a focus state in the close range at the wide-angle end. FIG. 16B is a lateral aberration diagram of the focus state in the close range at the middle zoom position. FIG. 16C is a lateral aberration diagram of the focus state in the close range at the telephoto end.

Figure 17A:
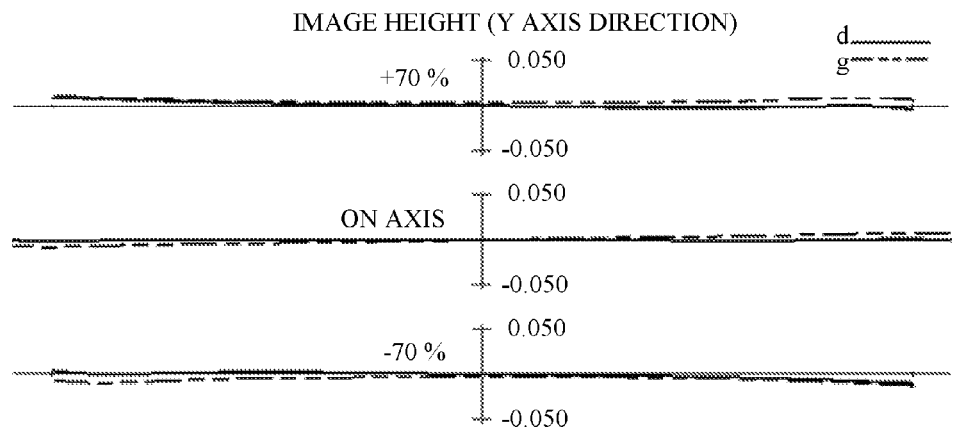
FIGS. 17A to 17C are lateral aberration diagrams of the zoom lens in the focus states of the close range at the wide-angle end, the middle zoom position, and the telephoto end in Embodiment 2.
Figure 17B:
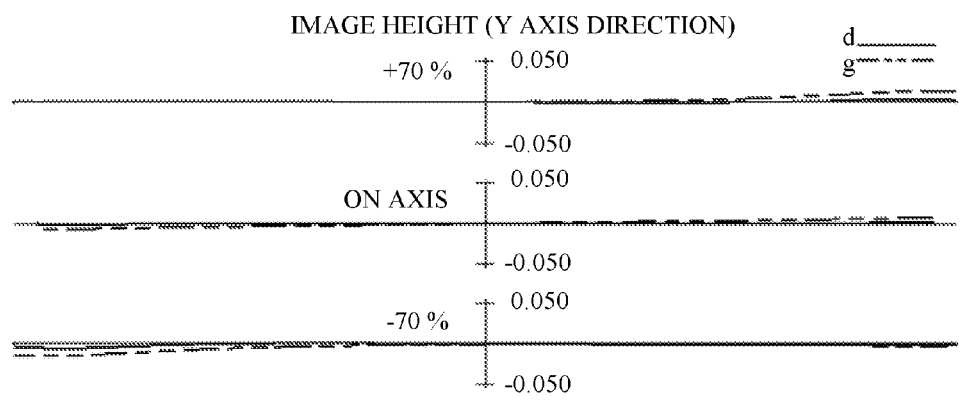
Figure 17C:
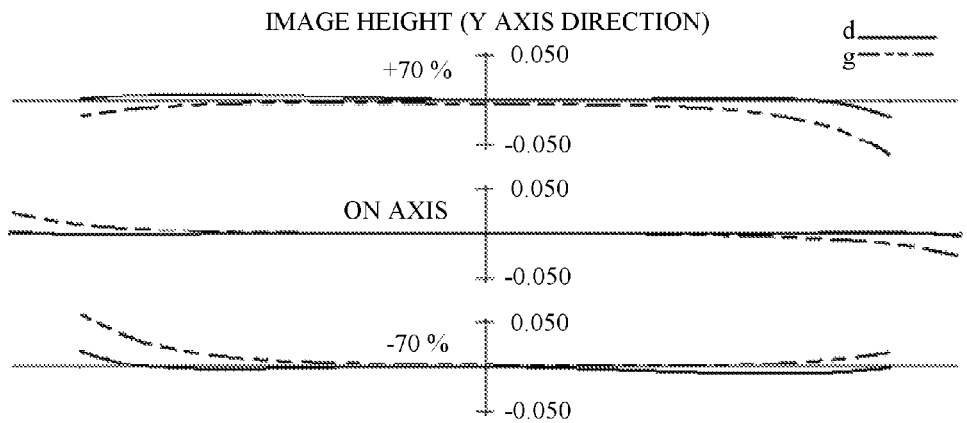

FIGS. 17A to 17C relate to the zoom lens of Embodiment 2, and FIG. 17A is a lateral aberration diagram of the focus state in the close range at the wide-angle end. FIG. 17B is a lateral aberration diagram of the focus state in the close range at the middle zoom position. FIG. 17C is a lateral aberration diagram of the focus state in the close range at the telephoto end.

Figure 18A:
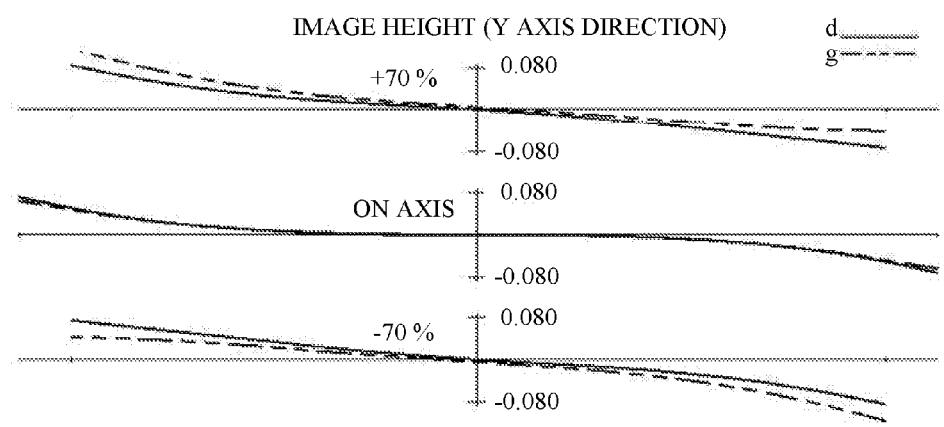
FIGS. 18A to 18C are lateral aberration diagrams of the zoom lens in the focus states of the close range at the wide-angle end, the middle zoom position, and the telephoto end in Embodiment 3.
Figure 18B:
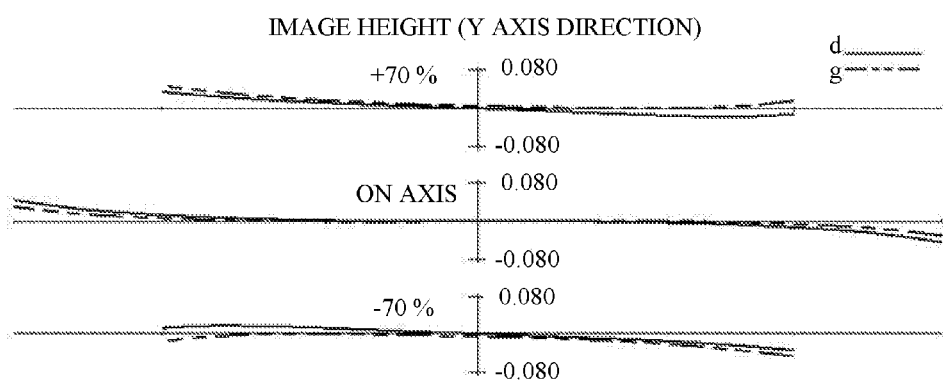
Figure 18C:
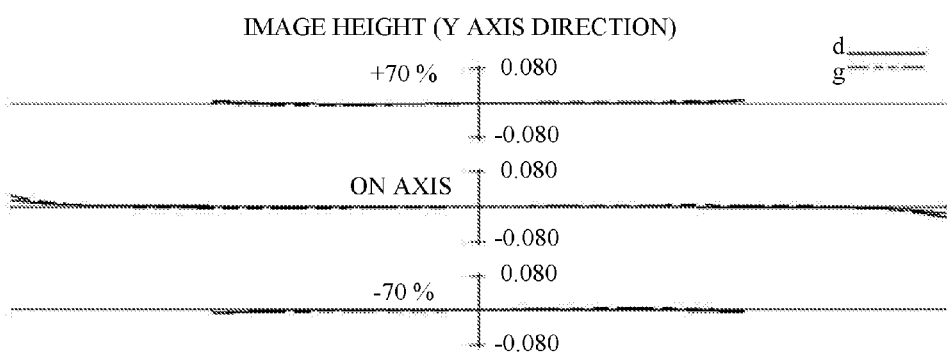

FIGS. 18A to 18C relate to the zoom lens of Embodiment 3, and FIG. 18A is a lateral aberration diagram of the focus state in the close range at the wide-angle end. FIG. 18B is a lateral aberration diagram of the focus state in the close range at the middle zoom position. FIG. 18C is a lateral aberration diagram of the focus state in the close range at the telephoto end.

Figure 19A:
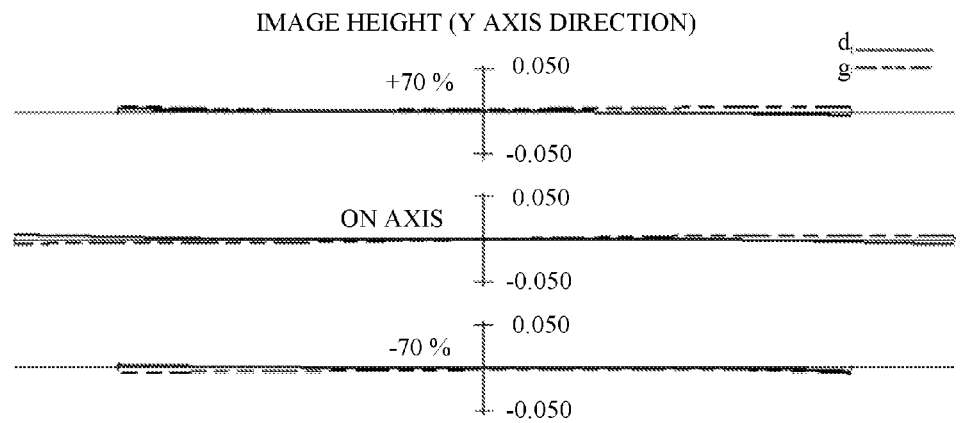
FIGS. 19A to 19C are lateral aberration diagrams of the zoom lens in the focus states of the close range at the wide-angle end, the middle zoom position, and the telephoto end in Embodiment 4.
Figure 19B:
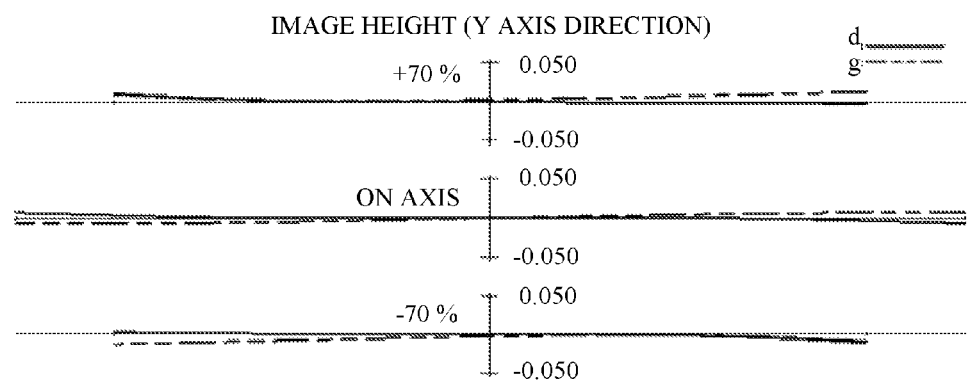
Figure 19C:
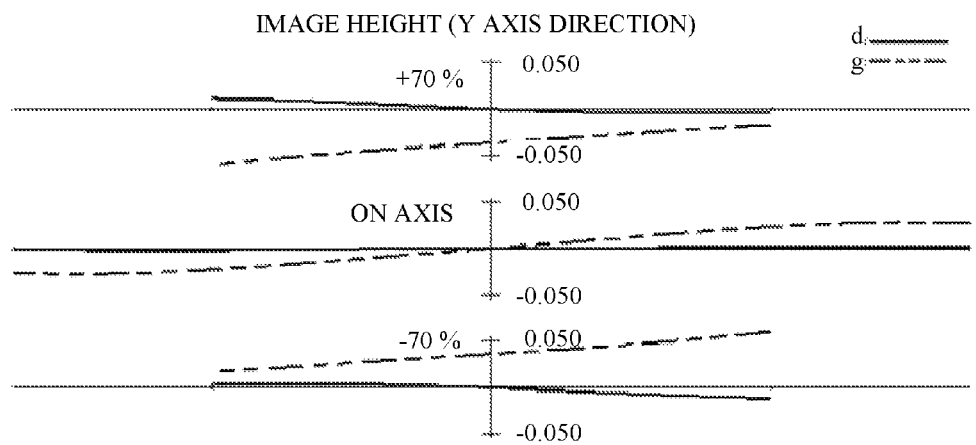

FIGS. 19A to 19C relate to the zoom lens of Embodiment 4, and FIG. 19A is a lateral aberration diagram of the focus state in the close range at the wide-angle end. FIG. 19B is a lateral aberration diagram of the focus state in the close range at the middle zoom position. FIG. 19C is a lateral aberration diagram of the focus state in the close range at the telephoto end.

Figure 20A:
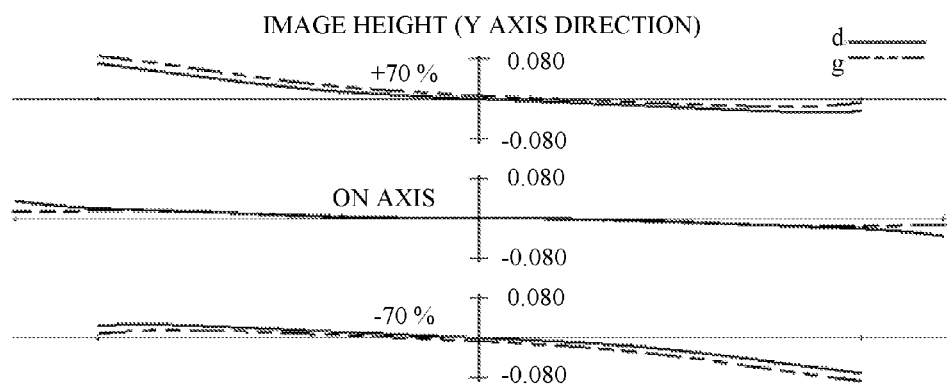
FIGS. 20A to 20C are lateral aberration diagrams of the zoom lens in the focus states of the close range at the wide-angle end, the middle zoom position, and the telephoto end in Embodiment 5.
Figure 20B:
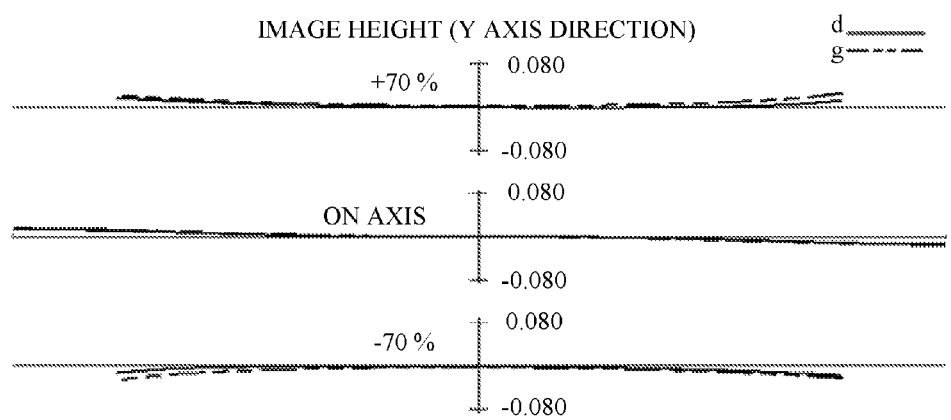
Figure 20C:
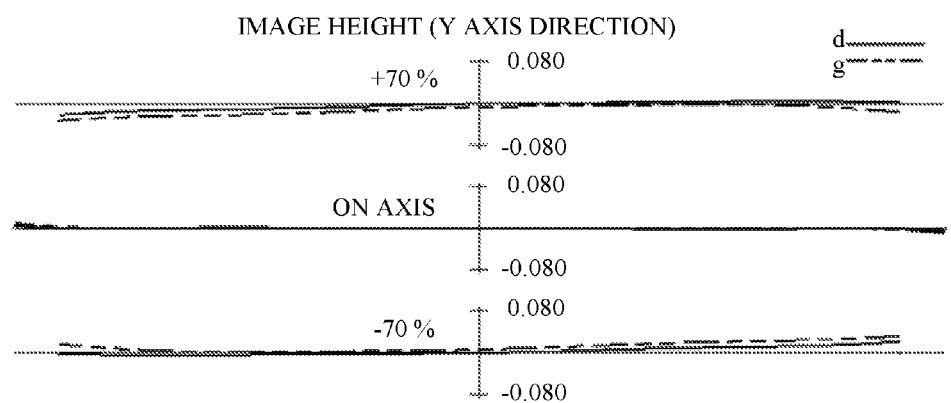

FIGS. 20A to 20C relate to the zoom lens of Embodiment 5, and FIG. 20A is a lateral aberration diagram of the focus state in the close range at the wide-angle end. FIG. 20B is a lateral aberration diagram of the focus state in the close range at the middle zoom position. FIG. 20C is a lateral aberration diagram of the focus state in the close range at the telephoto end.

Figure 21A:
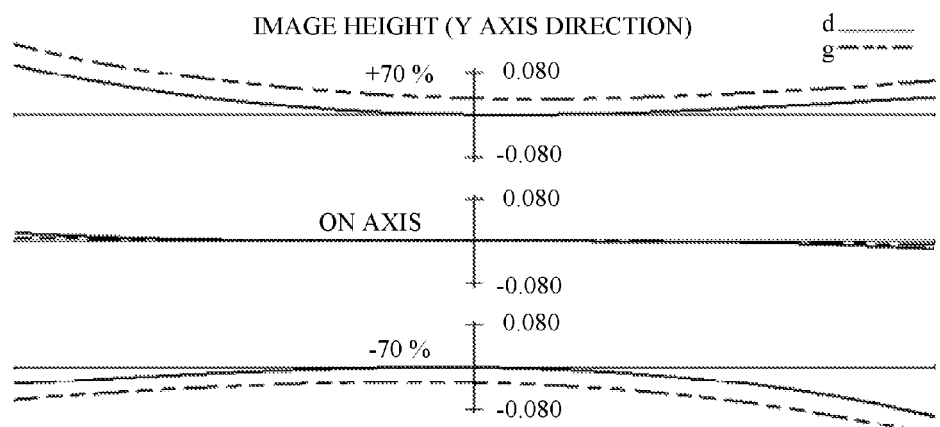
FIGS. 21A to 21C are lateral aberration diagrams of the zoom lens in the focus states of the close range at the wide-angle end, the middle zoom position, and the telephoto end in Embodiment 6.
Figure 21B:
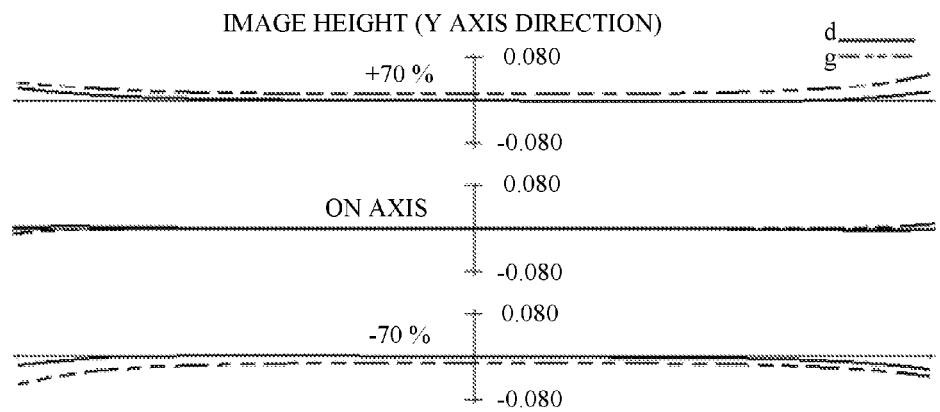
Figure 21C:
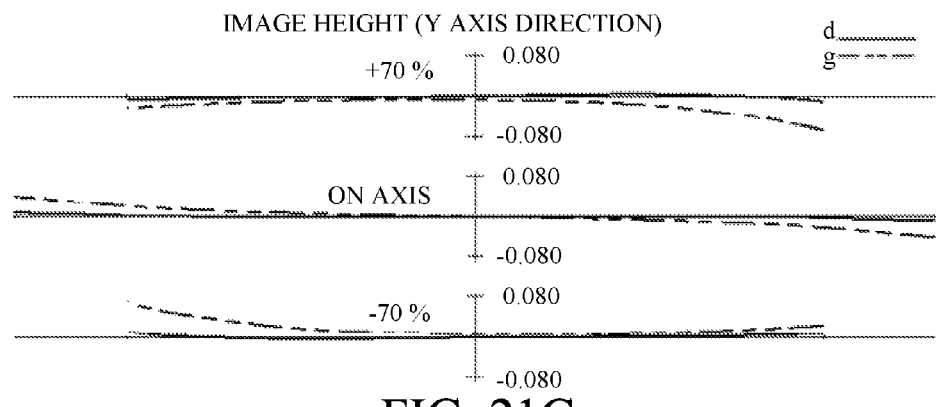

FIGS. 21A to 21C relate to the zoom lens of Embodiment 6, and FIG. 21A is a lateral aberration diagram of the focus state in the close range at the wide-angle end. FIG. 21B is a lateral aberration diagram of the focus state in the close range at the middle zoom position. FIG. 21C is a lateral aberration diagram of the focus state in the close range at the telephoto end.

Figure 22A:
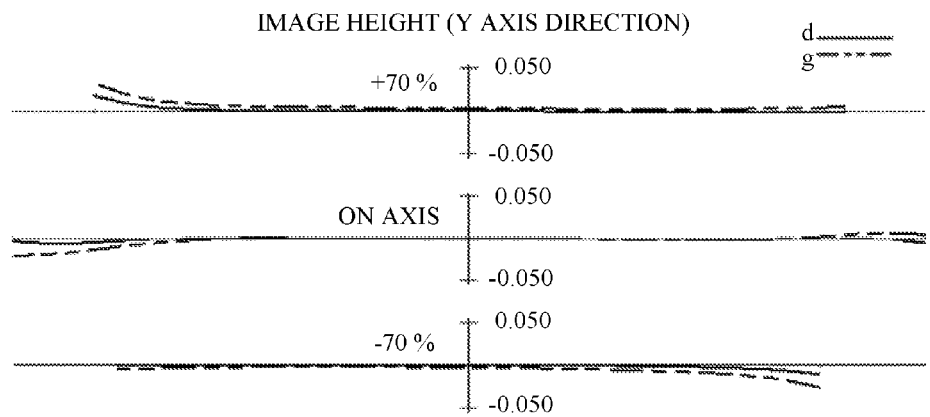
FIGS. 22A to 22C are lateral aberration diagrams of the zoom lens during image stabilization in the focus states at infinity at the wide-angle end, the middle zoom position, and the telephoto end in Embodiment 1.
Figure 22B:
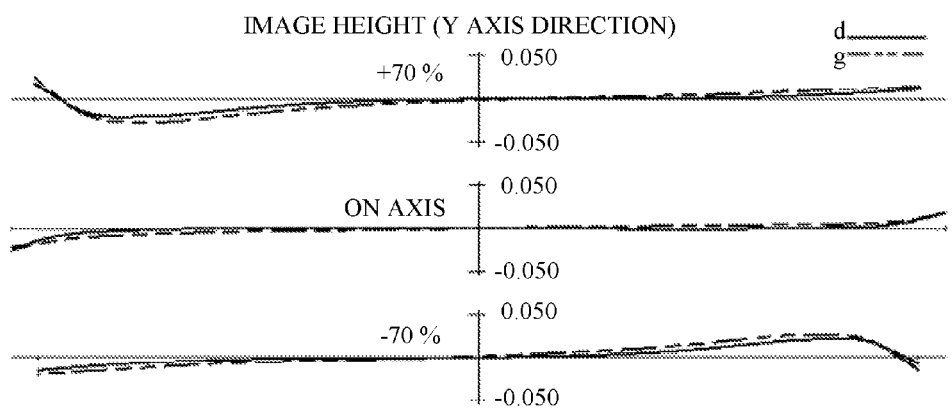
Figure 22C:
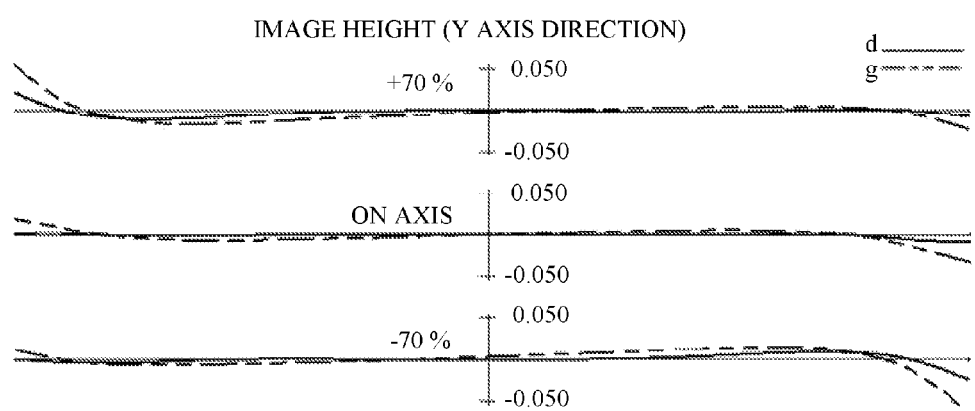

FIGS. 22A to 22C relate to the zoom lens of Embodiment 1, and FIG. 22A is a lateral aberration diagram of the focus state at infinity at the wide-angle end during the image stabilization. FIG. 22B is a lateral aberration diagram of the focus state at infinity at the middle zoom position during the image stabilization. FIG. 22C is a lateral aberration diagram of the focus state at infinity at the telephoto end during the image stabilization.

Figure 23A:
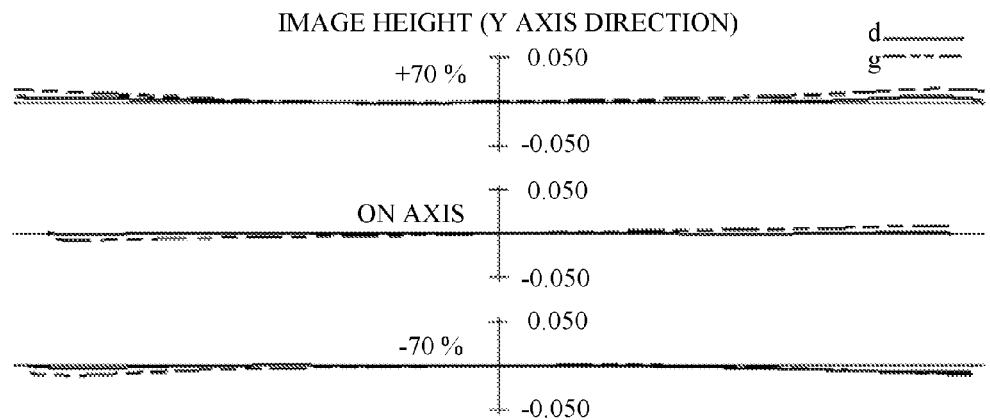
FIGS. 23A to 23C are lateral aberration diagrams of the zoom lens during image stabilization in the focus states at infinity at the wide-angle end, the middle zoom position, and the telephoto end in Embodiment 2.
Figure 23B:
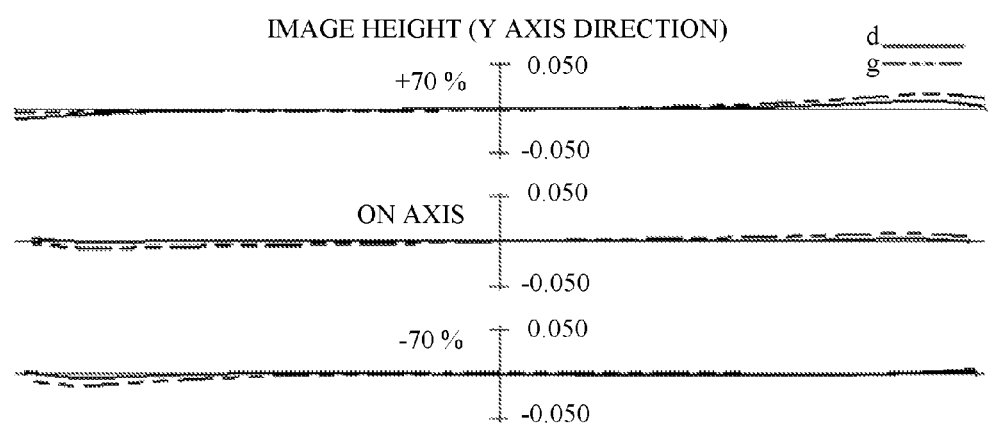
Figure 23C:
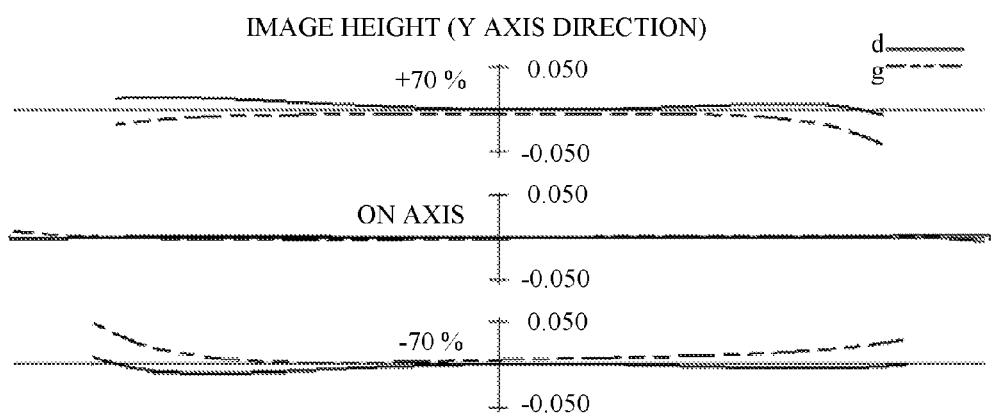

FIGS. 23A to 23C relate to the zoom lens of Embodiment 2, and FIG. 23A is a lateral aberration diagram of the focus state at infinity at the wide-angle end during the image stabilization. FIG. 23B is a lateral aberration diagram of the focus state at infinity at the middle zoom position during the image stabilization. FIG. 23C is a lateral aberration diagram of the focus state at infinity at the telephoto end during the image stabilization.

Figure 24A:
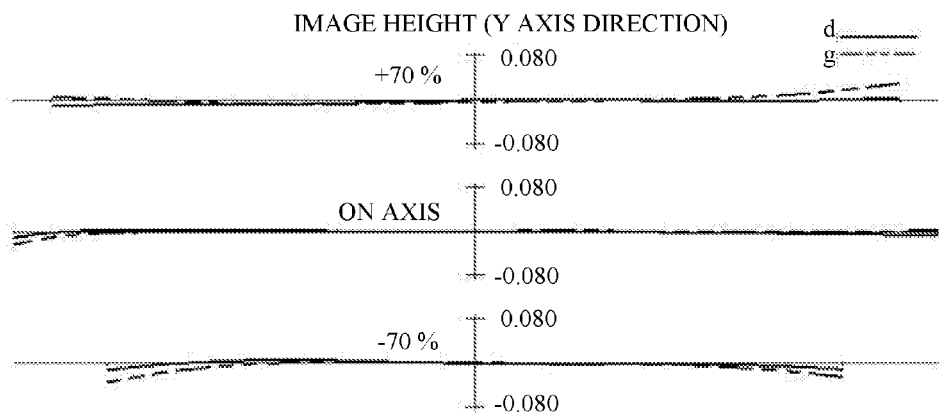
FIGS. 24A to 24C are lateral aberration diagrams of the zoom lens during image stabilization in the focus states at infinity at the wide-angle end, the middle zoom position, and the telephoto end in Embodiment 3.
Figure 24B:
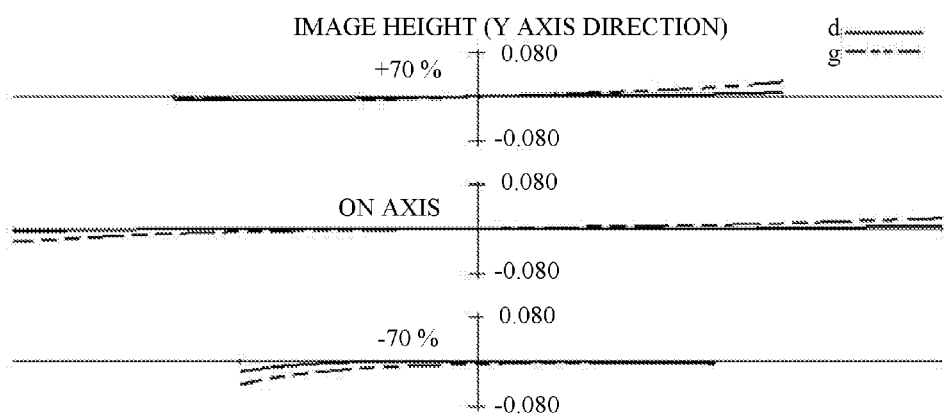
Figure 24C:
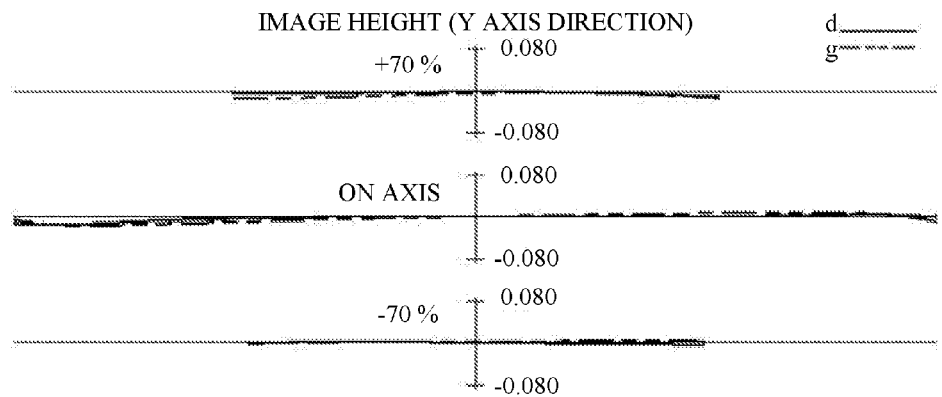

FIGS. 24A to 24C relate to the zoom lens of Embodiment 3, and FIG. 24A is a lateral aberration diagram of the focus state at infinity at the wide-angle end during the image stabilization. FIG. 24B is a lateral aberration diagram of the focus state at infinity at the middle zoom position during the image stabilization. FIG. 24C is a lateral aberration diagram of the focus state at infinity at the telephoto end during the image stabilization.

Figure 25A:
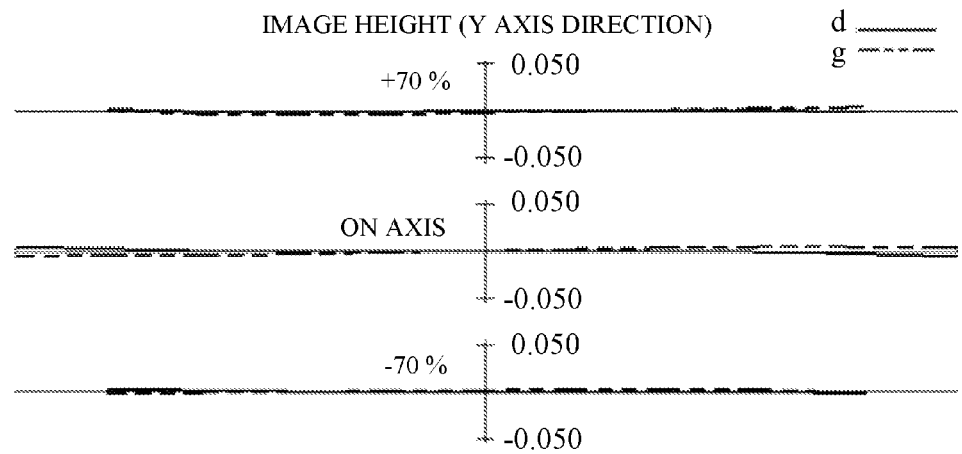
FIGS. 25A to 25C are lateral aberration diagrams of the zoom lens during image stabilization in the focus states at infinity at the wide-angle end, the middle zoom position, and the telephoto end in Embodiment 4.
Figure 25B:
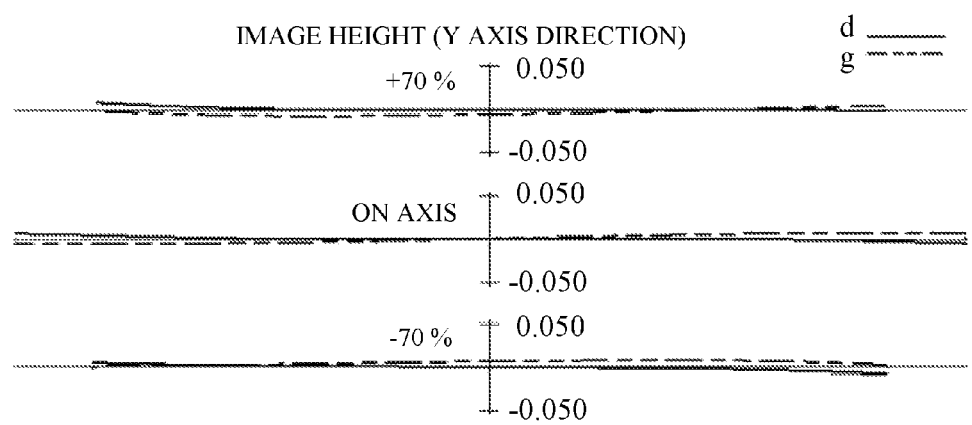
Figure 25C:
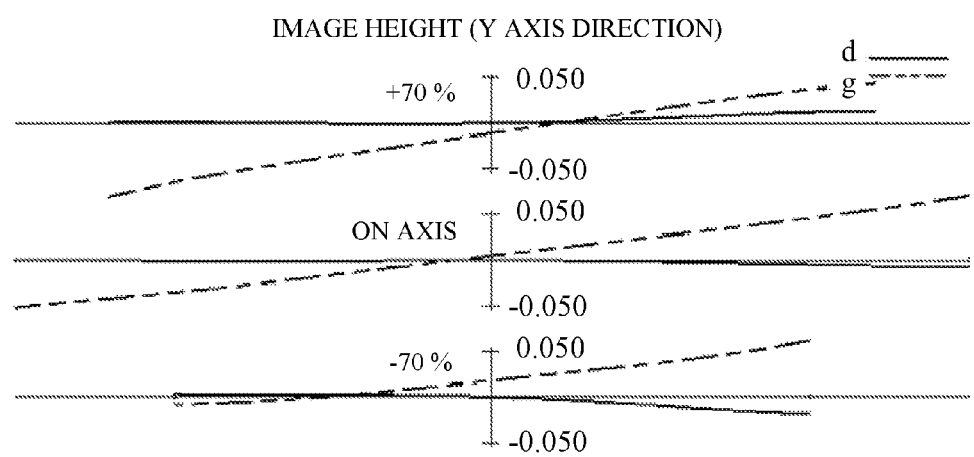

FIGS. 25A to 25C relate to the zoom lens of Embodiment 4, and FIG. 25A is a lateral aberration diagram of the focus state at infinity at the wide-angle end during the image stabilization. FIG. 25B is a lateral aberration diagram of the focus state at infinity at the middle zoom position during the image stabilization. FIG. 25C is a lateral aberration diagram of the focus state at infinity at the telephoto end during the image stabilization.

Figure 26A:
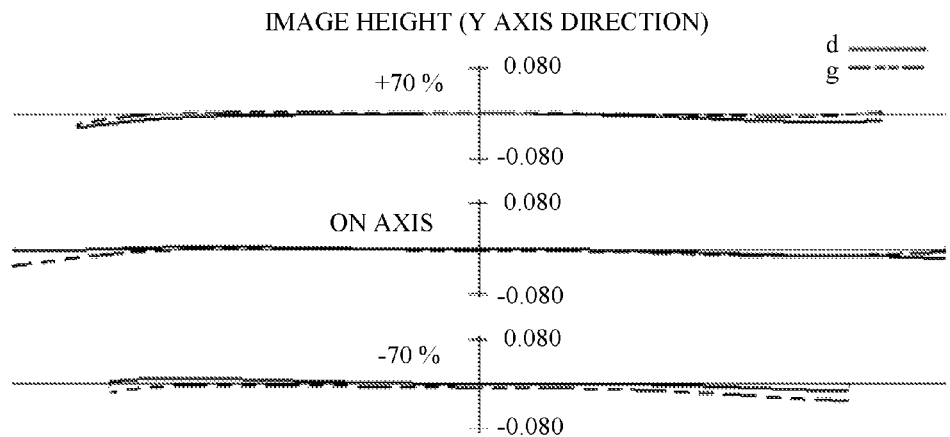
FIGS. 26A to 26C are lateral aberration diagrams of the zoom lens during image stabilization in the focus states at infinity at the wide-angle end, the middle zoom position, and the telephoto end in Embodiment 5.
Figure 26B:
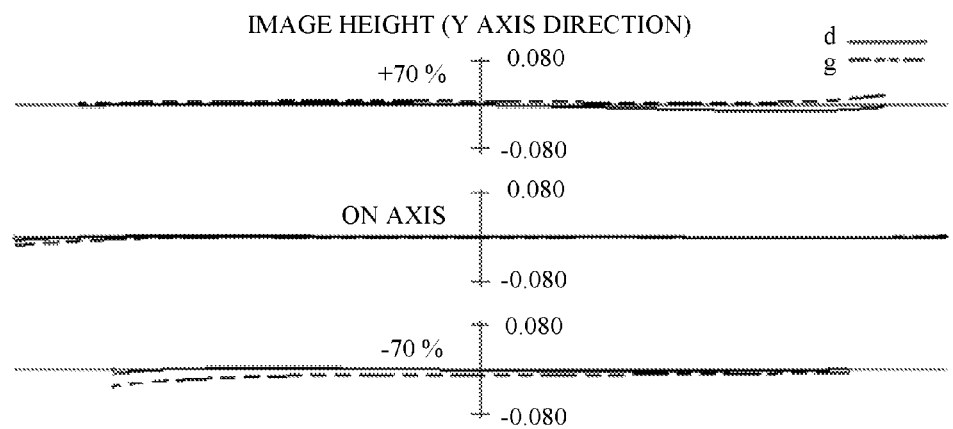
Figure 26C:
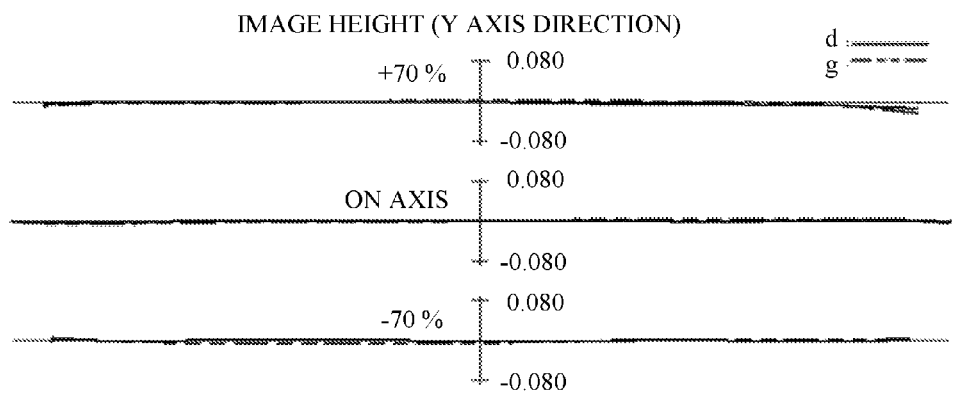

FIGS. 26A to 26C relate to the zoom lens of Embodiment 5, and FIG. 26A is a lateral aberration diagram of the focus state at infinity at the wide-angle end during the image stabilization. FIG. 26B is a lateral aberration diagram of the focus state at infinity at the middle zoom position during the image stabilization. FIG. 26C is a lateral aberration diagram of the focus state at infinity at the telephoto end during the image stabilization.

Figure 27A:
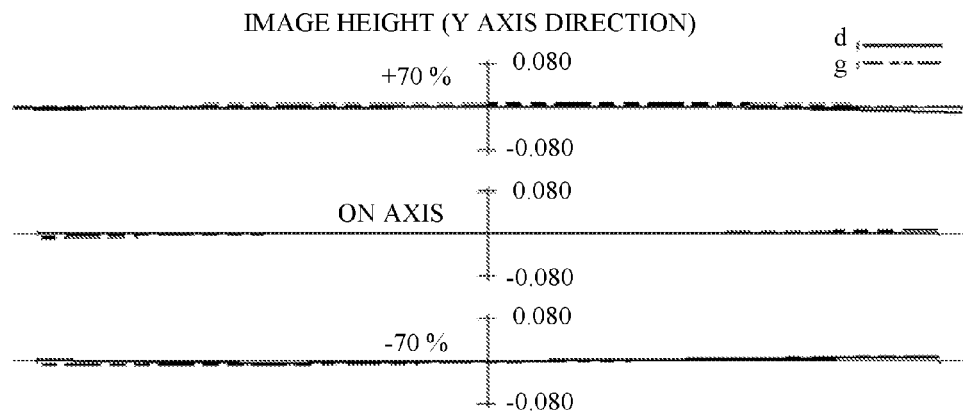
FIGS. 27A to 27C are lateral aberration diagrams of the zoom lens during image stabilization in the focus states at infinity at the wide-angle end, the middle zoom position, and the telephoto end in Embodiment 6.
Figure 27B:
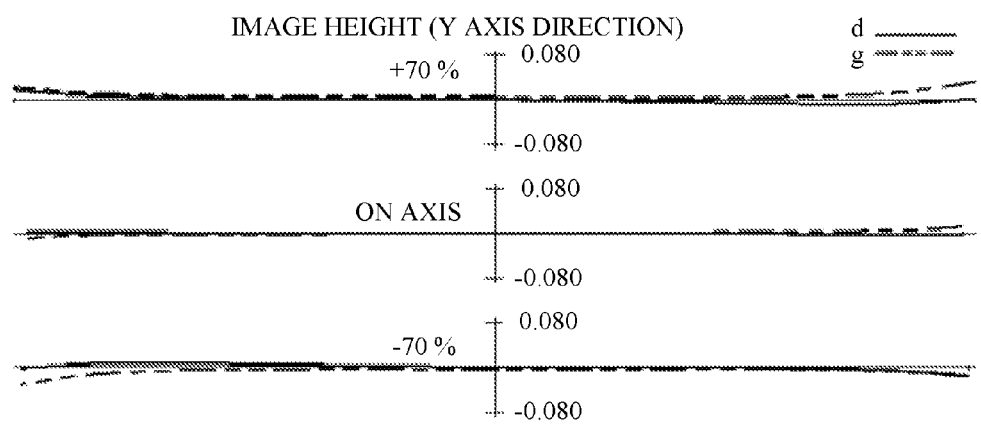
Figure 27C:
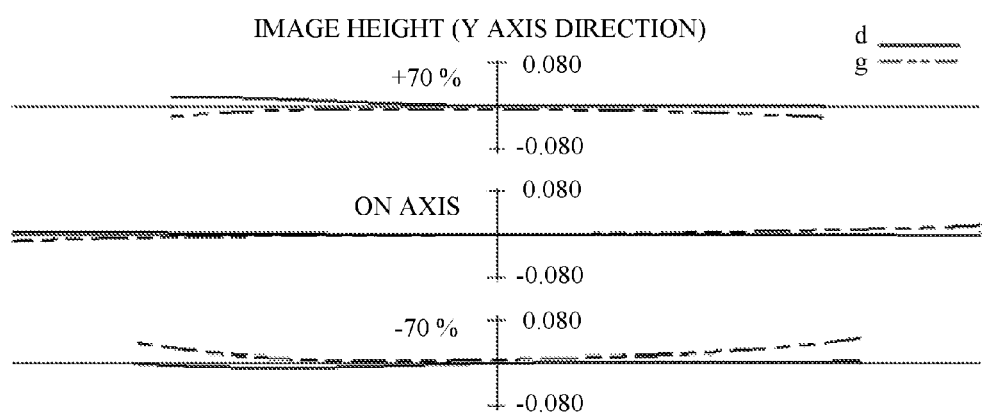

FIGS. 27A to 27C relate to the zoom lens of Embodiment 6, and FIG. 27A is a lateral aberration diagram of the focus state at infinity at the wide-angle end during the image stabilization. FIG. 27B is a lateral aberration diagram of the focus state at infinity at the middle zoom position during the image stabilization. FIG. 27C is a lateral aberration diagram of the focus state at infinity at the telephoto end during the image stabilization.

Figure 28A:
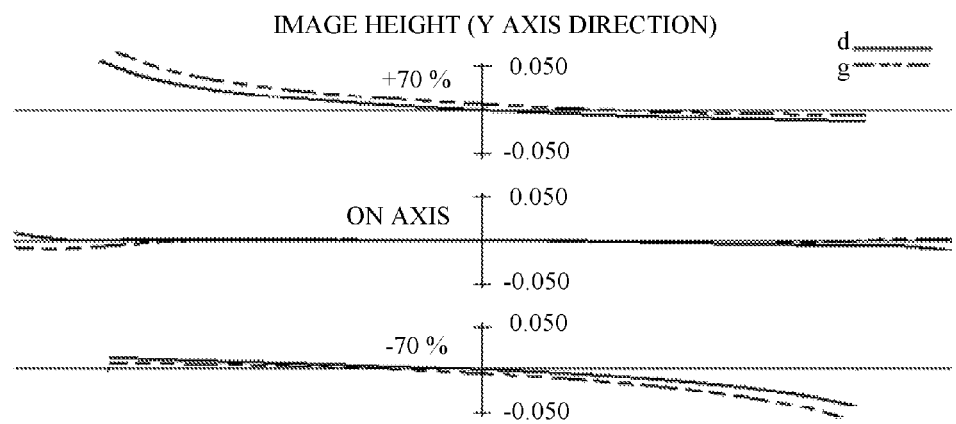
FIGS. 28A to 28C are lateral aberration diagrams of the zoom lens during image stabilization in the focus states of the close range at the wide-angle end, the middle zoom position, and the telephoto end in Embodiment 1.
Figure 28B:
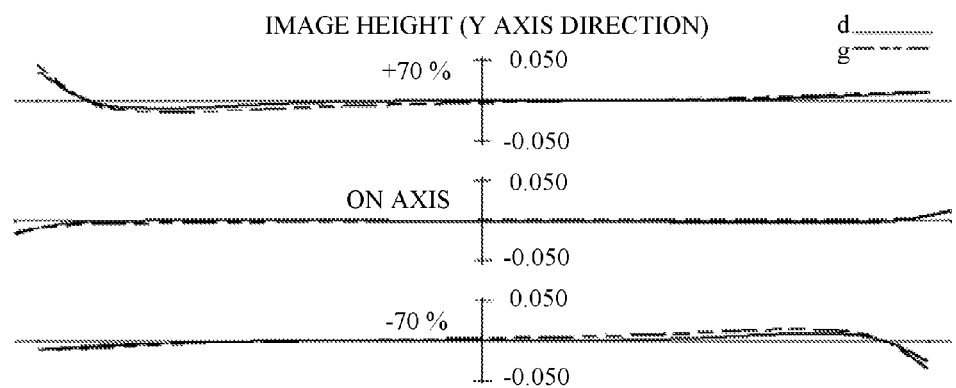
Figure 28C:
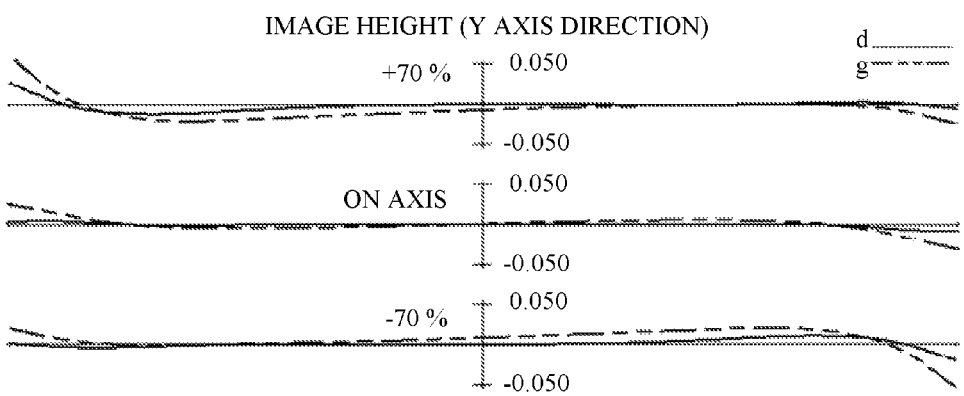

FIGS. 28A to 28C relate to the zoom lens of Embodiment 1, and FIG. 28A is a lateral aberration diagram of the focus state in the close range at the wide-angle end during the image stabilization. FIG. 28B is a lateral aberration diagram of the focus state in the close range at the middle zoom position during the image stabilization. FIG. 28C is a lateral aberration diagram of the focus state in the close range at the telephoto end during the image stabilization.

Figure 29A:
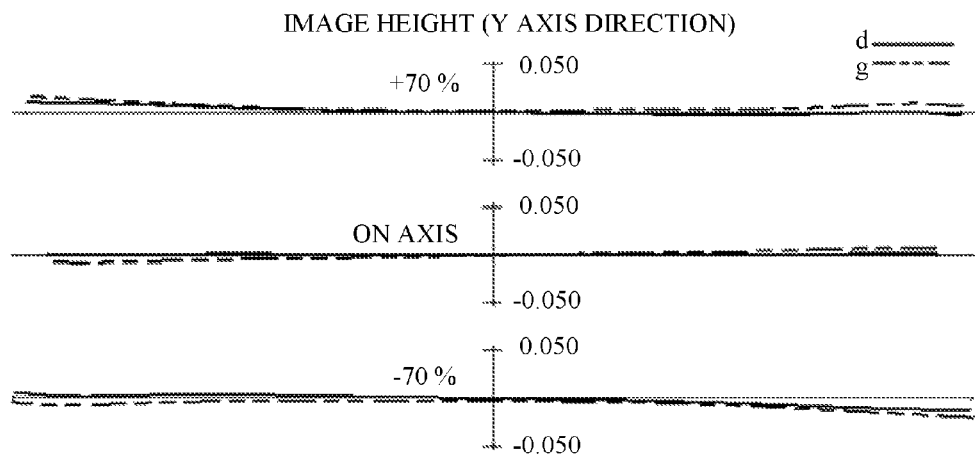
FIGS. 29A to 29C are lateral aberration diagrams of the zoom lens during image stabilization in the focus states of the close range at the wide-angle end, the middle zoom position, and the telephoto end in Embodiment 2.
Figure 29B:
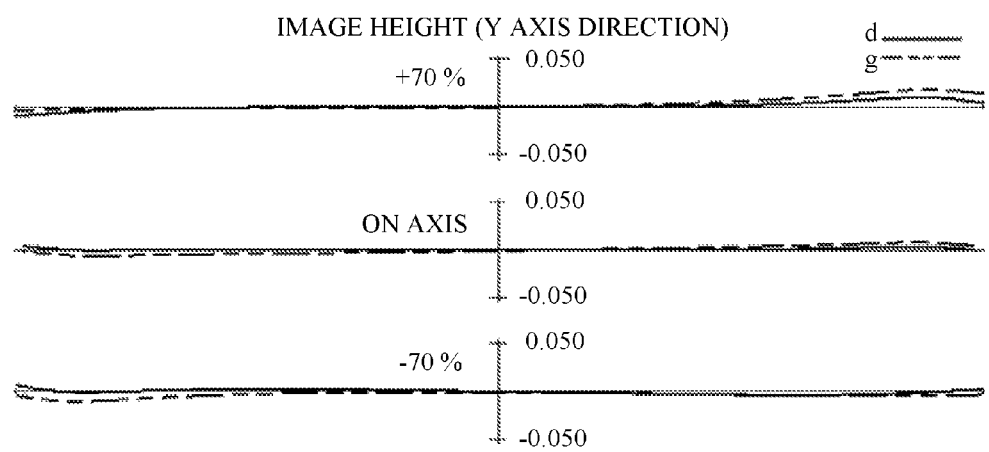
Figure 29C:
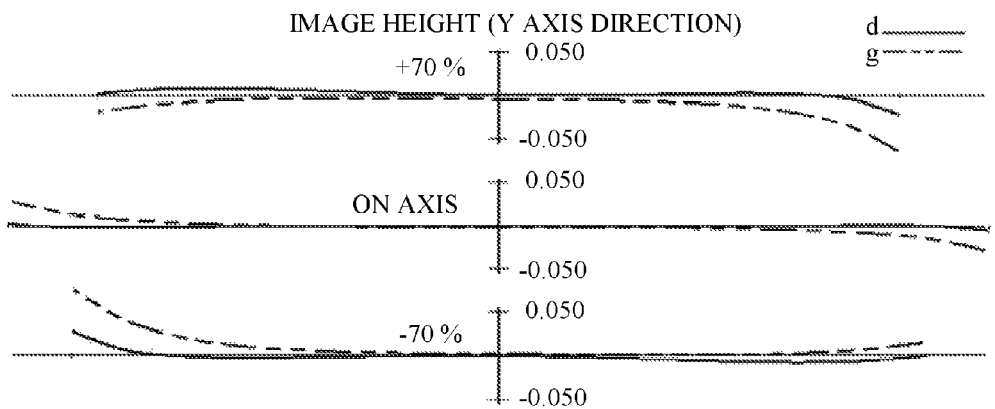

FIGS. 29A to 29C relate to the zoom lens of Embodiment 2, and FIG. 29A is a lateral aberration diagram of the focus state in the close range at the wide-angle end during the image stabilization. FIG. 29B is a lateral aberration diagram of the focus state in the close range at the middle zoom position during the image stabilization. FIG. 29C is a lateral aberration diagram of the focus state in the close range at the telephoto end during the image stabilization.

Figure 30A:
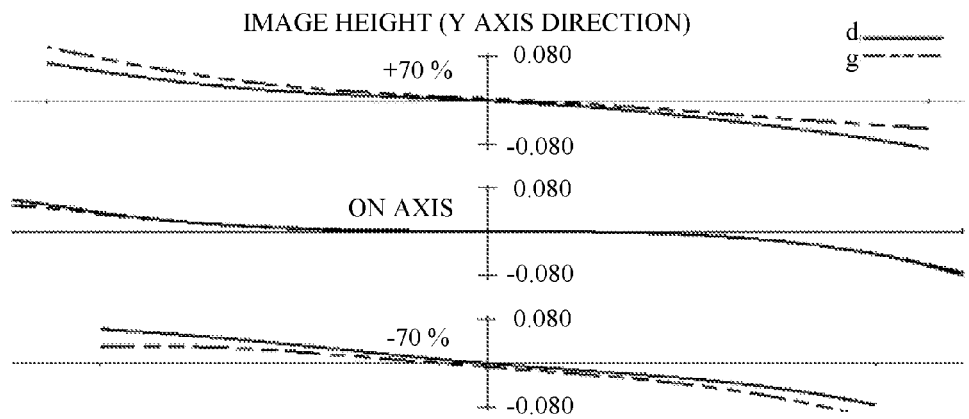
FIGS. 30A to 30C are lateral aberration diagrams of the zoom lens during image stabilization in the focus states of the close range at the wide-angle end, the middle zoom position, and the telephoto end in Embodiment 3.
Figure 30B:
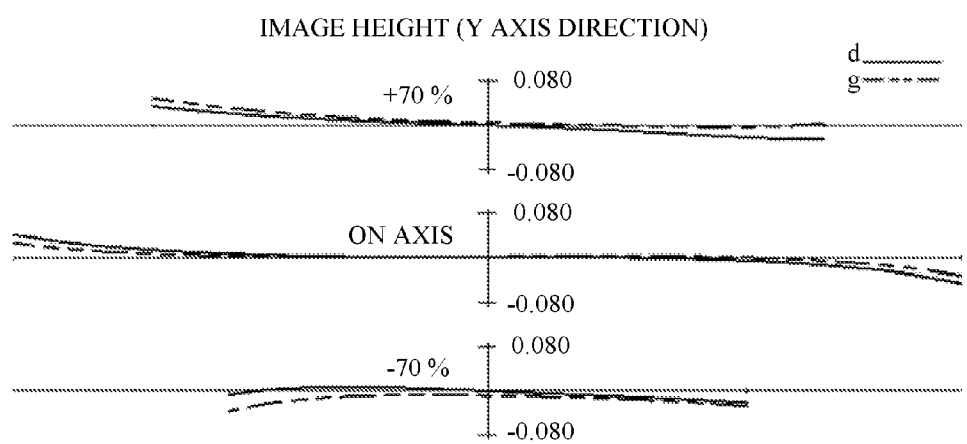
Figure 30C:
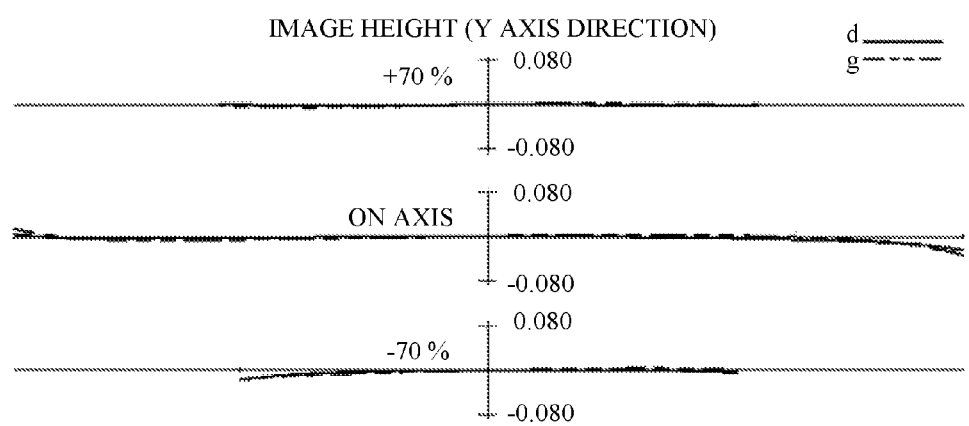

FIGS. 30A to 30C relate to the zoom lens of Embodiment 3, and FIG. 30A is a lateral aberration diagram of the focus state in the close range at the wide-angle end during the image stabilization. FIG. 30B is a lateral aberration diagram of the focus state in the close range at the middle zoom position during the image stabilization. FIG. 30C is a lateral aberration diagram of the focus state in the close range at the telephoto end during the image stabilization.

Figure 31A:
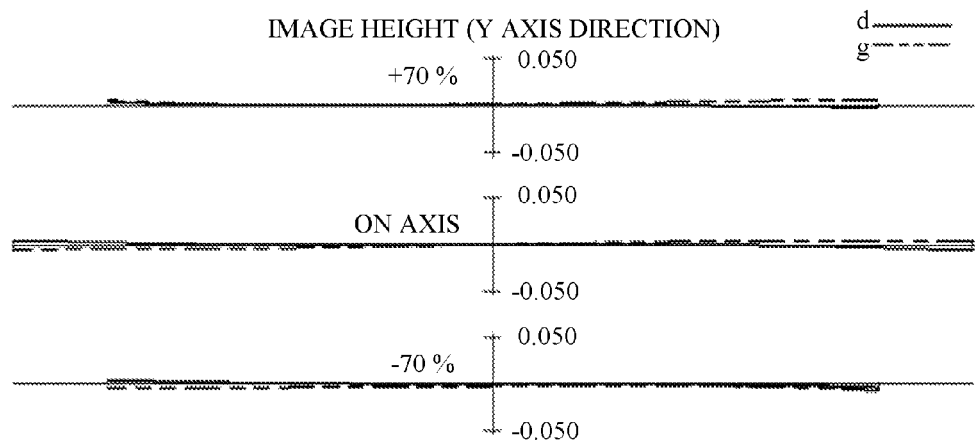
FIGS. 31A to 31C are lateral aberration diagrams of the zoom lens during image stabilization in the focus states of the close range at the wide-angle end, the middle zoom position, and the telephoto end in Embodiment 4.
Figure 31B:
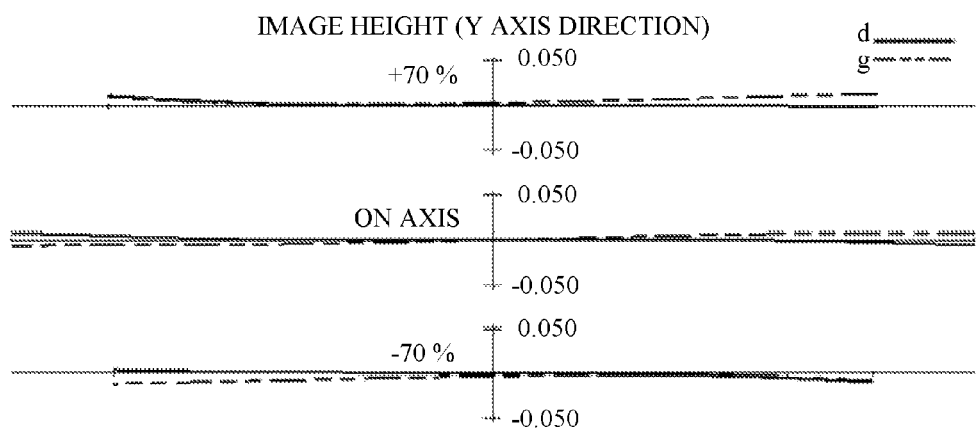
Figure 31C:
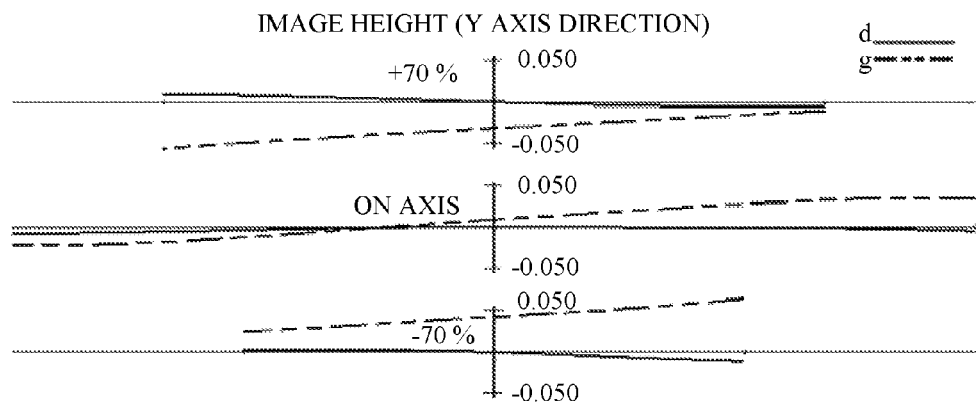

FIGS. 31A to 31C relate to the zoom lens of Embodiment 4, and FIG. 31A is a lateral aberration diagram of the focus state in the close range at the wide-angle end during the image stabilization. FIG. 31B is a lateral aberration diagram of the focus state in the close range at the middle zoom position during the image stabilization. FIG. 31C is a lateral aberration diagram of the focus state in the close range at the telephoto end during the image stabilization.

Figure 32A:
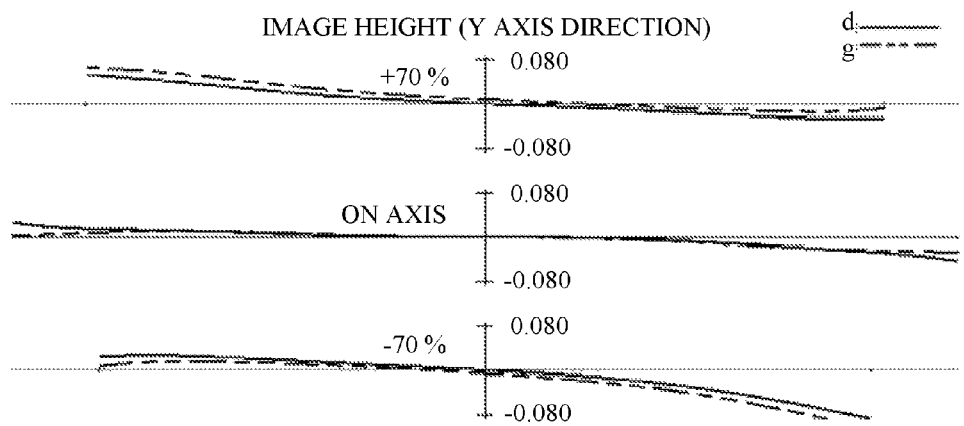
FIGS. 32A to 32C are lateral aberration diagrams of the zoom lens during image stabilization in the focus states of the close range at the wide-angle end, the middle zoom position, and the telephoto end in Embodiment 5.
Figure 32B:
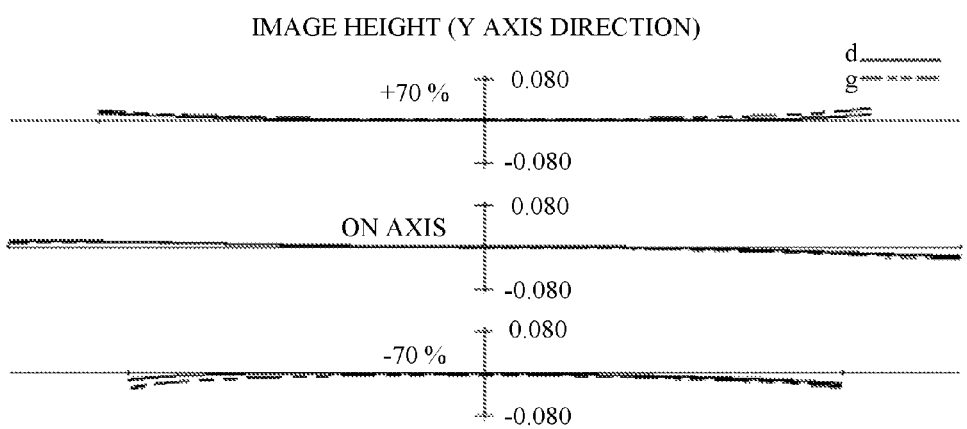
Figure 32C:
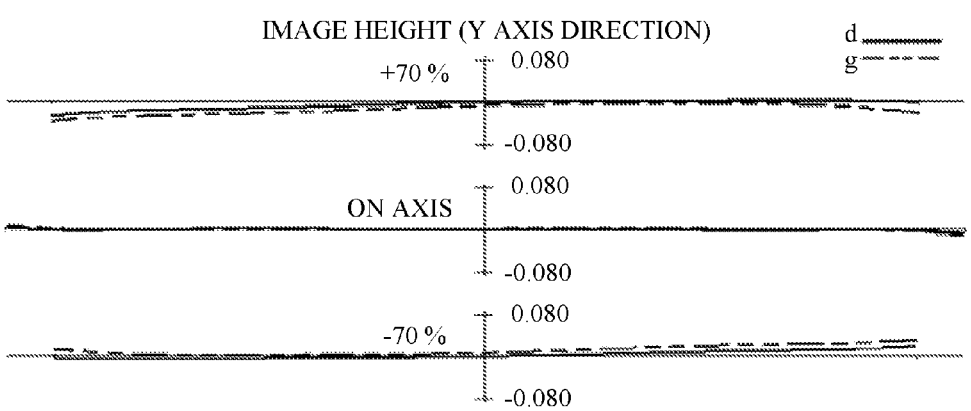

FIGS. 32A to 32C relate to the zoom lens of Embodiment 5, and FIG. 32A is a lateral aberration diagram of the focus state in the close range at the wide-angle end during the image stabilization. FIG. 32B is a lateral aberration diagram of the focus state in the close range at the middle zoom position during the image stabilization. FIG. 32C is a lateral aberration diagram of the focus state in the close range at the telephoto end during the image stabilization.

Figure 33A:
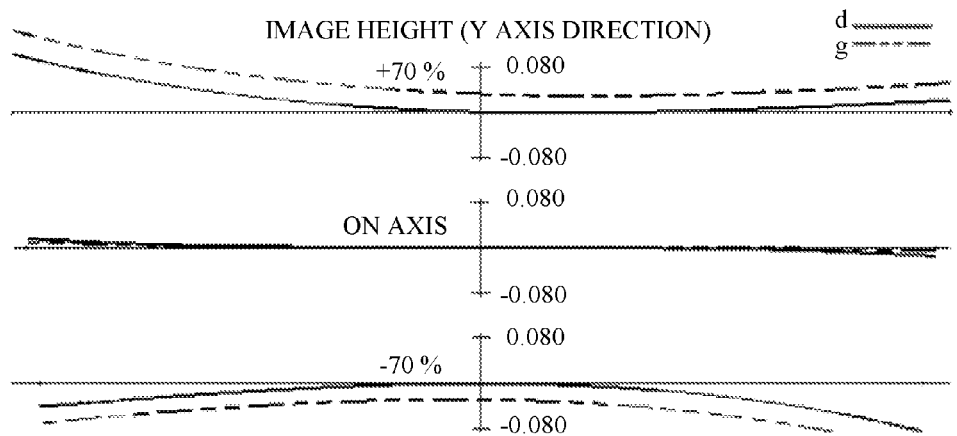
FIGS. 33A to 33C are lateral aberration diagrams of the zoom lens during image stabilization in the focus states of the close range at the wide-angle end, the middle zoom position, and the telephoto end in Embodiment 6.
Figure 33B:
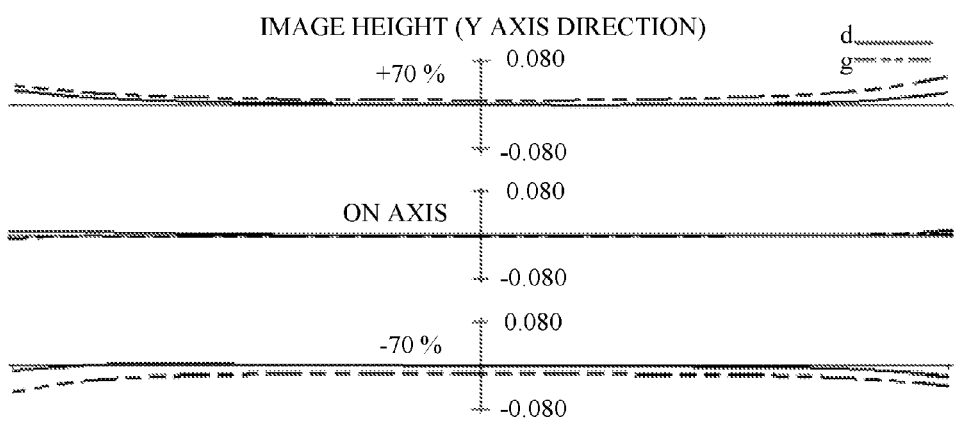
Figure 33C:
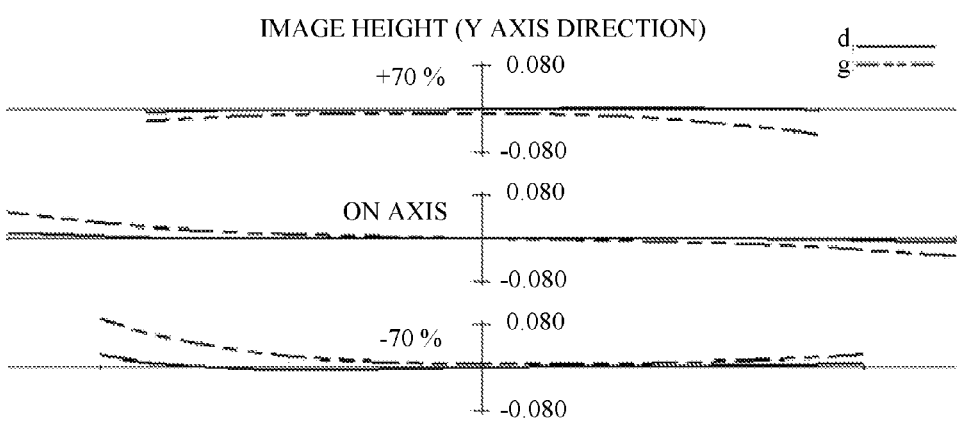

FIGS. 33A to 33C relate to the zoom lens of Embodiment 6, and FIG. 33A is a lateral aberration diagram of the focus state in the close range at the wide-angle end during the image stabilization. FIG. 33B is a lateral aberration diagram of the focus state in the close range at the middle zoom position during the image stabilization. FIG. 33C is a lateral aberration diagram of the focus state in the close range at the telephoto end during the image stabilization.

Each lateral aberration diagram illustrates an aberration at an image height in a Y axis direction (direction orthogonal to the optical axis (X axis)), and it is aberration diagrams at the image height of +70%, on-axis, and −70% in order from the top. Further, each lateral aberration diagram illustrates a meridional image plane, and dashed lines represent g lines and solid lines represent d lines.

Figure 34A:
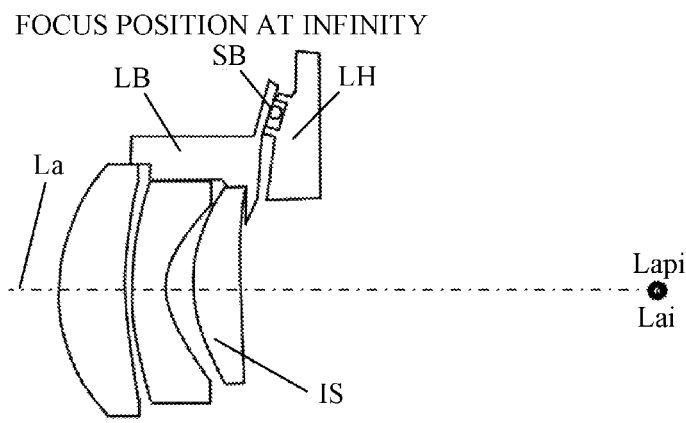
FIGS. 34A and 34B are explanatory diagrams of an image stabilizer that changes a rotational center position in each embodiment.
Figure 34B:
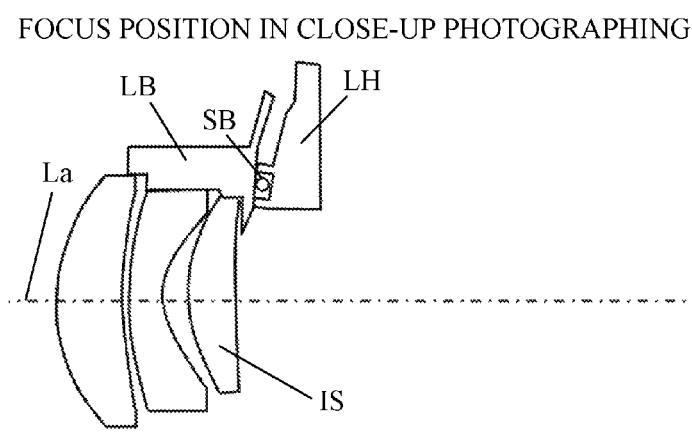

Next, referring to FIGS. 34A and 34B, an image stabilizer (image stabilization unit 103 and rotation mechanism unit 133) for changing the rotational center position based on the focus position and the zoom position in this embodiment will be described. FIGS. 34A and 34B are explanatory diagrams of the image stabilizer that changes the rotational center position based on the focus position and the zoom position. Each of FIGS. 34A and 34B illustrates the state of the focus position at infinity and in the close-up photographing (in the close range), respectively.

In this mechanism, several spherical bodies (balls) SB are sandwiched between a lens holder LH (holding member) and a fixed member LB adjacent to the lens holder LH. The lens holder LH can be moved by rolling of the spherical body SB with respect to the fixed member LB. In this time, by making a receiving surface of the fixed member LB with respect to the spherical body SB spherical, it is possible to rotate (turn) an image stabilization unit IS (corresponding to the image stabilization unit 103). Rotational center positions Lapi and Lapn (turning center) are spherical centers of the receiving surfaces at infinity and in close-up photographing, respectively. In zooming, the lens holder LH, the spherical body SB, and the fixed member LB may be integrally moved in a direction of an optical axis La. In this case, however, a distance from the lens holder LH to the rotational center position Lap is fixed independently of the magnification variation.

As illustrated in FIG. 34B, in order to appropriately set the rotation center of the image stabilization unit IS when changing the focus position in the close-up photographing, with respect to an inclination amount of the image stabilization unit IS, it is necessary to set the rotational center position at which the eccentric aberration can be canceled for each focus position. Therefore, it is possible to suppress occurrence of the eccentric aberration at the zoom position and the focus position during the image stabilization, and thus satisfactory optical performance can be obtained during the image stabilization.

The manner of movement of the correction unit in each embodiment is not necessarily limited to the rotation along the spherical shape. Instead, it may be an aspherical shape slightly deviated from the spherical shape, for example, a paraboloid shape or an ellipsoid shape so that the rotational center position can be changed based on the focus position information and the zoom position information. In general, the occurrence of the eccentric aberration when a part of the lens units of the optical system is rotated around a predetermined rotation center is also indicated, in view of the aberration theory, similarly to the case of the parallel eccentricity described above. In this embodiment, paying attention to the fact that the eccentric aberration is generated by rotation, the remaining eccentric aberration is corrected satisfactorily by slightly rotating the eccentric lens unit having the parallel eccentricity.

This embodiment is configured to determine the rotation amount of minute rotation of the lens unit having the parallel eccentricity based on the magnification varying state of the magnification varying optical system and the movement amount of the parallel eccentricity, and the occurrence of the eccentric aberration is corrected to be sufficiently small depending on the respective states. In Numerical examples 1 to 6, application examples to imaging lenses are indicated, because it is realized assuming a case where the vibration compensation effect is most prominent as described above. Therefore, the technical idea of this embodiment can be suitably applied also to a magnification varying optical system having another configuration, that is, for example, a standard zoom lens or a zoom lens having a multi-unit configuration with high zoom ratio.

Preferably, the rotation amount of the slight rotation in this embodiment is configured to be determined depending on the magnification varying state of the magnification varying optical system and the drive amount of the parallel eccentricity. Accordingly, for the purpose of simplifying a control apparatus, for example, the control apparatus can be configured to rotate it by a predetermined amount for example only in the case of the middle focal length region, and adopts a method of only performing the parallel eccentric drive at the telephoto end and the wide-angle end and in the vicinity thereof and also performing an optimum design in this case.

Next, Numerical examples 1 to 6 corresponding to Embodiments 1 to 6, respectively, are indicated. In the numerical examples, symbol Ri is the radius of curvature of the i-th lens surface in order from the object side, symbol Di is the i-th lens thickness and air space from the object side, symbols Ni and vi are the refractive index and the Abbe number of the glass of the i-th lens from the object side. The optical axis is parallel to the X axis, and a traveling direction of light from the object side to the image plane side is defined as a positive direction.

Table 1 indicates numerical values of conditional expression (1) in each of Embodiment 1 and Embodiment 2. Table 2 indicates numerical values of conditional expression (1) in each of Embodiment 3 and Embodiment 4. Table 3 indicates numerical values of conditional expression (1) in each of Embodiment 5 and Embodiment 6. Table 4 indicates numerical values of conditional expressions (2) to (7) with respect to each of Embodiments 1 to 6.

Numerical Example 1

Unit mm
Surface data

| Surface number | r | d | nd | vd |
|---|---|---|---|---|
| 1* | −61.013 | 0.80 | 1.82899 | 39.4 |
| 2* | 7.281 | 2.70 | | |
| 3 | 13.057 | 1.60 | 1.95906 | 17.5 |
| 4 | 26.234 | (variable) | | |
| 5 | ∞ | 0.00 | | |
| 6(stop) | ∞ | (variable) | | |
| 7* | 6.743 | 2.73 | 1.76145 | 48.1 |
| 8* | 26.810 | 0.20 | | |
| 9 | 7.604 | 1.51 | 1.48786 | 70.2 |
| 10 | 15.201 | 0.50 | 1.85378 | 24.3 |
| 11 | 4.242 | 1.00 | | |
| 12* | 7.645 | 1.85 | 1.69922 | 50.3 |
| 13 | 59.503 | 1.48 | | |
| 14 | ∞ | (variable) | | |
| 15 | 22.031 | 1.95 | 1.49727 | 69.1 |
| 16 | −42.644 | (variable) | | |
| 17 | ∞ | 1.02 | 1.51633 | 64.1 |
| 18 | ∞ | 1.19 | | |
| Image plane | ∞ | | | |

Aspherical data

First surface

K = 0.00000e+000   A4 = −1.09191e−004   A6 = 4.80266e−006
A8 = −7.85071e−008   A10 = 4.83401e−010

Second surface

K = −1.16909e+000   A4 = 3.24927e−005   A6 = 3.28902e−006
A8 = 8.85143e−008   A10 = −4.57017e−009   A12 = 1.12740e−010
A14 = −2.81746e−012   A16 = 3.59134e−014

Seventh surface

K = 0.00000e+000   A4 = −2.44019e−004   A6 = −4.74977e−006
A8 = −5.07807e−008   A10 = 2.68867e−009

Eighth surface

K = 0.00000e+000   A4 = −1.97280e−004   A6 = 1.13927e−006
A8 = 2.59464e−007   A10 = −1.78554e−009

Twelfth surface

K = 0.00000e+000   A4 = −6.87784e−005   A6 = 5.01732e−006
A8 = 2.33868e−006

Various data

| Zoom ratio | | 4.70 | |
|---|---|---|---|
| | Wide-angle | Middle | Telephoto |
| Focal length | 5.36 | 15.09 | 25.19 |
| F number | 1.86 | 3.65 | 5.62 |
| Angle of view | 35.75 | 17.12 | 10.46 |
| Image height | 3.86 | 4.65 | 4.65 |
| Total lens length | 45.49 | 41.88 | 51.30 |
| BF | 4.85 | 6.24 | 5.26 |
| d 4 | 19.22 | 1.73 | 1.63 |
| d 6 | 1.05 | 2.77 | −0.10 |
| d14 | 3.71 | 14.48 | 27.85 |
| d16 | 2.98 | 4.38 | 3.40 |

Zoom unit data

| Unit | Start surface | Focal length |
|---|---|---|
| 1 | 1 | −12.64 |
| 2 | 7 | 12.46 |
| 3 | 15 | 29.51 |

Data of correction lens in image stabilization
Correction lens system
Number of start surface 7 Number of final surface 13
Focal length of correction lens system fis +12.46 mm
Thickness of correction lens system d 7.785 mm
Wide-angle end
Rotational center position of correction lens system
(in focus position at infinity)
R 173.28 mm
Rotational center position of correction lens system
(object distance in close-up photographing (first focus state))
R 17.53 mm

|  | (infinity) | (first focus state) |
|---|---|---|
| Tilt angle of Correction lens system | −0.050 degree | −0.497 degree |
| Vibration correction angle | 2.0 degrees | 2.0 degrees |

Middle zoom position
Rotational center position of correction lens system
(focus position at infinity)
R 25.76 mm
Rotational center position of correction lens ystem
(object distance in close-up photographing (first focus state))
R 16.84 mm

|  | (infinity) | (first focus state) |
|---|---|---|
| Tilt angle of Correction lens system | −0.150 degree | −0.250 degree |
| Vibration correction angle | 0.5 degrees | 0.5 degrees |

Telephoto end
Rotational center position of correction lens system
(in focus position at infinity)
R 18.09 mm
Rotational center position of correction lens system
(in object distance in close-up photographing (first focus state))
R 14.44 mm

|  | (infinity) | (first focus state) |
|---|---|---|
| Tilt angle of Correction lens system | −0.200 degree | −0.250 degree |
| Vibration correction angle | 0.4 degrees | 0.4 degrees |

Numerical Example 2

Unit mm

Surface data

| Surface number | r | d | nd | vd |
|---|---|---|---|---|
| 1 | 32.551 | 0.70 | 2.00069 | 25.5 |
| 2 | 23.359 | 2.93 | 1.49700 | 81.6 |
| 3 | −180.163 | 0.05 | | |
| 4 | 25.014 | 1.88 | 1.59282 | 68.6 |
| 5 | 81.906 | (variable) | | |
| 6* | 72.602 | 0.50 | 1.85135 | 40.1 |
| 7* | 5.449 | 2.45 | | |
| 8 | −11.520 | 0.35 | 1.71300 | 53.9 |
| 9 | 15.356 | 0.19 | | |
| 10 | 10.841 | 1.30 | 1.95906 | 17.5 |
| 11 | 66.873 | (variable) | | |
| 12(stop) | ∞ | (variable) | | |
| 13 | ∞ | −0.70 | | |
| 14* | 5.026 | 2.40 | 1.49710 | 81.6 |
| 15* | −15.968 | 0.91 | | |
| 16 | 12.630 | 0.40 | 1.90366 | 31.3 |
| 17 | 4.459 | 0.34 | | |
| 18 | 5.837 | 1.70 | 1.61772 | 49.8 |
| 19 | 36.226 | (variable) | | |
| 20* | −45.487 | 0.60 | 1.53160 | 55.8 |
| 21* | 12.014 | (variable) | | |
| 22* | 9.110 | 3.00 | 1.53160 | 55.8 |
| 23* | −65.131 | (variable) | | |
| 24 | ∞ | 0.80 | 1.51633 | 64.1 |
| 25 | ∞ | 1.34 | | |
| Image plane | ∞ | | | |

Aspherical data

Sixth surface

K = 0.00000e+000  A4 = −4.58534e−004  A6 = 1.61865e−005
A8 = −2.35650e−007

Seventh surface

K = 0.00000e+000  A4 = −4.40804e−004  A6 = 8.63208e−006
A8 = 6.81229e−007

Fourteenth surface

K = 0.00000e+000  A4 = −5.90924e−004  A6 = −1.00349e−005

Fifteenth surface

K = 0.00000e+000  A4 = 6.12696e−004  A6 = 8.10606e−006

Twentieth surface

K = 0.00000e+000  A4 = 4.29270e−003  A6 = −5.74540e−004
A8 = 2.56538e−005

Twenty-first surface

K = 0.00000e+000  A4 = 4.75539e−003  A6 = −5.71627e−004
A8 = 2.37947e−005

Twenty-second surface

K = 0.00000e+000  A4 = −2.02588e−004  A6 = −1.59243e−006

Twenty-third surface

K = 0.00000e+000  A4 = −9.71464e−004  A6 = 1.68731e−005

Various data
Zoom ratio 23.40

|  | Wide-angle | Middle | Telephoto |
|---|---|---|---|
| Focal length | 4.60 | 9.64 | 107.76 |
| F number | 0.00 | 0.00 | 0.00 |
| Angle of view | 0.00 | 0.00 | 0.00 |
| Image height | 3.22 | 3.88 | 3.88 |
| Total lens length | 51.40 | 51.77 | 67.31 |
| BF | 3.07 | 3.07 | 3.07 |
| d5 | 0.37 | 4.39 | 23.83 |
| d11 | 14.74 | 9.92 | 0.49 |
| d12 | 5.30 | 2.06 | 1.10 |
| d19 | 3.61 | 7.72 | 7.87 |
| d21 | 5.04 | 5.34 | 11.67 |
| d23 | 1.20 | 1.20 | 1.20 |

Zoom unit data

| Unit | Start surface | Focal length |
|---|---|---|
| 1 | 1 | 35.26 |
| 2 | 6 | −5.37 |

-continued

Unit mm

| | | |
|---|---|---|
| 3 | 13 | 10.07 |
| 4 | 20 | −17.81 |
| 5 | 22 | 15.25 |

Data of correction lens in image stabilization

Correction lens system

| | |
|---|---|
| Number of start surface | 6 |
| Number of final surface | 11 |
| Focal length of correction lens system | fis −5.37 mm |
| Thickness of correction lens system | d 4.792 mm |
| Wide-angle end | |
| Rotational center position of correction lens system (focus position at infinity) | R 314.25 mm |
| Rotational center position of correction lens system (object distance in close-up photographing (first focus state)) | R 9.14 mm |

| | (infinity) | (first focus state) |
|---|---|---|
| Tilt angle of Correction lens system | −0.038 degree | −1.307 degree |
| Vibration correction angle | 2.0 degrees | 2.0 degrees |

Middle zoom position

| | |
|---|---|
| Rotational center position of correction lens system (focus position at infinity) | R 51.27 mm |
| Rotational center position of correction lens system (object distance in close-up photographing (first focus state)) | R 12.82 mm |

| | (infinity) | (first focus state) |
|---|---|---|
| Tilt angle of Correction lens system | −0.200 degree | −0.800 degree |
| Vibration correction angle | 2.5 degrees | 1.5 degrees |

Telephoto end

| | |
|---|---|
| Rotational center position of correction lens system (in focus position at infinity) | R 91.64 mm |
| Rotational center position of correction lens system (in object distance in close-up photographing (first focus state)) | R 30.56 mm |

| | (infinity) | (first focus state) |
|---|---|---|
| Tilt angle of Correction lens system | −0.050 degree | −0.150 degree |
| Vibration correction angle | 0.2 degrees | 0.2 degrees |

Numerical Example 3

Unit mm

Surface data

| Surface number | r | d | nd | vd |
|---|---|---|---|---|
| 1 | 32.903 | 0.85 | 1.94595 | 18.0 |
| 2 | 23.697 | 3.39 | 1.80420 | 46.5 |
| 3 | 239.525 | (variable) | | |
| 4 | 104.318 | 0.67 | 1.77250 | 49.6 |
| 5 | 9.356 | 4.75 | | |
| 6* | −18.059 | 0.40 | 1.76802 | 49.2 |
| 7 | 116.691 | 0.10 | | |
| 8 | 30.603 | 1.20 | 1.95906 | 17.5 |
| 9 | 717.339 | (variable) | | |
| 10(stop) | ∞ | (variable) | | |
| 11* | 15.470 | 2.65 | 1.76802 | 49.2 |
| 12* | −45.132 | 0.10 | | |
| 13 | 11.775 | 2.52 | 1.83481 | 42.7 |
| 14 | 230.169 | 0.45 | 1.85478 | 24.8 |
| 15 | 8.338 | (variable) | | |
| 16 | 30.731 | 2.88 | 1.49700 | 81.5 |
| 17 | −17.952 | (variable) | | |
| 18 | −22.355 | 0.40 | 1.85135 | 40.1 |
| 19* | 444.580 | 0.10 | | |
| 20 | 21.426 | 1.94 | 1.63854 | 55.4 |
| 21 | −542.945 | (variable) | | |
| 22 | ∞ | 0.50 | 1.51633 | 64.1 |
| 23 | ∞ | 0.50 | | |
| Image plane | ∞ | | | |

Aspherical data

Sixth surface

K = 0.00000e+000   A4 = −2.29119e−005   A6 = 8.28299e−008
A8 = −1.20260e−008   A10 = 1.04155e−010

Eleventh surface

K = 0.00000e+000   A4 = −4.42389e−005   A6 = 1.20948e−007

Twelfth surface

K = 0.00000e+000   A4 = 1.80026e−005   A6 = 3.00368e−007
A8 = −3.24113e−009   A10 = 2.62387e−011

Nineteenth surface

K = 0.00000e+000   A4 = 5.63992e−005   A6 = −4.35159e−008
A8 = −9.87071e−010   A10 = 8.77351e−012

Various data
Zoom ratio 3.94

| | Wide-angle | Middle | Telephoto |
|---|---|---|---|
| Focal length | 9.06 | 16.39 | 35.69 |
| F number | 1.85 | 2.54 | 2.88 |
| Angle of view | 35.52 | 25.03 | 12.46 |
| Image height | 6.47 | 7.65 | 7.89 |
| Total lens length | 59.14 | 59.11 | 67.94 |
| BF | 8.90 | 13.30 | 12.40 |
| d3 | 0.31 | 4.81 | 15.34 |
| d9 | 12.26 | 3.51 | 0.70 |
| d10 | 5.34 | 4.39 | 0.31 |
| d15 | 8.38 | 7.60 | 6.58 |
| d17 | 1.40 | 2.95 | 10.04 |
| d21 | 8.07 | 12.47 | 11.57 |

Zoom unit data

| Unit | Start surface | Focal length |
|---|---|---|
| 1 | 1 | 50.83 |
| 2 | 4 | −10.03 |
| 3 | 11 | 17.24 |
| 4 | 16 | 23.26 |
| 5 | 18 | −115.71 |

Data of correction lens in image stabilization

Correction lens system

| | |
|---|---|
| Number of start surface | 11 |
| Number of final surface | 15 |
| Focal length of correction lens system | fis +17.24 mm |
| Thickness of correction lens system | d 5.711 mm |
| Wide-angle end | |

-continued

Unit mm

| | | |
|---|---|---|
| Rotational center position of correction lens system (focus position at infinity) | R 114.77 mm | |
| Rotational center position of correction lens system (object distance in close-up photographing (first focus state)) | R 71.48 mm | |

| | (infinity) | (first focus state) |
|---|---|---|
| Tilt angle of Correction lens system | −0.131 degree | −0.210 degree |
| Vibration correction angle | 2.0 degrees | 2.0 degrees |

Middle zoom position

| | | |
|---|---|---|
| Rotational center position of correction lens system (focus position at infinity) | R 60.40 mm | |
| Rotational center position of correction lens system (object distance in close-up photographing (first focus state)) | R 34.54 mm | |

| | (infinity) | (first focus state) |
|---|---|---|
| Tilt angle of Correction lens system | −0.200 degree | −0.350 degree |
| Vibration correction angle | 1.0 degrees | 1.0 degrees |

Telephoto end

| | | |
|---|---|---|
| Rotational center position of correction lens system (in focus position at infinity) | R 70.64 mm | |
| Rotational center position of correction lens system (in object distance in close-up photographing (first focus state)) | R 28.19 mm | |

| | (infinity) | (first focus state) |
|---|---|---|
| Tilt angle of Correction lens system | −0.100 degree | −0.250 degree |
| Vibration correction angle | 0.3 degrees | 0.3 degrees |

Numerical Example 4

Unit mm

Surface data

| Surface number | r | d | nd | vd |
|---|---|---|---|---|
| 1 | 91.764 | 1.80 | 1.91082 | 35.3 |
| 2 | 49.636 | 4.38 | 1.49700 | 81.5 |
| 3 | −171.988 | 0.18 | | |
| 4 | 40.807 | 3.01 | 1.49700 | 81.5 |
| 5 | 126.402 | (variable) | | |
| 6 | 157.210 | 0.95 | 1.88300 | 40.8 |
| 7 | 8.768 | 4.76 | | |
| 8 | −35.634 | 0.70 | 1.77250 | 49.6 |
| 9 | 30.470 | 0.20 | | |
| 10 | 17.427 | 1.78 | 1.95906 | 17.5 |
| 11 | 65.831 | (variable) | | |
| 12(stop) | ∞ | (variable) | | |
| 13* | 10.728 | 2.99 | 1.55332 | 71.7 |
| 14* | −2789.552 | 1.65 | | |
| 15 | 24.031 | 0.60 | 1.77250 | 49.6 |
| 16 | 11.205 | 0.36 | | |
| 17 | 15.956 | 0.60 | 2.00100 | 29.1 |
| 18 | 11.273 | 2.37 | 1.49700 | 81.5 |
| 19 | −28.103 | (variable) | | |
| 20 | 31.461 | 0.70 | 1.70154 | 41.2 |
| 21 | 16.418 | (variable) | | |
| 22 | 23.373 | 2.76 | 1.80100 | 35.0 |
| 23 | −20.628 | 0.60 | 1.84666 | 23.8 |
| 24 | 402.226 | (variable) | | |
| 25 | ∞ | 0.50 | 1.51633 | 64.1 |
| 26 | ∞ | 0.49 | | |
| Image plane | ∞ | | | |

Aspherical data

Thirteenth surface $K = -8.61394e-001$  $A4 = 6.43510e-006$  $A6 = 4.28494e-007$
$A8 = -7.79572e-009$  $A10 = 2.62605e-010$ Fourteenth surface $K = -3.11524e+006$  $A4 = 4.30164e-006$  $A6 = 5.58889e-007$

Various data
Zoom ratio 41.65

| | Wide-angle | Middle | Telephoto |
|---|---|---|---|
| Focal length | 5.00 | 12.64 | 208.24 |
| F number | 3.50 | 4.71 | 7.07 |
| Angle of view | 33.38 | 17.04 | 1.07 |
| Image height | 3.29 | 3.88 | 3.88 |
| Total lens length | 97.46 | 94.86 | 138.92 |
| BF | 11.71 | 19.65 | 11.66 |
| d5 | 0.78 | 13.96 | 59.59 |
| d11 | 33.93 | 16.43 | 1.40 |
| d12 | 11.32 | 4.43 | 0.00 |
| d19 | 3.60 | 4.14 | 8.33 |
| d21 | 5.56 | 5.69 | 27.38 |
| d24 | 10.89 | 18.82 | 10.90 |

Zoom unit data

| Unit | Start surface | Focal length |
|---|---|---|
| 1 | 1 | 78.31 |
| 2 | 6 | −9.68 |
| 3 | 13 | 19.63 |
| 4 | 20 | −49.90 |
| 5 | 22 | 33.11 |

Data of correction lens in image stabilization

Correction lens system

| | |
|---|---|
| Number of start surface | 13 |
| Number of final surface | 19 |
| Focal length of correction lens system | fis +19.63 mm |
| Thickness of correction lens system | d 8.570 mm |

Wide-angle end

| | | |
|---|---|---|
| Rotational center position of correction lens system (focus position at infinity) | R 536.12 mm | |
| Rotational center position of correction lens system (object distance in close-up photographing (first focus state)) | R 110.38 mm | |

| | (infinity) | (first focus state) |
|---|---|---|
| Tilt angle of Correction lens system | −0.014 degree | −0.068 degree |
| Vibration correction angle | 2.0 degrees | 2.0 degrees |

Middle zoom position

| | | |
|---|---|---|
| Rotational center position of correction lens system (focus position at infinity) | R 153.35 mm | |
| Rotational center position of correction lens system (object distance in close-up photographing (first focus state)) | R 51.18 mm | |

-continued

Unit mm

|  | (infinity) | (first focus state) |
|---|---|---|
| Tilt angle of Correction lens system | −0.050 degree | −0.150 degree |
| Vibration correction angle | 1.0 degrees | 1.0 degrees |

Telephoto end

| | |
|---|---|
| Rotational center position of correction lens system (in focus position at infinity) | R 347.00 mm |
| Rotational center position of correction lens system (in object distance in close-up photographing (first focus state)) | R 17.36 mm |

|  | (infinity) | (first focus state) |
|---|---|---|
| Tilt angle of Correction lens system | −0.050 degree | −1.000 degree |
| Vibration correction angle | 0.2 degrees | 0.2 degrees |

Numerical Example 5

Unit mm

Surface data

| Surface number | r | d | nd | vd |
|---|---|---|---|---|
| 1* | −101.530 | 1.00 | 1.85135 | 40.1 |
| 2* | 11.563 | 2.59 |  |  |
| 3 | 17.158 | 1.68 | 2.00272 | 19.3 |
| 4 | 34.327 | (variable) |  |  |
| 5 | ∞ | 0.00 |  |  |
| 6(stop) | ∞ | (variable) |  |  |
| 7* | 11.513 | 2.45 | 1.88202 | 37.2 |
| 8* | −158.863 | 0.20 |  |  |
| 9 | 12.241 | 2.10 | 1.88300 | 40.8 |
| 10 | −46.577 | 0.50 | 1.85478 | 24.8 |
| 11 | 6.040 | 2.24 |  |  |
| 12 | −17.396 | 0.50 | 1.80610 | 33.3 |
| 13 | 15.807 | 2.21 | 1.85135 | 40.1 |
| 14* | −13.421 | 0.37 |  |  |
| 15 | ∞ | (variable) |  |  |
| 16 | 44.289 | 3.17 | 1.59201 | 67.0 |
| 17* | −33.829 | (variable) |  |  |
| 18 | ∞ | 1.09 | 1.51633 | 64.1 |
| 19 | ∞ | 1.61 |  |  |
| Image plane | ∞ |  |  |  |

Aspherical data

First surface

K = 0.00000e+000   A4 = −4.65961e−005   A6 = 8.04510e−007
A8 = −5.60379e−009   A10 = −1.81010e−011   A12 = 2.63709e−013

Second surface

K = 1.32245e−001   A4 = −9.53359e−005   A6 = −4.31947e−007
A8 = 2.83384e−008   A10 = −6.45846e−010   A12 = 3.74432e−012

Seventh surface

K = 0.00000e+000   A4 = −1.14474e−004   A6 = −6.39836e−007
A8 = −4.86347e−009   A10 = −3.57225e−011

Eighth surface

K = 0.00000e+000   A4 = −5.86274e−006   A6 = 2.50952e−007
A8 = −3.51576e−009

Fourteenth surface

K = 0.00000e+000   A4 = −7.75182e−005   A6 = 1.40589e−007
A8 = −1.78341e−007

Seventeenth surface

K = 0.00000e+000   A4 = 2.07327e−005   A6 = −1.89462e−007
A8 = 8.61167e−010

Various data
Zoom ratio 2.88

|  | Wide-angle | Middle | Telephoto |
|---|---|---|---|
| Focal length | 10.40 | 15.85 | 30.00 |
| F number | 2.06 | 3.75 | 4.90 |
| Angle of view | 32.34 | 26.49 | 14.75 |
| Image height | 6.59 | 7.90 | 7.90 |
| Total lens length | 52.05 | 49.88 | 55.62 |
| BF | 7.45 | 6.18 | 5.03 |
| d4 | 17.46 | 6.72 | 1.44 |
| d6 | 0.00 | 2.63 | −0.18 |
| d15 | 7.77 | 14.97 | 29.95 |
| d17 | 5.12 | 3.85 | 2.70 |

Zoom unit data

| Unit | Start surface | Focal length |
|---|---|---|
| 1 | 1 | −21.26 |
| 2 | 7 | 17.13 |
| 3 | 16 | 32.89 |

Data of correction lens in image stabilization

Correction lens system

| | |
|---|---|
| Number of start surface | 7 |
| Number of final surface | 15 |
| Focal length of correction lens system | fis +17.13 mm |
| Thickness of correction lens system | d 10.198 mm |

Wide-angle end

| | |
|---|---|
| Rotational center position of correction lens system (focus position at infinity) | R 138.07 mm |
| Rotational center position of correction lens system (object distance in close-up photographing (first focus state)) | R 18.33 mm |

|  | (infinity) | (first focus state) |
|---|---|---|
| Tilt angle of Correction lens system | −122 degree | −0.919 degree |
| Vibration correction angle | 2.0 degrees | 2.0 degrees |

Middle zoom position

| | |
|---|---|
| Rotational center position of correction lens system (focus position at infinity) | R 207.08 mm |
| Rotational center position of correction lens system (object distance in close-up photographing (first focus state)) | R 51.77 mm |

|  | (infinity) | (first focus state) |
|---|---|---|
| Tilt angle of Correction lens system | −0.050 degree | −0.200 degree |
| Vibration correction angle | 1.0 degrees | 1.0 degrees |

Telephoto end

| | |
|---|---|
| Rotational center position of correction lens system (in focus position at infinity) | R 40.33 mm |

-continued

| Unit mm | | |
|---|---|---|
| Rotational center position of correction lens system (in object distance in close-up photographing (first focus state)) | | R 13.44 mm |

| | (infinity) | (first focus state) |
|---|---|---|
| Tilt angle of Correction lens system | −0.100 degree | −0.300 degree |
| Vibration correction angle | 0.3 degrees | 0.3 degrees |

Numerical Example 6

| Unit mm | | | | |
|---|---|---|---|---|
| Surface data | | | | |
| Surface number | r | d | nd | vd |
| 1 | 83.209 | 1.30 | 1.80610 | 33.3 |
| 2 | 50.503 | 4.32 | 1.49700 | 81.5 |
| 3 | 1785.592 | 0.05 | | |
| 4 | 59.632 | 3.26 | 1.49700 | 81.5 |
| 5 | 492.630 | (variable) | | |
| 6 | 200.113 | 0.80 | 1.88300 | 40.8 |
| 7 | 12.634 | 5.72 | | |
| 8 | −31.799 | 0.60 | 1.59522 | 67.7 |
| 9 | 45.152 | 0.07 | | |
| 10 | 24.087 | 2.20 | 1.95906 | 17.5 |
| 11 | 76.803 | (variable) | | |
| 12(stop) | ∞ | 0.48 | | |
| 13* | 17.570 | 2.24 | 1.49710 | 81.6 |
| 14 | 120.735 | 0.15 | | |
| 15 | 16.100 | 3.10 | 1.60342 | 38.0 |
| 16 | −31.145 | 0.50 | 1.95375 | 32.3 |
| 17 | 26.963 | (variable) | | |
| 18* | 21.746 | 2.63 | 1.58313 | 59.4 |
| 19 | −23.996 | 0.06 | | |
| 20 | 37.350 | 0.50 | 2.00100 | 29.1 |
| 21 | 12.934 | 2.57 | 1.51742 | 52.4 |
| 22 | −35.766 | (variable) | | |
| 23 | 96.168 | 0.50 | 1.85135 | 40.1 |
| 24* | 11.374 | 0.98 | | |
| 25 | 15.083 | 1.88 | 1.92286 | 18.9 |
| 26 | 22.778 | (variable) | | |
| 27 | ∞ | 1.09 | 1.51633 | 64.1 |
| Image plane | ∞ | 1.66 | | |

| Aspherical data | | |
|---|---|---|
| Thirteenth surface | | |
| K = 0.00000e+000 | A4 = −2.46391e−005 | A6 = −9.96151e−008 |
| Eighteenth surface | | |
| K = 6.36520e+000 | A4 = −1.77282e−004 | A6 = −6.36937e−007 |
| A8 = 6.25782e−010 | A10 = −2.73714e−010 | |
| Twenty-fourth surface | | |
| K = 0.00000e+000 | A4 = −2.31935e−005 | A6 = −1.67249e−007 |
| A8 = −3.90720e−009 | | |

| Various data Zoom ratio 23.66 | | | |
|---|---|---|---|
| | Wide-angle | Middle | Telephoto |
| Focal length | 9.06 | 27.49 | 214.47 |
| F number | 2.88 | 4.66 | 5.88 |
| Angle of view | 37.68 | 16.09 | 2.12 |
| Image height | 7.00 | 7.93 | 7.93 |
| Total lens length | 93.54 | 106.33 | 146.99 |

-continued

| Unit mm | | | |
|---|---|---|---|
| BF | 7.55 | 23.63 | 38.82 |
| d5 | 1.31 | 21.35 | 68.24 |
| d11 | 32.99 | 16.73 | 1.47 |
| d17 | 9.01 | 4.44 | 2.52 |
| d22 | 8.40 | 5.91 | 1.67 |
| d26 | 5.17 | 21.25 | 36.44 |

| Zoom unit data | | |
|---|---|---|
| Unit | Start surface | Focal length |
| 1 | 1 | 94.71 |
| 2 | 6 | −13.95 |
| 3 | 12 | 46.49 |
| 4 | 18 | 18.81 |
| 5 | 23 | −22.78 |

| Data of correction lens in image stabilization | |
|---|---|
| Correction lens system | |
| Number of start surface | 6 |
| Number of final surface | 11 |
| Focal length of correction lens system | fis −13.95 mm |
| Thickness of correction lens system | d 9.385 mm |
| Wide-angle end | |
| Rotational center position of correction lens system (focus position at infinity) | R 453.16 mm |
| Rotational center position of correction lens system (object distance in close-up photographing (first focus state)) | R 30.61 mm |

| | (infinity) | (first focus state) |
|---|---|---|
| Tilt angle of Correction lens system | −0.066 degree | −0.977 degree |
| Vibration correction angle | 2.0 degrees | 2.0 degrees |

| Middle zoom position | |
|---|---|
| Rotational center position of correction lens system (focus position at infinity) | R 135.18 mm |
| Rotational center position of correction lens system (object distance in close-up photographing (first focus state)) | R 13.52 mm |

| | (infinity) | (first focus state) |
|---|---|---|
| Tilt angle of Correction lens system | −0.100 degree | −1.000 degree |
| Vibration correction angle | 0.7 degrees | 0.7 degrees |

| Telephoto end | |
|---|---|
| Rotational center position of correction lens system (in focus position at infinity) | R 766.85 mm |
| Rotational center position of correction lens system (in object distance in close-up photographing (first focus state)) | R 307.11 mm |

| | (infinity) | (first focus state) |
|---|---|---|
| Tilt angle of Correction lens system | −0.020 degree | −0.050 degree |
| Vibration correction angle | 0.25 degrees | 0.25 degrees |

TABLE 4

| | Embodiment 1 | | | Embodiment 2 | | |
| --- | --- | --- | --- | --- | --- | --- |
| | Wide-Angle End | Middle | Telephoto End | Wide-Angle End | Middle | Telephoto End |
| Conditional Expression (1) | 20.005 | 1.146 | 0.469 | 62.915 | 8.024 | 12.746 |

TABLE 5

| | Embodiment 3 | | | Embodiment 4 | | |
| --- | --- | --- | --- | --- | --- | --- |
| | Wide-Angle End | Middle | Telephoto End | Wide-Angle End | Middle | Telephoto End |
| Conditional Expression (1) | 7.524 | 4.528 | 7.433 | 51.338 | 11.922 | 38.464 |

TABLE 6

| | Embodiment 5 | | | Embodiment 6 | | |
| --- | --- | --- | --- | --- | --- | --- |
| | Wide-Angle End | Middle | Telephoto End | Wide-Angle End | Middle | Telephoto End |
| Conditional Expression (1) | 11.542 | 15.230 | 2.637 | 46.563 | 12.943 | 48.986 |

TABLE 7

| | Embodiment | | | | | |
| --- | --- | --- | --- | --- | --- | --- |
| | 1 | 2 | 3 | 4 | 5 | 6 |
| Conditional Expression (2) | 2.358 | 7.658 | 5.608 | 15.665 | 2.044 | 10.449 |
| Conditional Expression (3) | 4.783 | 9.105 | 1.702 | 14.159 | 2.625 | 9.820 |
| Conditional Expression (4) | 0.560 | 0.869 | 0.441 | 1.000 | 0.288 | 0.552 |
| Conditional Expression (5) | 2.324 | 1.166 | 1.902 | 3.926 | 1.647 | 1.539 |
| Conditional Expression (6) | 4.580 | 1.639 | 0.689 | 3.471 | 1.900 | 1.486 |
| Conditional Expression (7) | 0.237 | 2.108 | 1.408 | 2.389 | 0.181 | 3.968 |

According to each embodiment, a lens apparatus and an image capturing apparatus capable of performing image stabilization while maintaining satisfactory optical performance can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The lens apparatus (image capturing optical system) of each embodiment is not limited to a zoom lens, and can be applied also to a fixed focal length lens or the like. Further, the lens apparatus of each embodiment can be applied to various image capturing apparatuses such as a digital still camera, a video camera, a surveillance camera, a broadcasting camera, an interchangeable lens, and a silver salt photography camera.

This application claims the benefit of Japanese Patent Application No. 2016-130289, filed on Jun. 30, 2016, which is hereby incorporated by reference herein in its entirety.

What is claimed is:

1. A lens apparatus comprising:
   an image capturing optical system including a correction unit configured to move in image stabilization; and
   a driver configured to rotationally drive the correction unit based on a rotational center position that varies depending on an object distance,
   wherein a conditional expression below is satisfied:

$|Rinf|/D - |Rn|/D > 0.001$, where Rinf is a distance in an optical axis direction from an intersection of a lens surface closest to an object side of the correction unit and an optical axis of the image capturing optical system to the rotational center position when focusing at infinity, Rn is a distance in the optical axis direction from the intersection of the lens surface closest to the object side of the correction unit and the optical axis to the rotational center position when focusing in a close range, and D is a thickness on the optical axis of the correction unit.

2. The lens apparatus according to claim 1, wherein the image capturing optical system includes a first lens unit disposed closest to the object side and a plurality of lens units including a second lens unit disposed adjacent to the first lens unit, and a space of adjacent lens units changes when zooming.

3. The lens apparatus according to claim 2, wherein the rotational center position is determined depending on an object distance and a zoom position.

4. The lens apparatus according to claim 2, wherein a conditional expression below is satisfied:

$0.01 < |f1|/fw < 40.00$, where f1 is a focal length of the first lens unit, and fw is a focal length of the image capturing optical system at a wide-angle end.

5. The lens apparatus according to claim 2, wherein a conditional expression below is satisfied:

$0.01 < \beta 2t/\beta 2w < 100.00$, where $\beta 2t$ and $\beta 2w$ are lateral magnifications of the second lens unit at a telephoto end and at a wide-angle end, respectively.

6. The lens apparatus according to claim 2, wherein a conditional expression below is satisfied:

$0.01 < |M2|/fw < 100.00$, where M2 is a moving amount of the second lens unit relative to an image plane from a wide-angle end to a telephoto end, and fw is a focal length of the image capturing optical system at the wide-angle end.

7. The lens apparatus according to claim 2, wherein a conditional expression below is satisfied:

$0.01 < |M1|/|M2| < 200.00$, where M1 and M2 are respectively moving amounts of the first lens unit and the second lens unit relative to an image plane from a wide-angle end to a telephoto end.

8. The lens apparatus according to claim 1, further comprising a focus unit configured to move in the optical axis direction when focusing,
   wherein a conditional expression below is satisfied:

$0.01 < ff/fw < 10.00$, where ff is a focal length of the focus unit, and fw is a focal length of the image capturing optical system at a wide-angle end.

9. The lens apparatus according to claim 8, wherein the correction unit is disposed at an object side relative to the focus unit.

10. The lens apparatus according to claim 1, wherein a conditional expression below is satisfied:

$0.10 < |fis|/fw < 20.00$, where fis is a focal length of the correction unit, and fw is a focal length of the image capturing optical system at a wide-angle end.

11. An image capturing apparatus comprising:

a lens apparatus including an image capturing optical system including a correction unit configured to move in image stabilization and a driver configured to rotationally drive the correction unit based on a rotational center position that varies depending on an object distance; and an image sensor configured to photoelectrically convert an optical image formed via the lens apparatus, wherein a conditional expression below is satisfied:

$|Rinf|/D - |Rn|/D > 0.001$, where Rinf is a distance in an optical axis direction from an intersection of a lens surface closest to an object side of the correction unit and an optical axis of the image capturing optical system to the rotational center position when focusing at infinity, Rn is a distance in the optical axis direction from the intersection of the lens surface closest to the object side of the correction unit and the optical axis to the rotational center position when focusing in a close range, and D is a thickness on the optical axis of the correction unit.

* * * * *